US012314086B1

(12) United States Patent
Forbes

(10) Patent No.: US 12,314,086 B1
(45) Date of Patent: May 27, 2025

(54) PORTABLE ELECTRONIC DEVICE CASE ACCESSORY SYSTEM

(71) Applicant: Pioneer Square Brands, Inc., High Point, NC (US)

(72) Inventor: Quentin Wade Forbes, Winston Salem, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 19/039,779

(22) Filed: Jan. 28, 2025

(51) Int. Cl.
    *G06F 1/16*     (2006.01)
    *G06F 1/18*     (2006.01)
    *G06F 1/26*     (2006.01)
    *G06F 1/28*     (2006.01)

(52) U.S. Cl.
    CPC ............ *G06F 1/1656* (2013.01); *G06F 1/182* (2013.01); *G06F 1/266* (2013.01); *G06F 1/28* (2013.01)

(58) Field of Classification Search
    CPC ......... G06F 1/1632; G06F 1/1656; G06F 1/26
    See application file for complete search history.

(56) References Cited

U.S. PATENT DOCUMENTS

| | | | | |
|---|---|---|---|---|
| 7,595,981 B2* | 9/2009 | Chen | ..................... | G06F 1/1632 455/518 |
| 7,712,669 B2* | 5/2010 | Mahany | ..................... | G06F 1/28 235/462.11 |
| 10,401,905 B2* | 9/2019 | Carnevali | ............. | G06F 1/1626 |
| 10,788,858 B1* | 9/2020 | Velasco-Dodge | ......... | G06F 1/20 |
| 11,930,604 B1 | 3/2024 | Lynch et al. | | |
| 11,936,800 B1 | 3/2024 | Balutkar et al. | | |
| 12,075,895 B1 | 9/2024 | Lynch et al. | | |
| 12,089,705 B1 | 9/2024 | Lynch | | |
| 12,117,869 B1* | 10/2024 | Lynch | ................... | G06F 1/1635 |
| 12,119,691 B1 | 10/2024 | Lynch et al. | | |
| 2012/0054401 A1* | 3/2012 | Cheng | ................... | G06F 1/1632 710/304 |
| 2014/0347000 A1* | 11/2014 | Hamann | ................ | G06F 1/189 361/679.56 |
| 2016/0004945 A1* | 1/2016 | Wade | ................ | G06K 19/0704 235/492 |

(Continued)

*Primary Examiner* — Anthony Q Edwards
(74) *Attorney, Agent, or Firm* — Grandview Law

(57) ABSTRACT

Systems involve implementations such as an electronic-controller-implemented method for use with an accessory assembly electrical-energy-communication-based couplable and structurally couplable with a portable electronic computing device. The method includes determining whether the accessory assembly is in a first electrical state or a second electrical state; when the accessory assembly is in the first electrical state and is electrical-energy-communication-based coupled to the portable electronic computing device, executing electrical-based communication between the accessory assembly and the portable electronic computing device with the portable electronic computing device as a host device of the accessory assembly; and when the accessory assembly is in the second electrical state, executing electrical-based communication between the accessory assembly and the portable electronic computing device with the portable electronic computing device as a peripheral device. Other aspects are described in the claims, drawings, and text forming a part of the present disclosure.

20 Claims, 75 Drawing Sheets

(56) References Cited

U.S. PATENT DOCUMENTS

| | | | |
|---|---|---|---|
| 2016/0187924 A1* | 6/2016 | Fan | G06F 1/1656 |
| | | | 361/679.56 |
| 2017/0083067 A1* | 3/2017 | Ganor | G06F 1/26 |
| 2019/0317564 A1* | 10/2019 | Hamann | G06F 1/1628 |
| 2023/0121126 A1* | 4/2023 | Andler | H04M 1/04 |
| | | | 235/383 |

* cited by examiner

500

502
determining whether the accessory assembly is in a first electrical state or a second electrical state

502a
determining at least one voltage level status according to at least one voltage threshold

502b
determining at least one current level status according to at least one current threshold

504
when the accessory assembly is in the first electrical state and is electrical-energy-communication-based coupled to the portable electronic computing device, executing electrical-based communication between the accessory assembly and the portable electronic computing device with the portable electronic computing device as a host device of the accessory assembly

504a
executing electrical-based communication between the accessory assembly and the electronic computing device using in part universal serial bus on-the-go mode designating the portable electronic computing device as a host

504b
utilizing at least one accessory role switch at least in part of the universal serial bus on-the-go mode designating the portable electronic computing device as a host

506
when the accessory assembly is in the second electrical state, executing electrical-based communication between the accessory assembly and the portable electronic computing device with the portable electronic computing device as a peripheral device

↓

506a
executing electrical-based communication between the accessory assembly and the electronic computing device using in part universal serial bus on-the-go mode designating the portable electronic computing device as a peripheral device

↓

506b
utilizing at least one accessory role switch at least in part of the universal serial bus on-the-go mode designating the portable electronic computing device as a peripheral device

512
determining whether the accessory assembly is in a first electrical state or a second electrical state includes determining at least one voltage level of an externally accessed electrically conductive portion of the accessory assembly

512a
determining at least one voltage level status of an external pin according to at least one voltage threshold

512b
enabling at least one pull-up resistor as connected between the external pin and a supply voltage

512c
reading a logic state of the external pin as either low equated to a zero voltage or as high equated to a floating or disconnected pin

522
determining whether the accessory assembly is in a first electrical state or a second electrical state

522a
controlling electrical-energy-based charging via current level metering

522b
controlling electrical-energy-based charging via voltage level metering

524
when the accessory assembly is in the second electrical state and is electrical-energy-communication-based coupled to the portable electronic computing device, controlling at least a portion of electrical-energy-based charging of the portable electronic computing device

524a
controlling electrical-energy-based charging via current level metering

524b
controlling electrical-energy-based charging via voltage level metering

532
determining whether the accessory assembly is electrical-communication-based coupled with a second computing device

532a
transmitting ping communication packets from a pin interface

532b
determining if ping communication packets are received at the pin interface from the second computing device in response to the transmitting the ping communication packets from the pin interface

534
when the accessory assembly is in the second electrical state and is electrical-communication-based coupled to the second computing device, executing electrical-based communication between the accessory assembly and the second computing device with the second computing device as a host device of the accessory assembly

534a
executing electrical-based communication between the accessory assembly and the second computing device using in part universal serial bus on-the-go mode designating the second computing device as a host device of the accessory assembly

534b
utilizing at least one accessory role switch at least in part of the universal serial bus on-the-go mode designating the second computing device as a host device of the accessory assembly

*544b*
utilizing at least one accessory role switch at least in part of the universal serial bus on-the-go mode designating the second computing device as a host device of the accessory assembly and designating the second computing device as a host device of the portable electronic computing device

552
determining whether the accessory assembly is electrical-communication-based coupled with a payment card reader assembly

552a
determining at least one voltage level from a card reader interface

552b
determining if the at least one determined voltage level is at a predetermined voltage threshold

554
when the accessory assembly is in the first electrical state, is electrical-communication-based coupled to the payment card reader, and is electrical-communication-based coupled to the portable electronic computing device, relaying electrical-based communication between the portable electronic computing device and the payment card reader assembly with the portable electronic device as a host device of the payment card reader assembly

554a
executing electrical-based communication between the accessory assembly, the portable electronic computing device, and the payment card reader assembly using in part universal serial bus on-the-go mode designating the portable electronic computing device as a host device of the payment card reader assembly

554b
utilizing at least one accessory role switch at least in part of the universal serial bus on-the-go mode designating the portable electronic computing device as a host device of the payment card reader assembly

566a
executing electrical-based communication between the accessory assembly, the second computing device, and the payment card reader assembly using in part universal serial bus on-the-go mode designating the second computing device as a host device of the payment card reader assembly

566b
utilizing at least one accessory role switch at least in part of the universal serial bus on-the-go mode designating the second computing device as a host device of the payment card reader assembly

*Fig. 75*

PORTABLE ELECTRONIC DEVICE CASE ACCESSORY SYSTEM

Systems and methods include an electronic-controller-implemented method for use with an accessory assembly electrical-energy-communication-based couplable and structurally couplable with a portable electronic computing device, the method comprising: determining whether the accessory assembly is in a first electrical state or a second electrical state; when the accessory assembly is in the first electrical state and is electrical-energy-communication-based coupled to the portable electronic computing device, executing electrical-based communication between the accessory assembly and the portable electronic computing device with the portable electronic computing device as a host device of the accessory assembly; and when the accessory assembly is in the second electrical state, executing electrical-based communication between the accessory assembly and the portable electronic computing device with the portable electronic computing device as a peripheral device.

In implementations the determining whether the accessory assembly is in a first electrical state or a second electrical state includes determining at least one voltage level of an externally accessed electrically conductive portion of the accessory assembly.

Implementations further include when the accessory assembly is in the first electrical state and is electrical-energy-communication-based coupled to the portable electronic computing device, controlling at least a portion of electrical-energy-based charging of the portable electronic computing device; and when the accessory assembly is in the second electrical state and is electrical-energy-communication-based coupled to the portable electronic computing device, controlling at least a portion of electrical-energy-based charging of the portable electronic computing device.

Implementations further include determining whether the accessory assembly is electrical-communication-based coupled with a second computing device; and when the accessory assembly is in the second electrical state and is electrical-communication-based coupled to the second computing device, executing electrical-based communication between the accessory assembly and the second computing device with the second computing device as a host device of the accessory assembly.

Implementations further includes determining whether the accessory assembly is electrical-communication-based coupled with a second computing device; and when the accessory assembly is in the second electrical state, is electrical-energy-communication-based coupled to the portable electronic computing device, and is electrical-communication-based coupled to the second computing device, relaying electrical-based communication between the portable electronic computing device and the second computing device with the second computing device as a host device of the portable electronic computing device.

Implementations further include determining whether the accessory assembly is electrical-communication-based coupled with a payment card reader assembly; and when the accessory assembly is in the first electrical state, is electrical-communication-based coupled to the payment card reader, and is electrical-communication-based coupled to the portable electronic computing device, relaying electrical-based communication between the portable electronic computing device and the payment card reader assembly with the portable electronic computing device as a host device of the payment card reader assembly.

Implementations further include determining whether the accessory assembly is electrical-communication-based coupled with a second computing device; determining whether the accessory assembly is electrical-communication-based coupled with a payment card reader assembly; and when the accessory assembly is in the second electrical state, is electrical-communication-based coupled to the second computing device, and is electrical-communication-based coupled to the payment card reader assembly, relaying electrical-based communication between the second computing device and the payment card reader assembly with the second computing device as a host device of the payment card reader assembly.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Portable Electronic Device Case Accessory System, articles of manufacture, compositions of matter for same that may provide context, for instance, in introducing one or more processes and/or devices described herein.

FIGS. 66 and 67 combine to be a representative flow diagram associated with aspects of the accessory assembly of FIG. 1.

FIG. 68 is a representative flow diagram associated with aspects of the accessory assembly of FIG. 1.

FIG. 69 is a representative flow diagram associated with aspects of the accessory assembly of FIG. 1.

FIG. 70 is a representative flow diagram associated with aspects of the accessory assembly of FIG. 1.

FIGS. 71 and 72 combine to be a representative flow diagram associated with aspects of the accessory assembly of FIG. 1.

FIG. 73 is a representative flow diagram associated with aspects of the accessory assembly of FIG. 1.

FIGS. 74 and 75 combine to be a representative flow diagram associated with aspects of the accessory assembly of FIG. 1.

DETAILED DESCRIPTION

Figure 1:
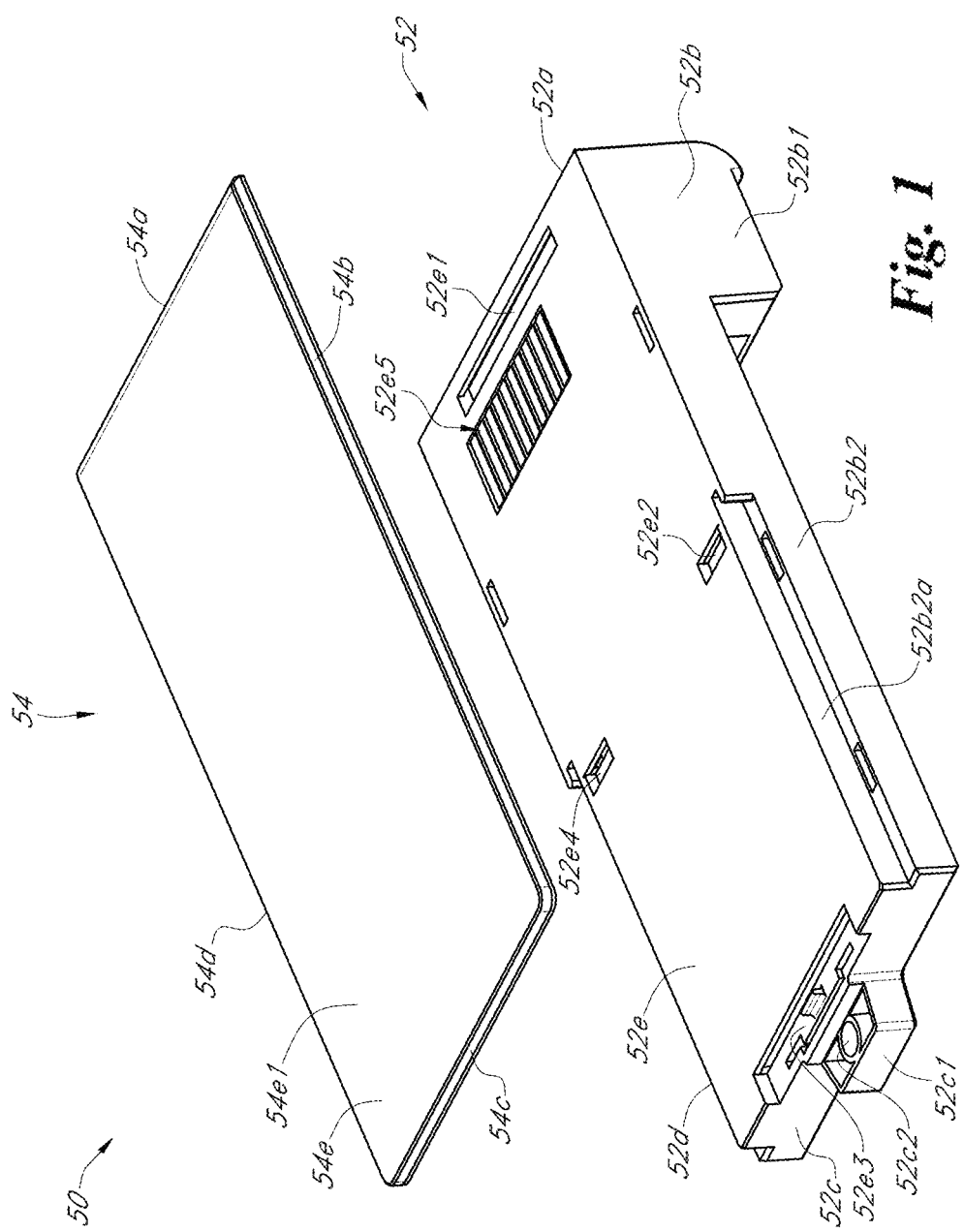
FIG. 1 is an exploded front-bottom-perspective view of an accessory assembly.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an exploded front-bottom-perspective view of accessory assembly 50. Depicted implementation of accessory assembly 50 is shown to include main assembly 52, and cover assembly 54. Depicted implementation of main assembly 52 is shown to include side 52a, side 52b, side 52c, side 52d, and back side 52e.

Depicted implementation of side 52b is shown to include base portion 52b1, extended portion 52b2, and elongated groove 52b2a, which can be seen as having an L-shaped side profile. Depicted implementation of side 52c is shown to include protrusion 52c1, and aperture 52c2. Depicted implementation of back side 52e is shown to include notch 52e1, notch 52e2, notch 52e3, notch 52e4, and electric contacts interface 52e5.

Depicted implementation of cover assembly 54 is shown to include side 54a, side 54b, side 54c, side 54d, base 54e, and exterior side 54e1. In implementations, accessory assembly 50 can include various service functions for portable electronic tablet device implementation 100 (shown in FIG. 17) or portable electronic phone device implementation 120 (shown in FIG. 27) such as storage of electrical power and electronic-based communication.

Figure 2:
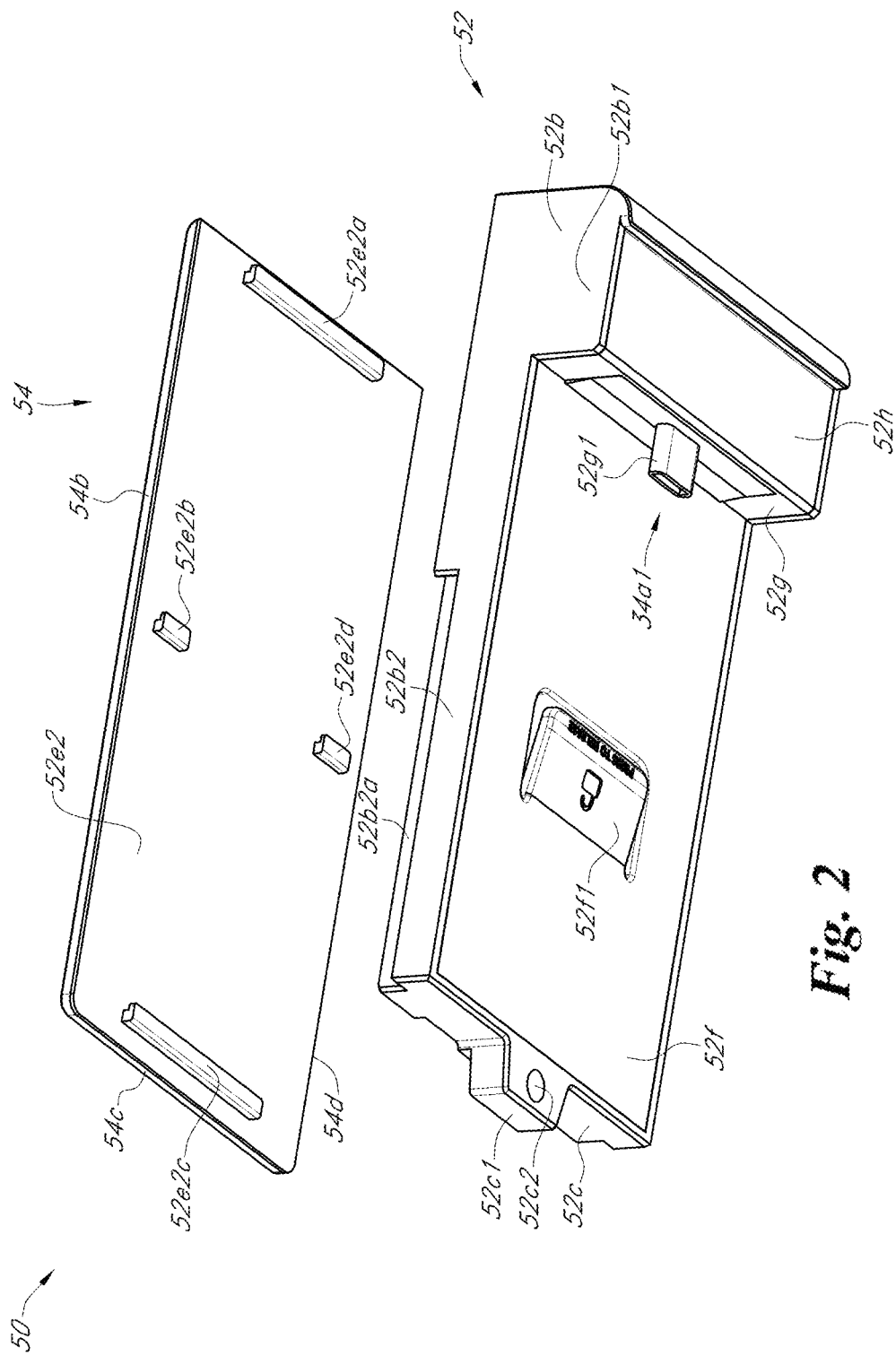
FIG. 2 is an exploded front-top-perspective view of the accessory assembly of FIG. 1.

Turning to FIG. 2, depicted therein is an exploded front-top-perspective view of accessory assembly 50. Depicted implementation of back side 52e is shown to include notch 52e2, protrusion 52e2a, protrusion 52e2b, protrusion 52e2c, and protrusion 52e2d. Depicted implementation of main assembly 52 is shown to include front portion 52f with hinged tab 52f1, coupling side 52g with electric plug 52g1, and front portion 52h.

Figure 3:
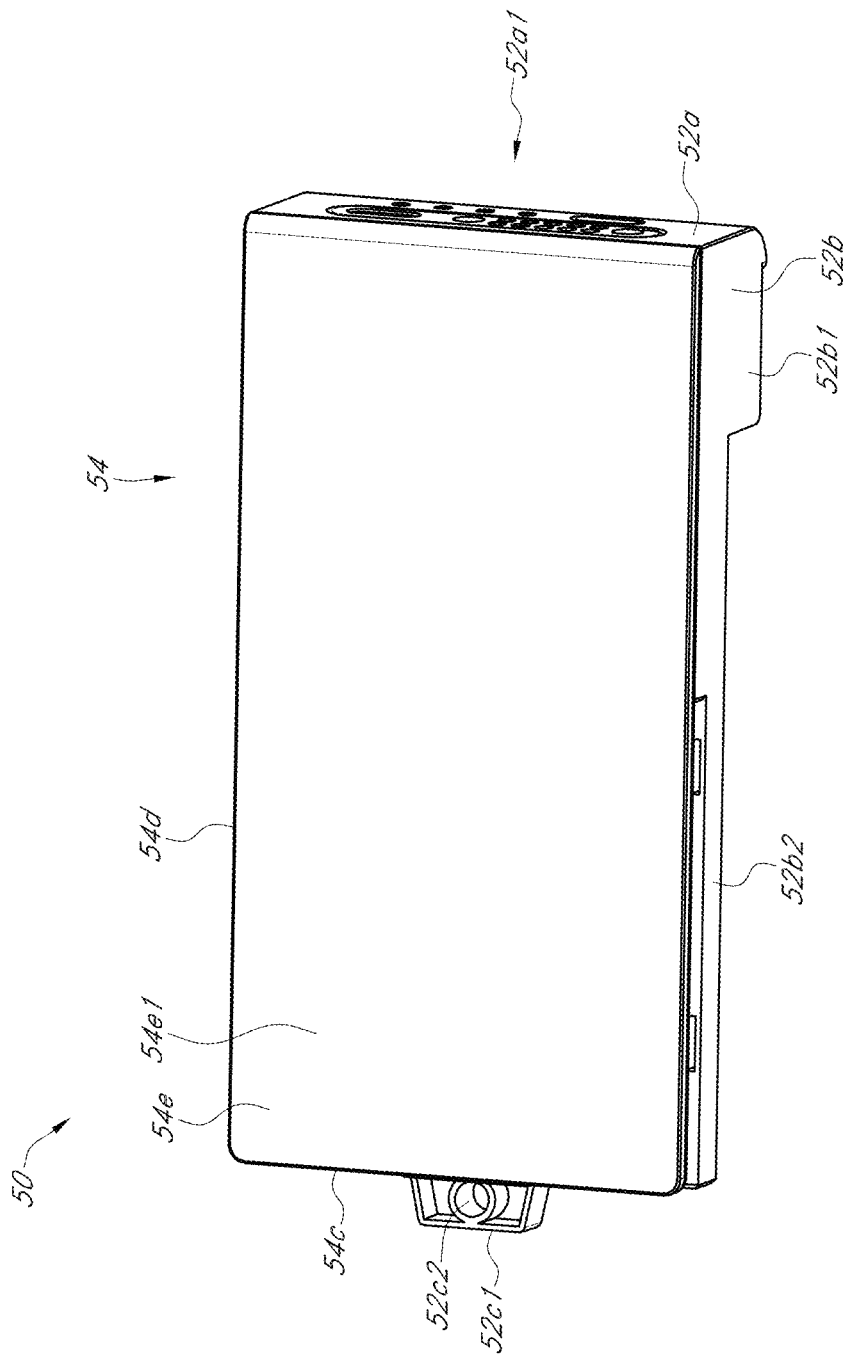
FIG. 3 is a bottom-perspective view of the accessory assembly of FIG. 1.

Turning to FIG. 3, depicted therein is a bottom-perspective view of accessory assembly 50. Depicted implementation of main assembly 52 is shown to include exterior electric interface 52a1.

Figure 4:
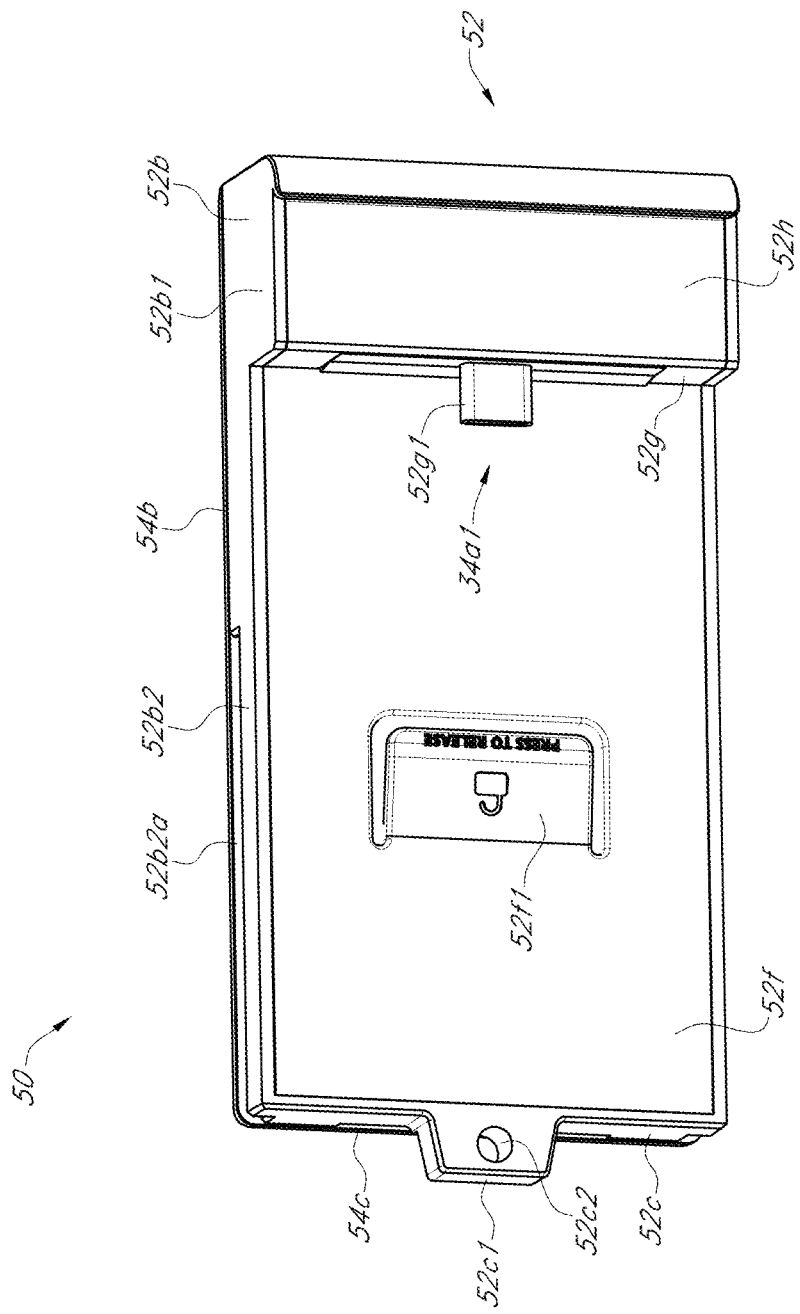
FIG. 4 is a top-perspective view of the accessory assembly of FIG. 1.

Turning to FIG. 4, depicted therein is a top-perspective view of accessory assembly 50.

Figure 5:
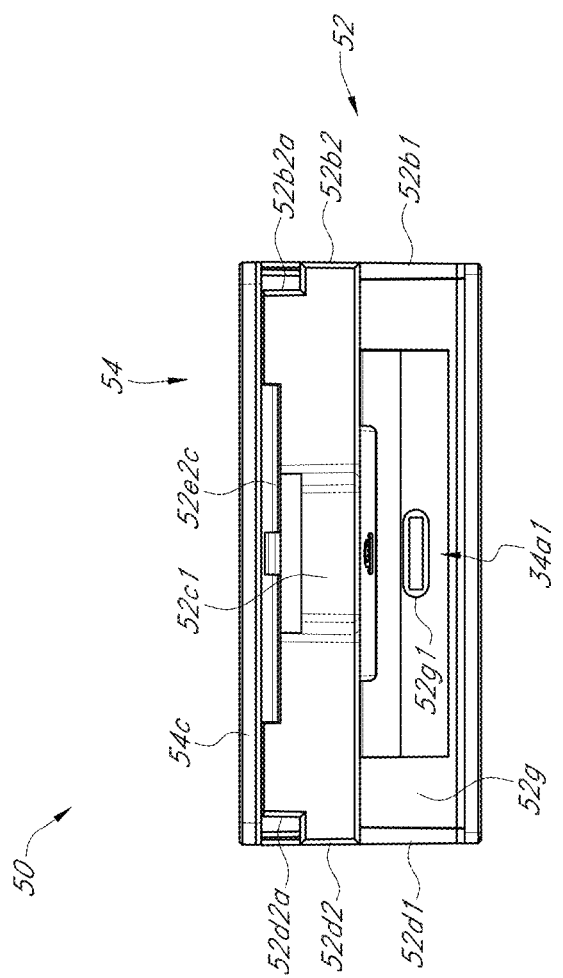
FIG. 5 is a front-elevational view of the accessory assembly of FIG. 1.

Turning to FIG. 5, depicted therein is a front-elevational view of accessory assembly 50. Depicted implementation of main assembly 52 is shown to include base portion 52d1, extended portion 52d2, and elongated groove 52d2a.

Figure 6:
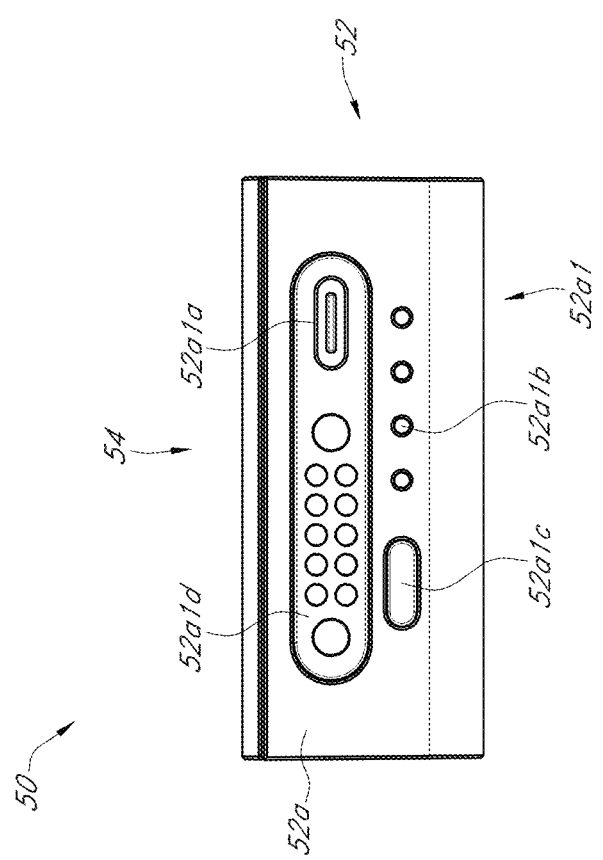
FIG. 6 is a rear-elevational view of the accessory assembly of FIG. 1.

Turning to FIG. 6, depicted therein is a rear-elevational view of accessory assembly 50. Depicted implementation of exterior electric interface 52a1 is shown to include interface portion 52a1a, interface portion 52a1b, interface portion 52a1c, and interface portion 52a1d.

Figure 7:
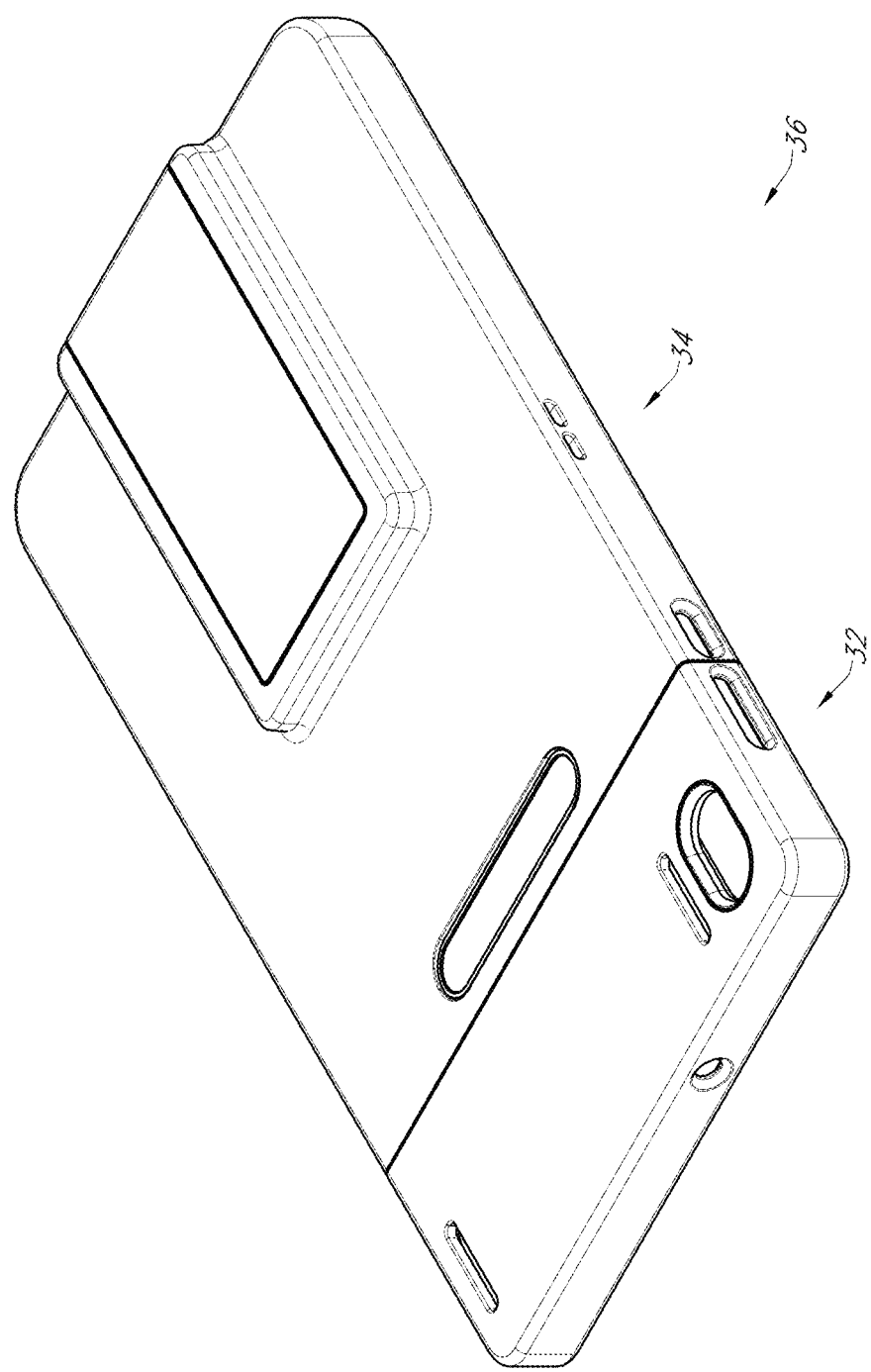
FIG. 7 is a front-bottom-perspective view of the case assembly of FIG. 12.

Turning to FIG. 7, depicted therein is a front-bottom-perspective view of device case assembly 30.

Figure 8:
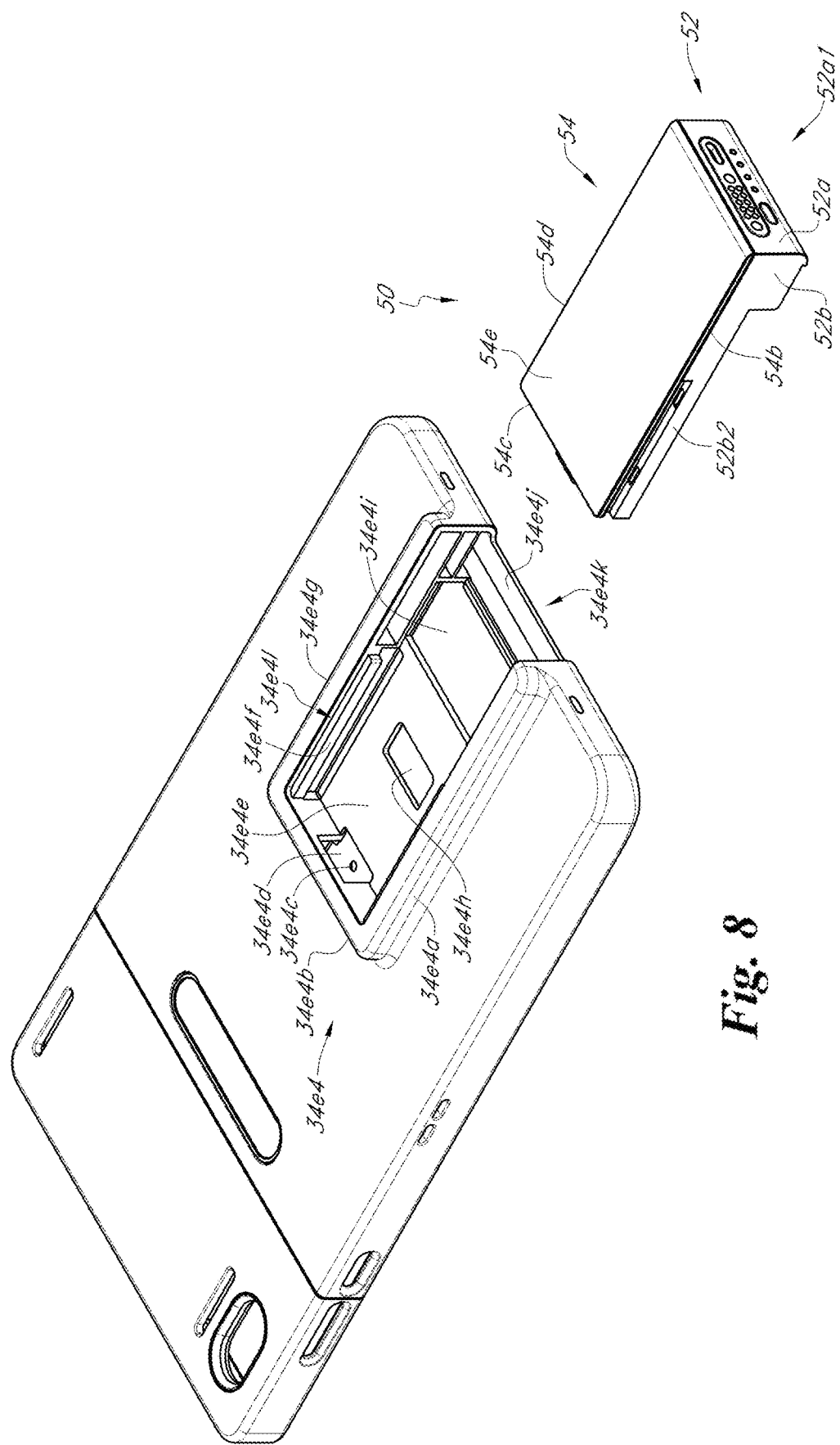
FIG. 8 is a rear-bottom perspective view of the accessory assembly of FIG. 1 uncoupled from the case assembly of FIG. 12.

Turning to FIG. 8, depicted therein is a rear-bottom perspective view of accessory assembly 50 uncoupled from device case assembly 30. Depicted implementation of coupler assembly 34e4 is shown to include side wall 34e4a, side wall 34e4b, aperture 34e4c, aperture 34e4d, raised base portion 34e4e, elongated protrusion 34e4f, side wall 34e4g, aperture 34e4h, aperture 34e4i, recessed base portion 34e4j, opening 34e4k, and interior area 34e4l. As depicted, interior area 34e4l is in part bounded by side wall 34e4a, side wall 34e4b, raised base portion 34e4e, side wall 34e4g, and recessed base portion 34e4j to couple with accessory assembly 50.

Figure 9:
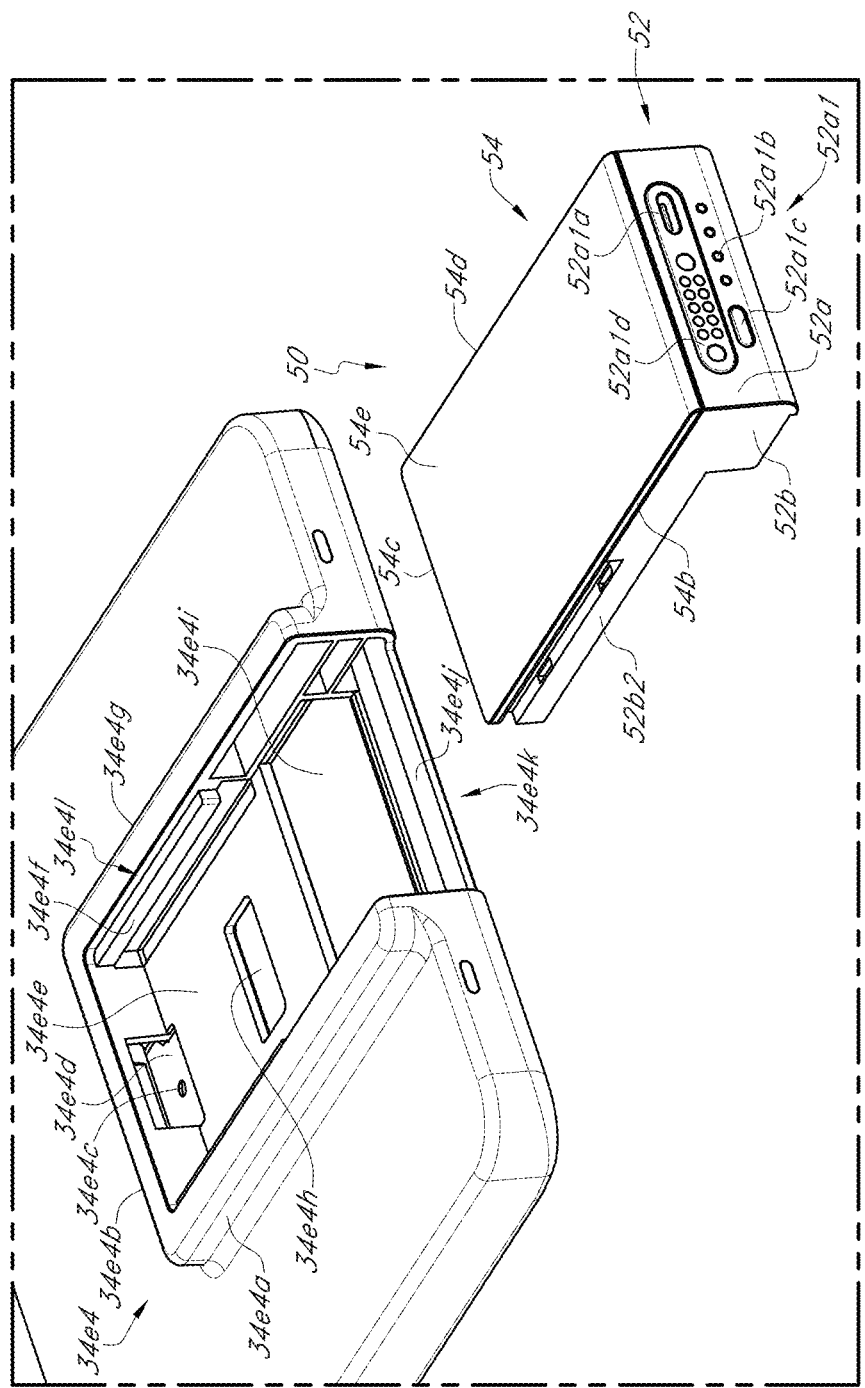
FIG. 9 is a rear-bottom perspective view of the accessory assembly of FIG. 1 uncoupled from a portion of the case assembly of FIG. 12.

Turning to FIG. 9, depicted therein is a rear-bottom perspective view of accessory assembly 50 uncoupled from a portion of device case assembly 30.

Figure 10:
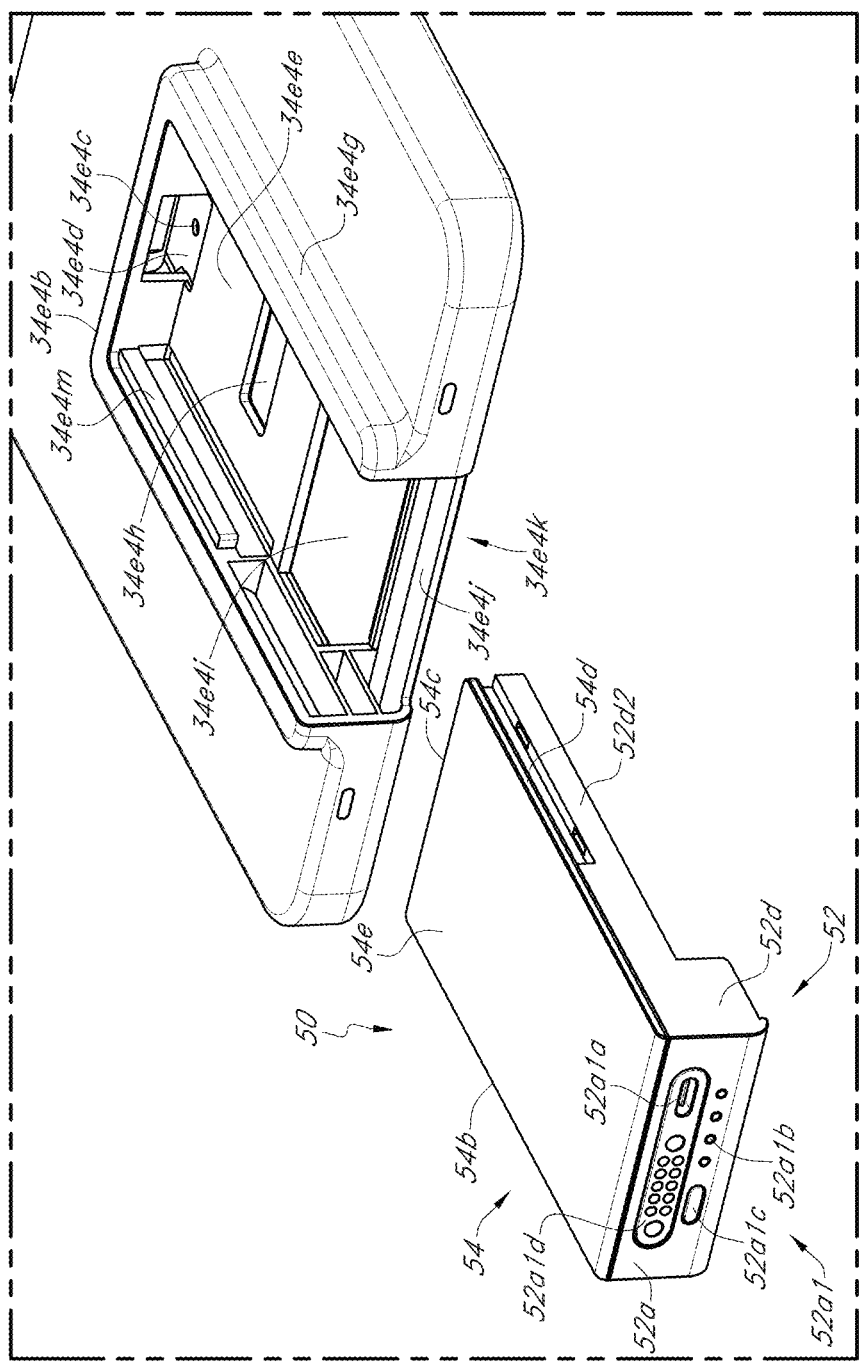
FIG. 10 is a rear-bottom perspective view of the accessory assembly of FIG. 1 uncoupled from a portion of the case assembly of FIG. 12.

Turning to FIG. 10, depicted therein is a rear-bottom perspective view of accessory assembly 50 uncoupled from a portion of device case assembly 30. Depicted implementation of coupler assembly 34e4 is shown to include elongated protrusion 34e4m.

Figure 11:
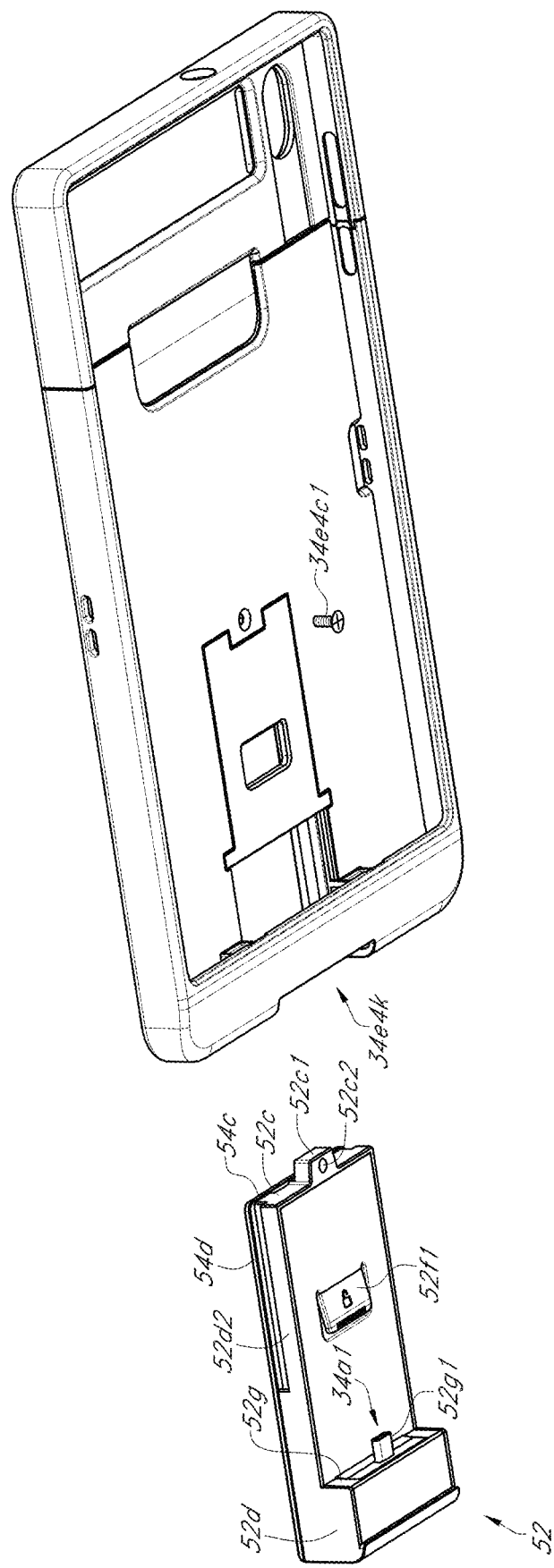
FIG. 11 is a front-top perspective view of the accessory assembly of FIG. 1 uncoupled from the case assembly of FIG. 12.

Turning to FIG. 11, depicted therein is a front-top perspective view of accessory assembly 50 uncoupled from device case assembly 30. Depicted implementation of aperture 34e4c is shown to include threaded coupler 34e4c1.

Figure 12:
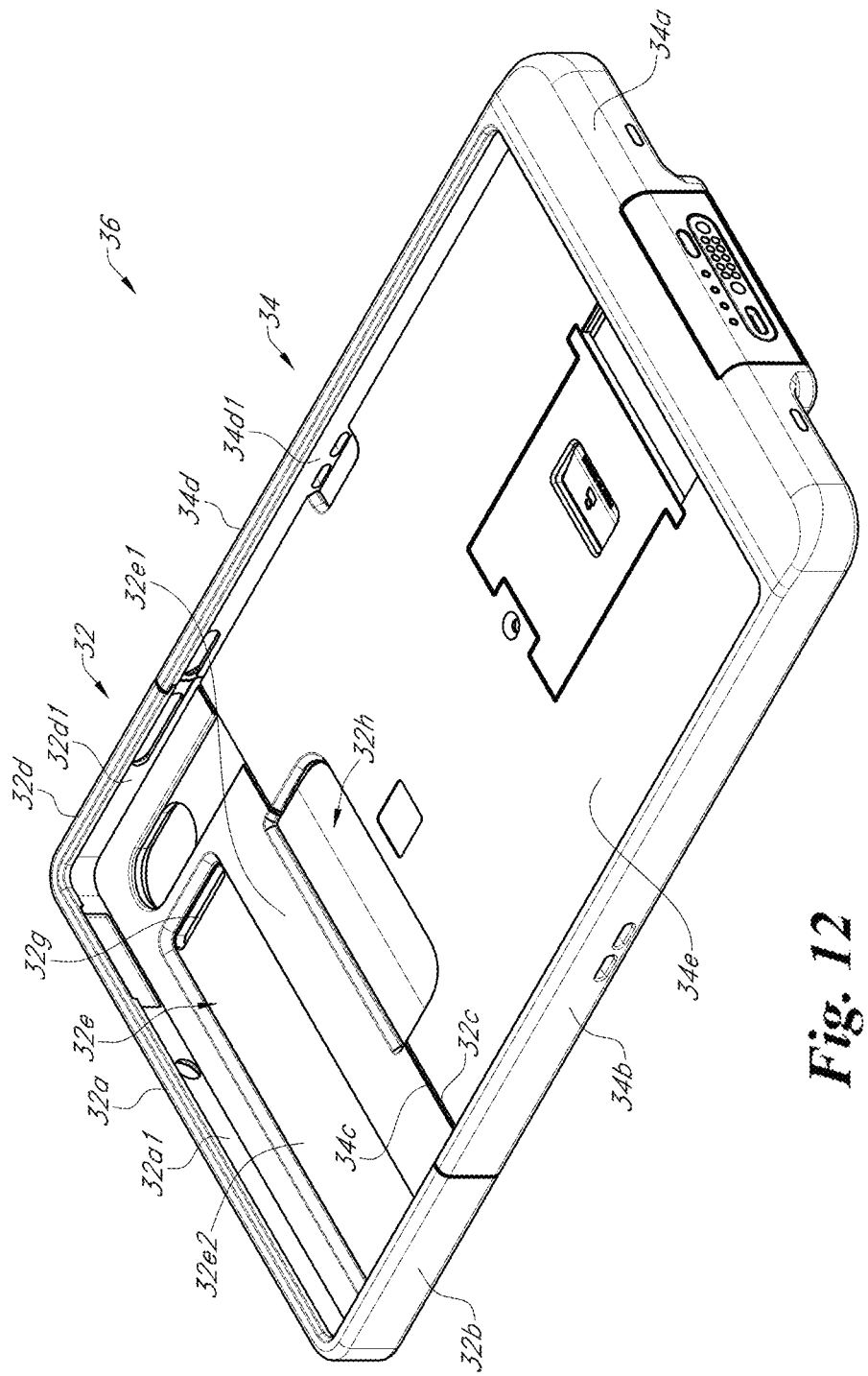
FIG. 12 is a rear-top-perspective view of the cap assembly of FIG. 56 and a main assembly coupled together to form a case assembly.

Turning to FIG. 12, depicted therein is a rear top perspective view of cap assembly 32 and main assembly 34 coupled together to form device case assembly 30. Depicted implementation of cap assembly 32 is shown to include elongated groove 32d1, raised portion 32e1, and recessed portion 32e2. As depicted, side wall 32b and side wall 32d extend perpendicular with respect to side wall 32a. As depicted, side edge 32c extends parallel with respect to side wall 32a. As depicted, side edge 32c is spaced from side wall 32a along side wall 32b and side wall 32d.

Depicted implementation of main assembly 34 is shown to include side wall 34a, side wall 34b, side edge 34c, side wall 34d, groove 34d1, and base 34e. As depicted, side wall 34b and side wall 34d extend perpendicular with respect to side wall 34a. As depicted, side edge 34c extends parallel with respect to side wall 34a. As depicted, when cap assembly 32, and cap assembly 32, are coupled together, side wall 32a, side wall 32b, side wall 32d, and base 32e of cap assembly 32, and side wall 34a, side wall 34b, side wall 32d, and base 34e of main assembly 34 form an interior area to couple with portable electronic tablet device implementation 100 (shown in FIG. 16).

Figure 13:
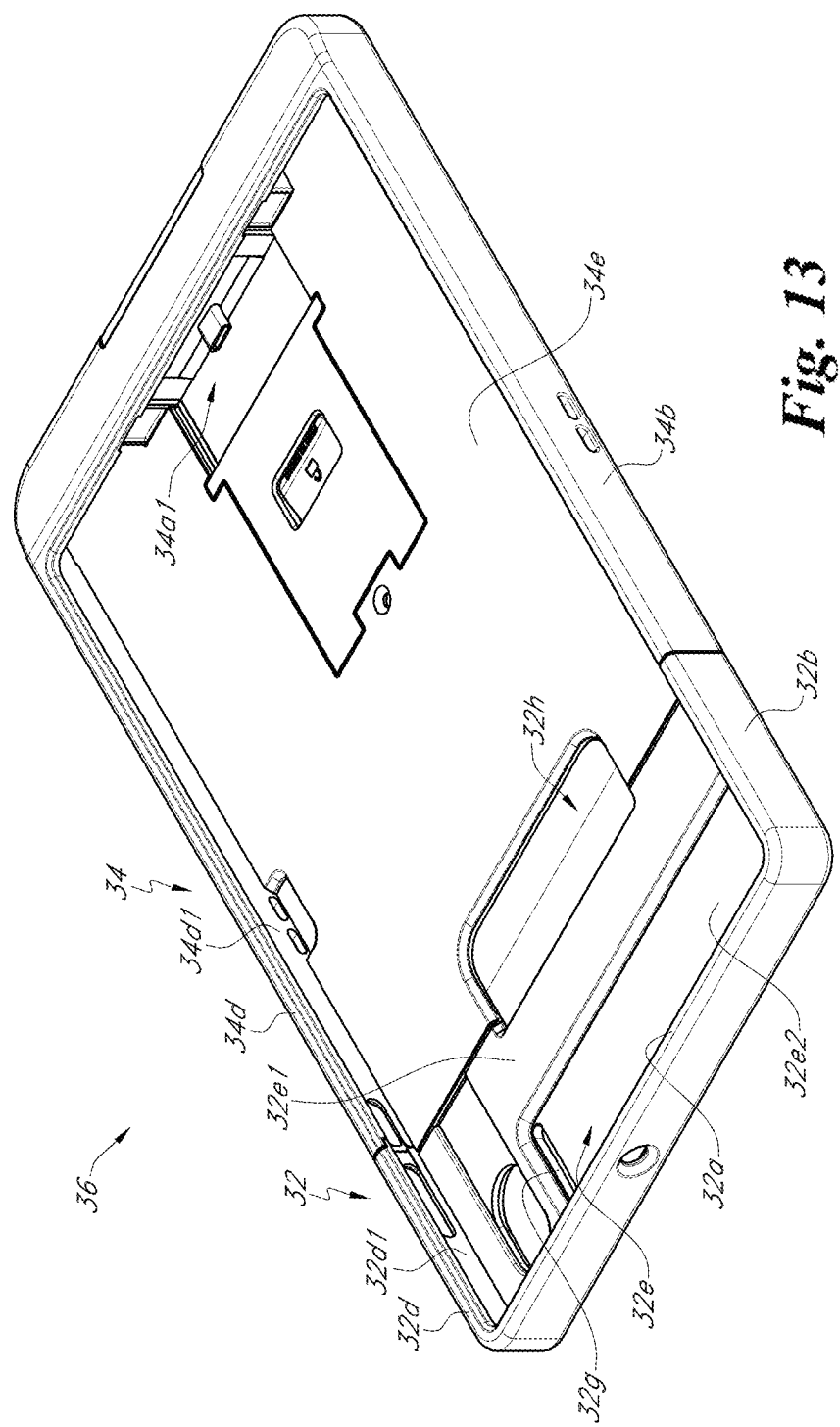
FIG. 13 is a front-top-perspective view of the case assembly of FIG. 12.

Turning to FIG. 13, depicted therein is a front-top-perspective view of device case assembly 30. Depicted implementation of main assembly 34 is shown to include portable electric interface 34a1.

Figure 14:
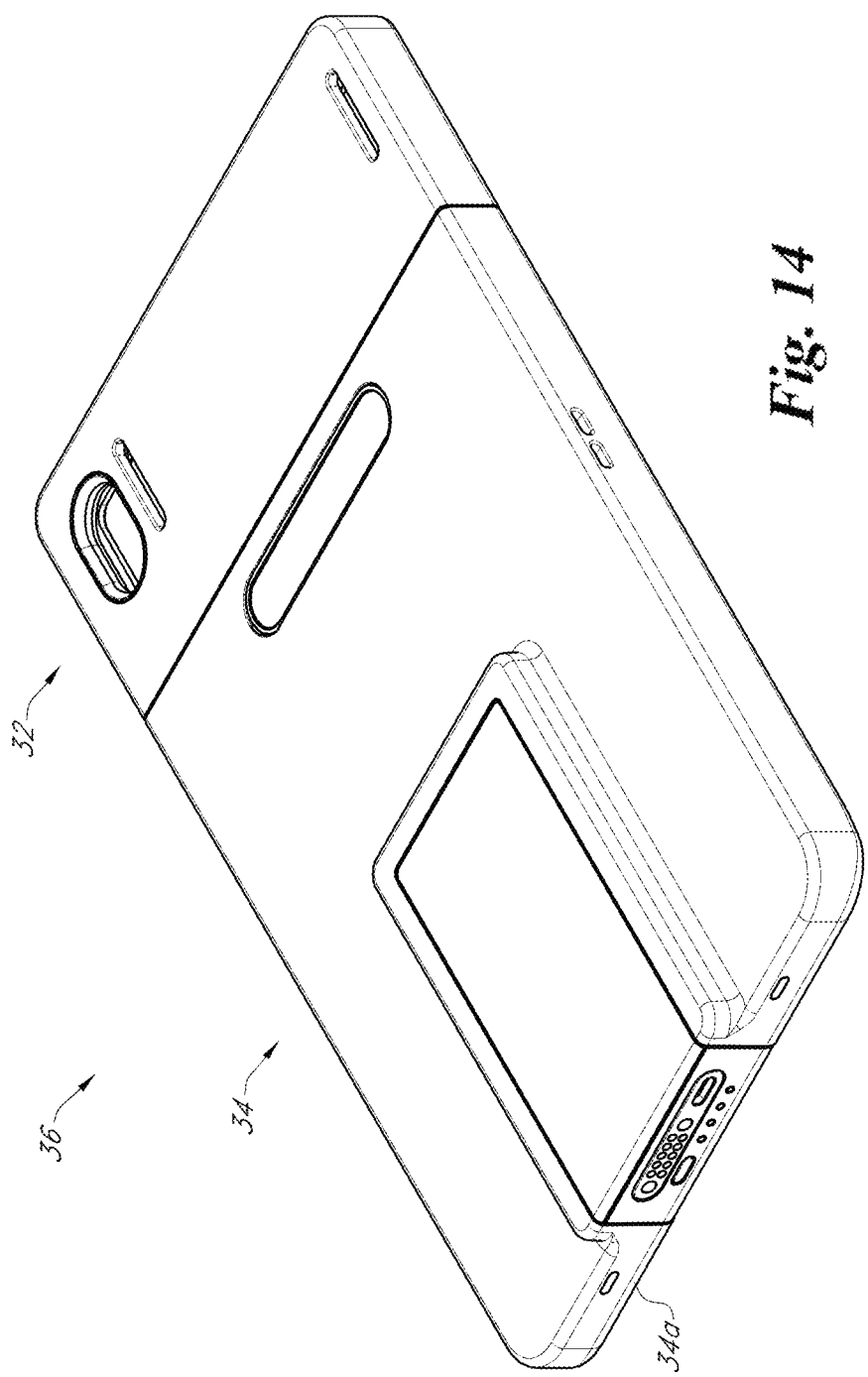
FIG. 14 is a rear-bottom-perspective view of the case assembly of FIG. 12.

Turning to FIG. 14, depicted therein is a rear-bottom-perspective view of device case assembly 30.

Figure 15:
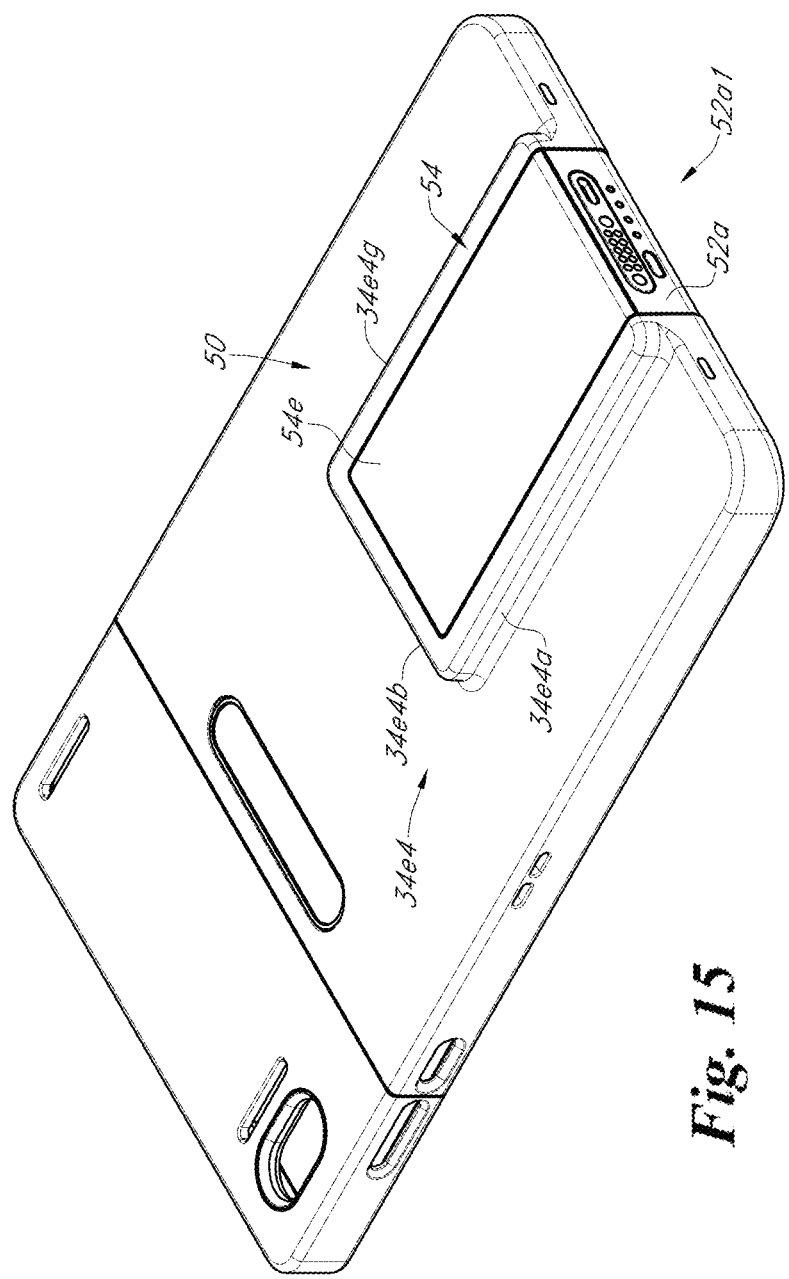
FIG. 15 is a rear-bottom perspective view of the accessory assembly of FIG. 1 coupled with the case assembly of FIG. 12.

Turning to FIG. 15, depicted therein is a rear-bottom perspective view of accessory assembly 50 coupled with device case assembly 30.

Figure 16:
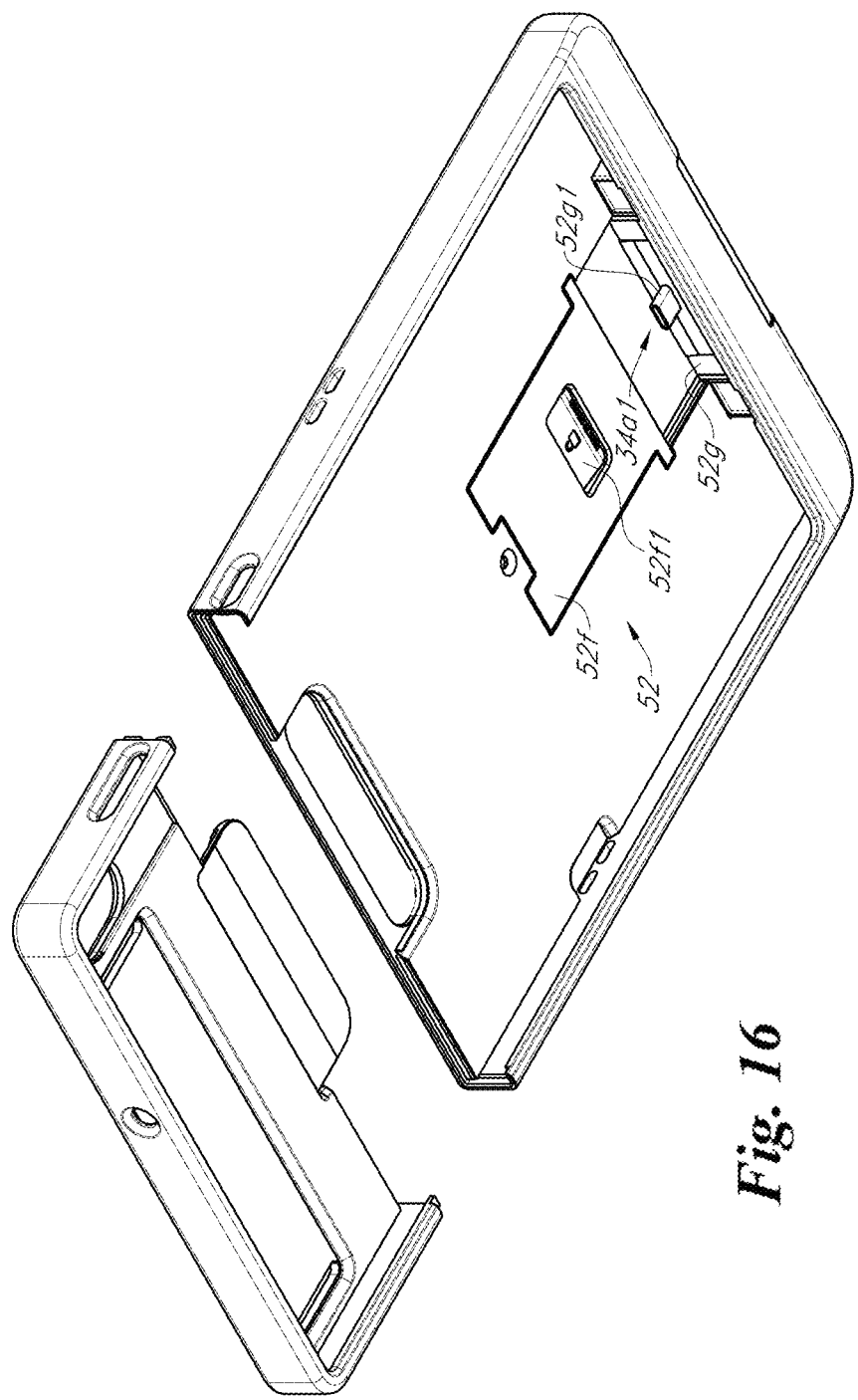
FIG. 16 is a front-top perspective view of the accessory assembly of FIG. 1 coupled with a portion of an exploded view of the case assembly of FIG. 12.

Turning to FIG. 16, depicted therein is a front-top perspective view of accessory assembly 50 coupled with a portion of an exploded view of device case assembly 30.

Figure 17:
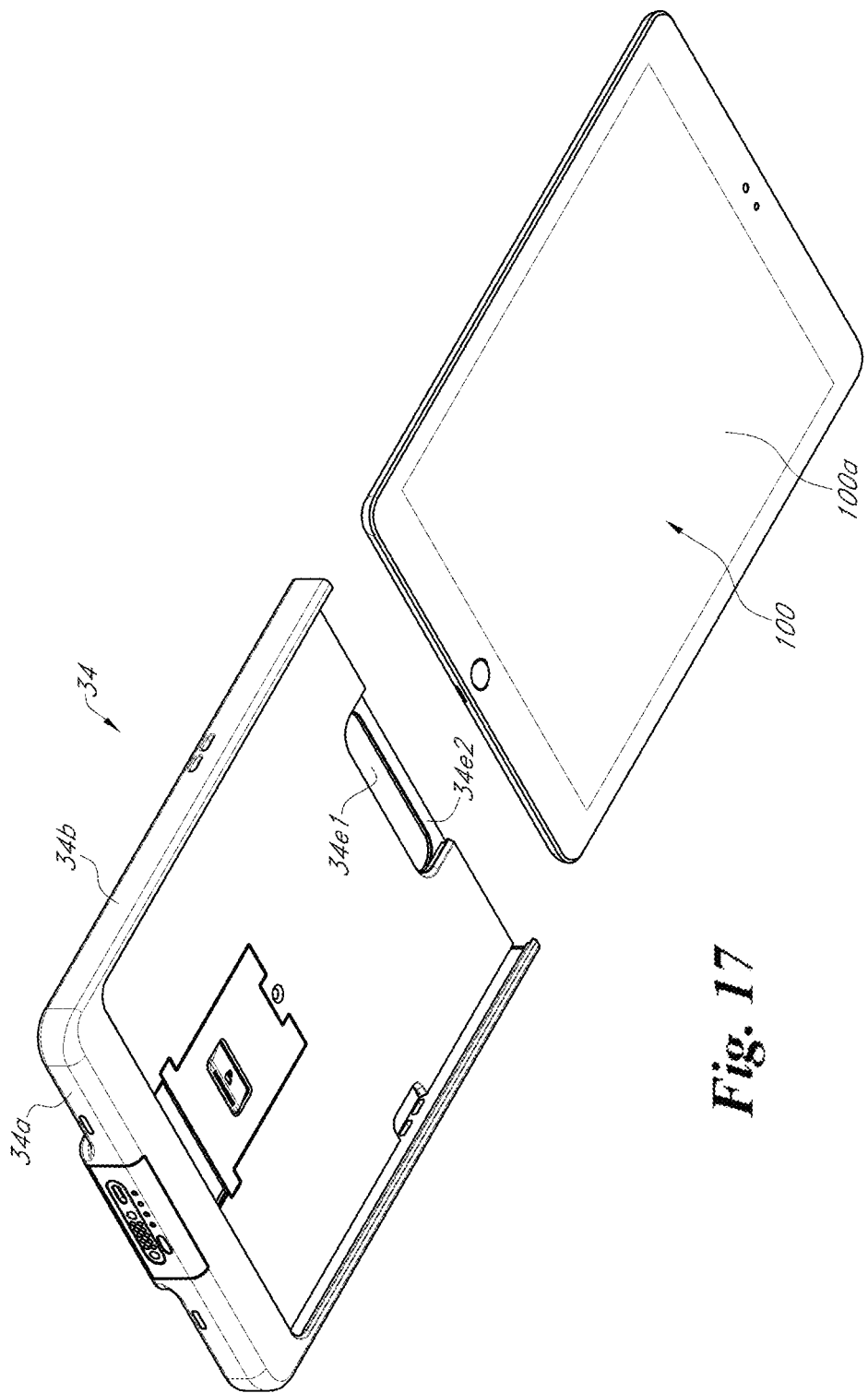
FIG. 17 is a front-rear perspective of a portion of the case assembly of FIG. 12 and an electronic device.

Turning to FIG. 17, depicted therein is a front-rear perspective of a portion of device case assembly 30 and portable electronic tablet device implementation 100 with display 100a.

Figure 18:
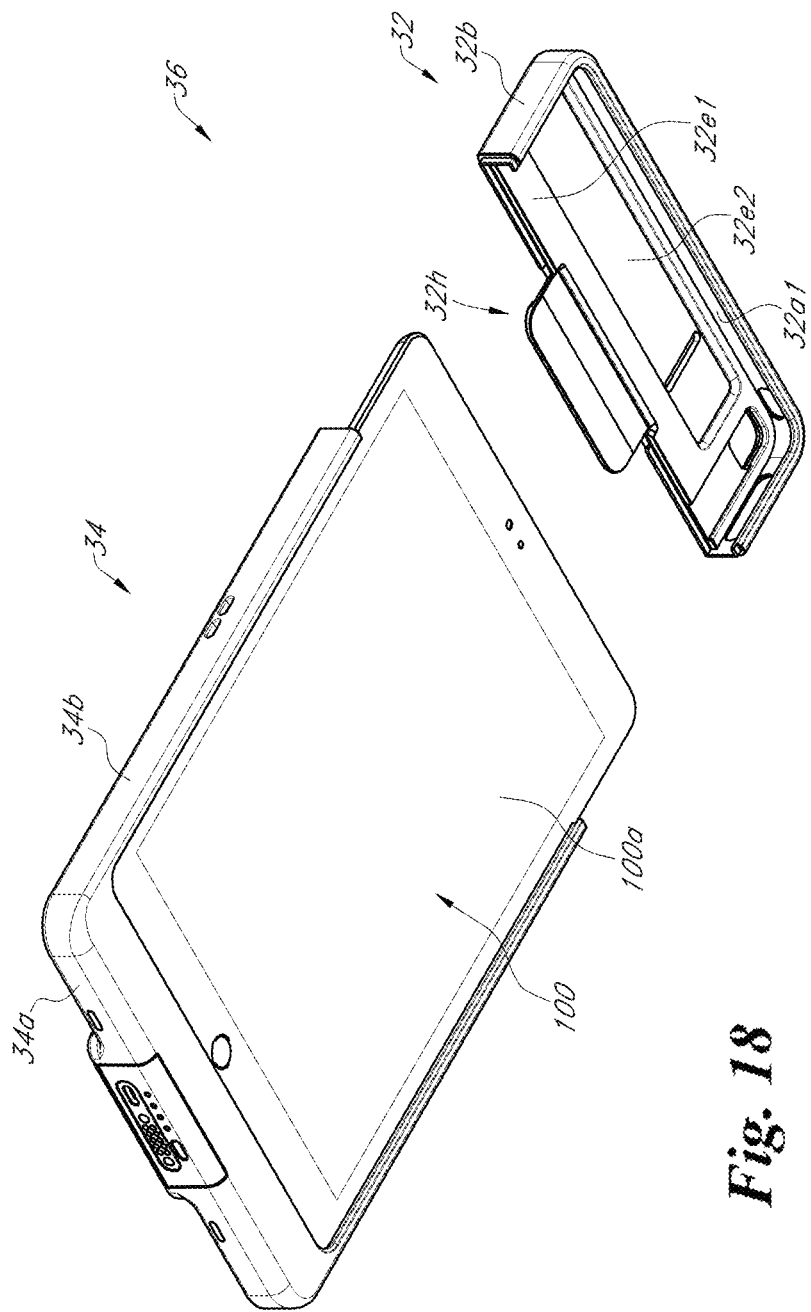
FIG. 18 is a front-rear perspective of a portion of the case assembly of FIG. 12 and the electronic device of FIG. 17.

Turning to FIG. 18, depicted therein is a front-rear perspective of a portion of device case assembly 30 and portable electronic tablet device implementation 100.

Figure 19:
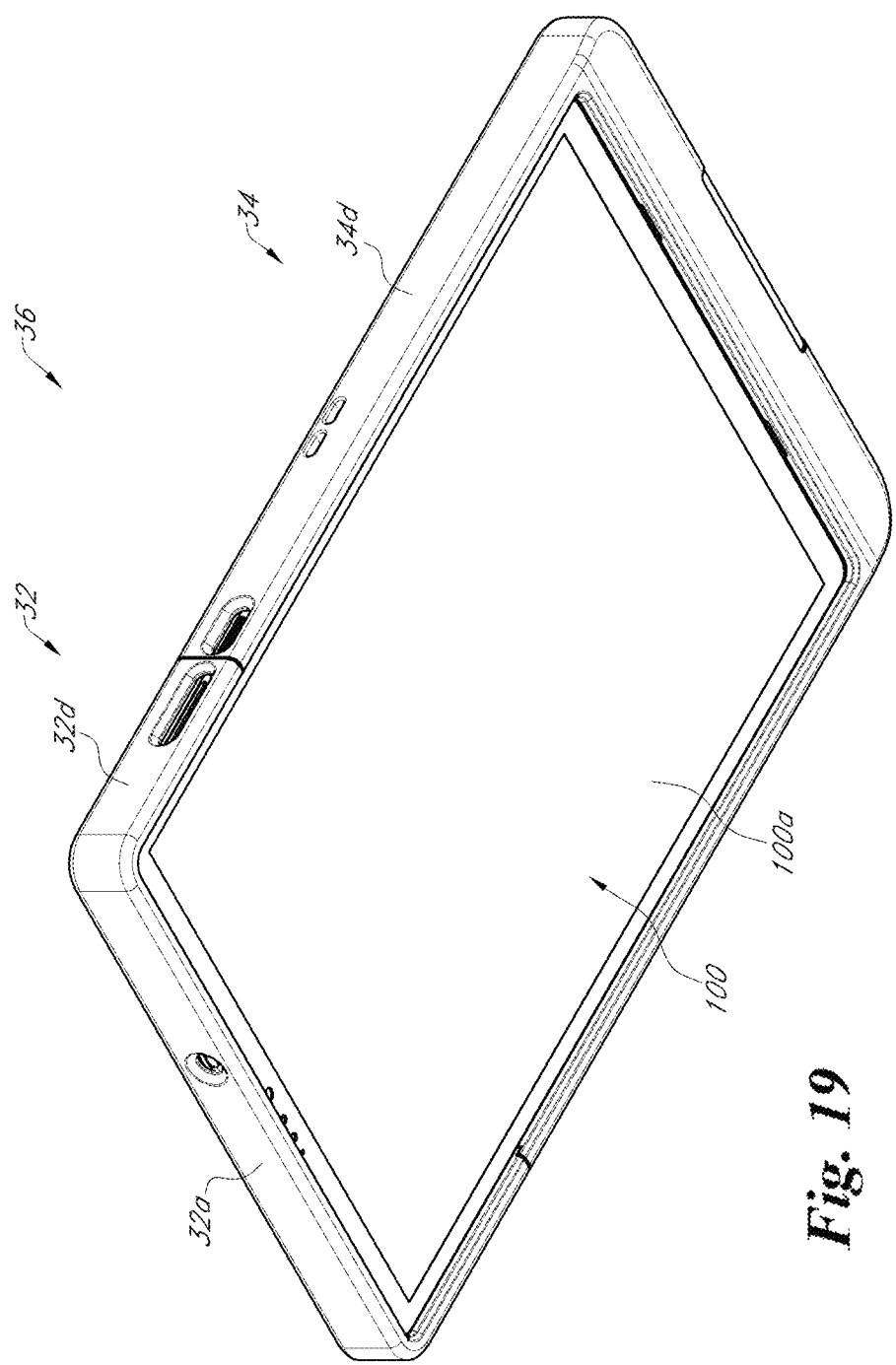
FIG. 19 is a front-rear perspective of a portion of the case assembly of FIG. 12 and the electronic device of FIG. 17.

Turning to FIG. 19, depicted therein is a front-rear perspective of a portion of device case assembly 30 and portable electronic tablet device implementation 100.

Figure 20:
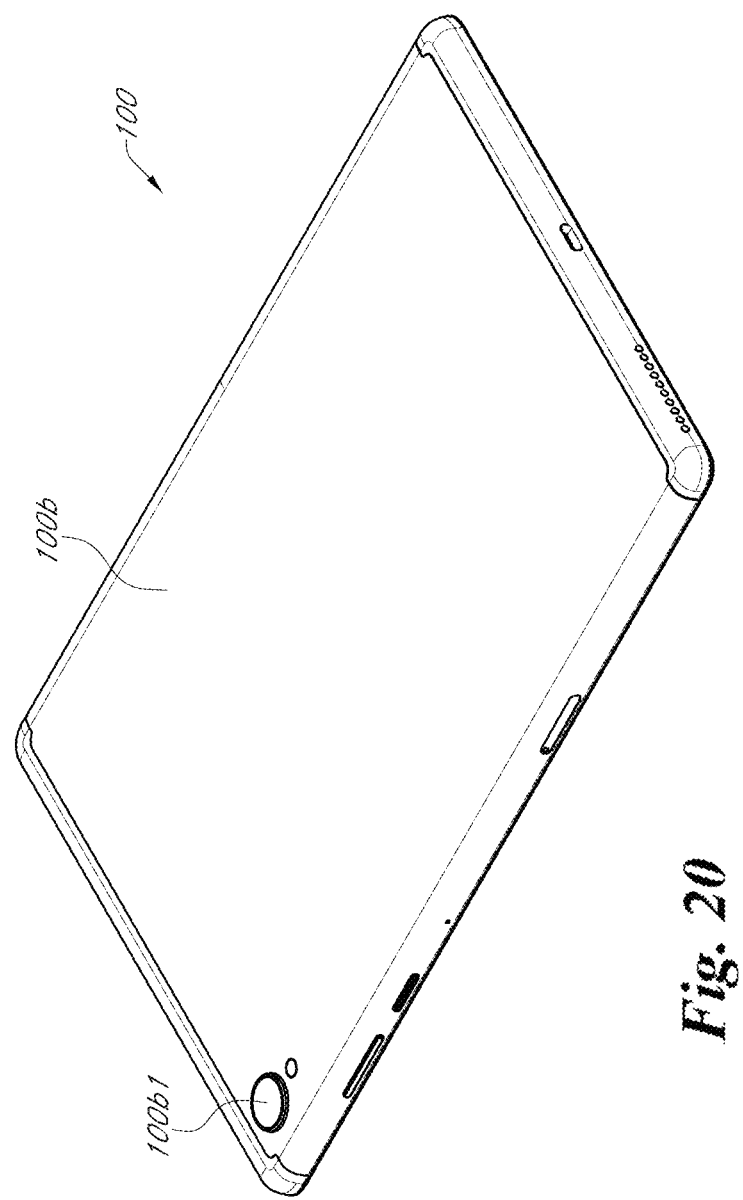
FIG. 20 is a bottom perspective view of the electronic device of FIG. 17.

Turning to FIG. 20, depicted therein is a bottom perspective view of portable electronic tablet device implementation 100. Depicted implementation of portable electronic tablet device implementation 100 is shown to include camera 100b1.

Figure 21:
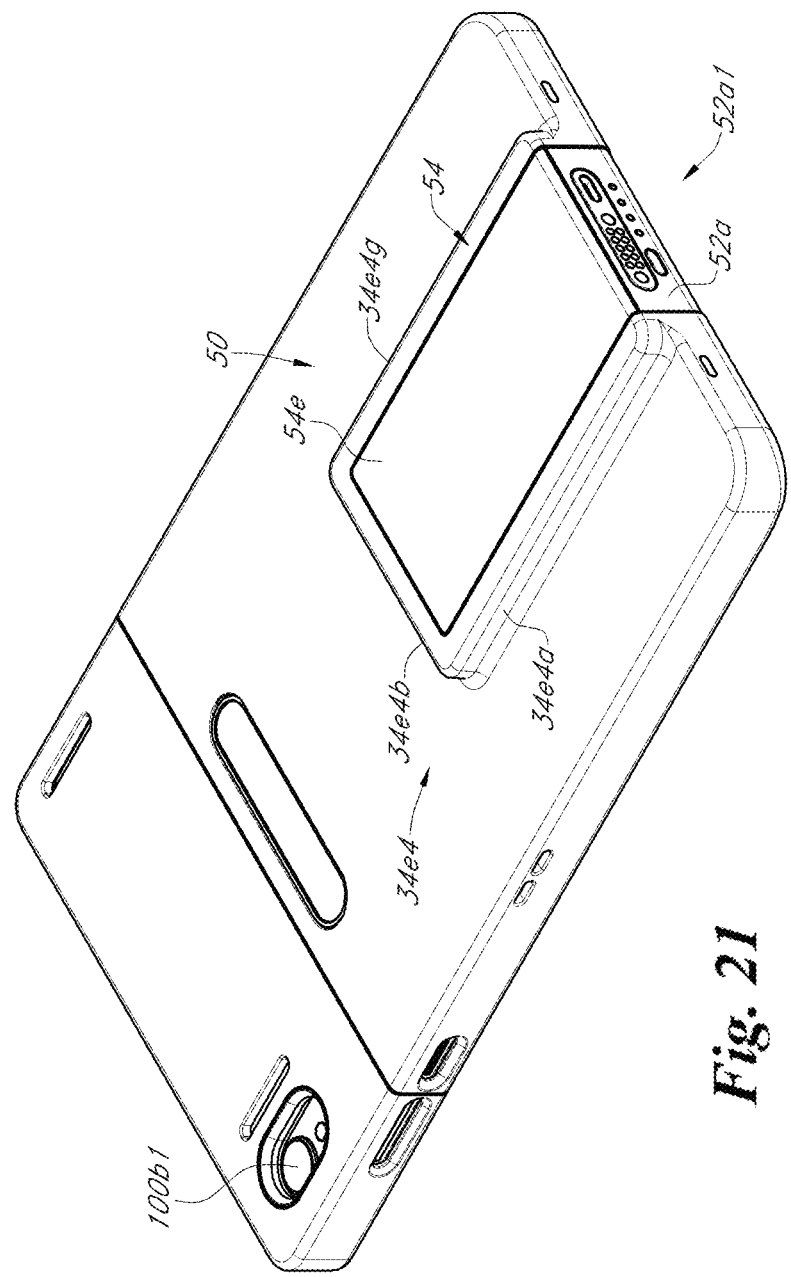
FIG. 21 is a rear-bottom perspective view of the accessory assembly of FIG. 1 coupled with the case assembly of FIG. 12 which is coupled with the electronic device of FIG. 17.

Turning to FIG. 21, depicted therein is a rear-bottom perspective view of accessory assembly 50 coupled with device case assembly 30 which is coupled with portable electronic tablet device implementation 100.

Figure 22:
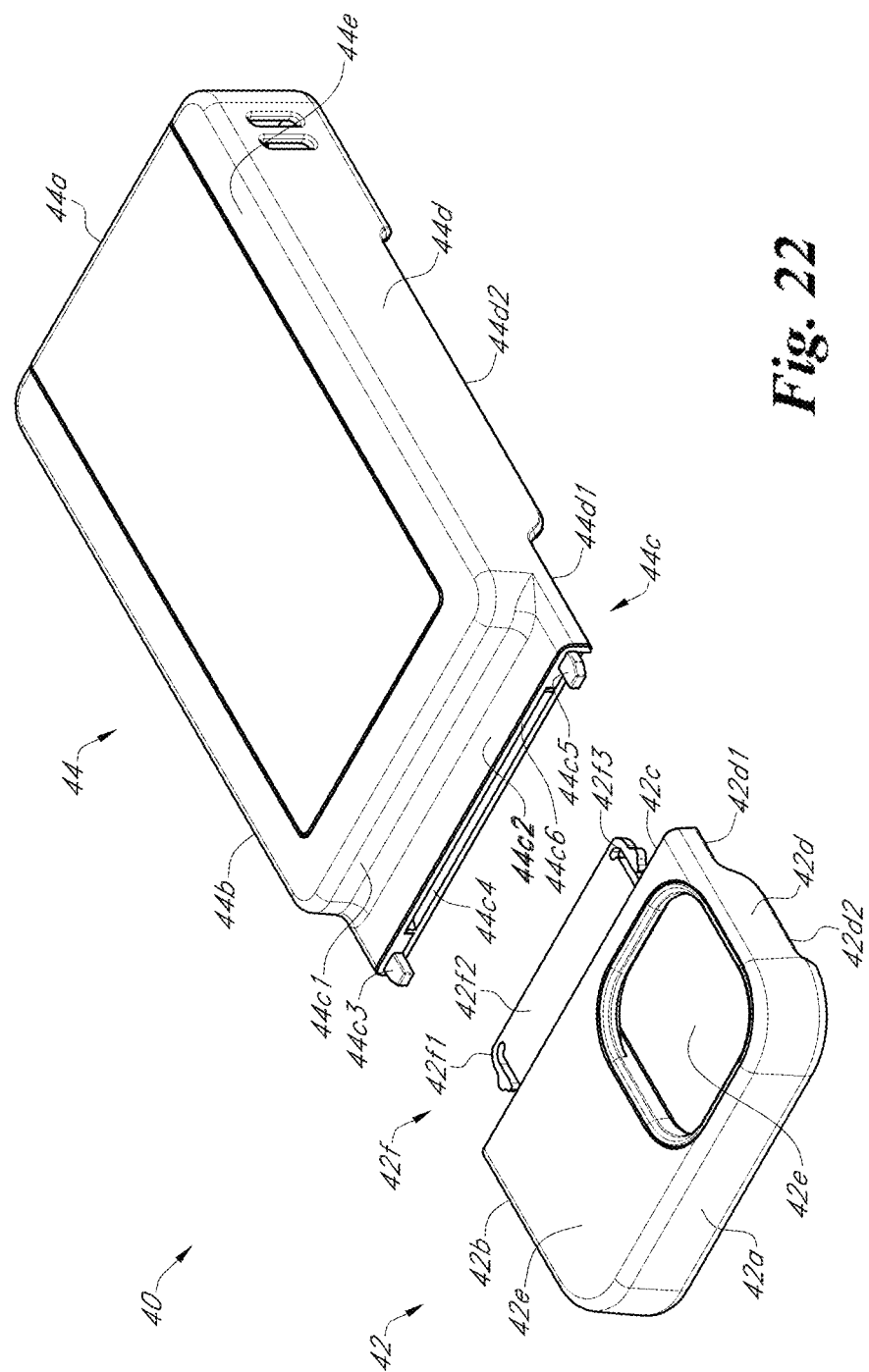
FIG. 22 is a partial-exploded-front-bottom-perspective view of a case assembly.

Turning to FIG. 22, depicted therein is a partial-exploded-front-bottom-perspective view of case assembly 40. Depicted implementation of case assembly 40 is shown to include cap assembly 42, and main assembly 44. Depicted implementation of cap assembly 42 is shown to include side wall 42a, side wall 42b, edge 42c, side wall 42d, aperture 42e, and tab member 42f. Depicted implementation of side wall 42d is shown to include recess 42d1, and recess 42d2. Depicted implementation of tab member 42f is shown to include tab body 42f2 with semi-flexible protrusion 42f1 and semi-flexible protrusion 42f3 extending therefrom.

Depicted implementation of main assembly 44 is shown to include side wall 44a, side wall 44b, side assembly 44c, side wall 44d, and base 44e. Depicted implementation of side assembly 44c is shown to include side wall portion 44c1, extended portion 44c2, protrusion 44c3, aperture 44c4, protrusion 44c5, and edge 44c6. Depicted implementation of side wall 44d is shown to include recess 44d1, and recess 44d2.

Figure 23:
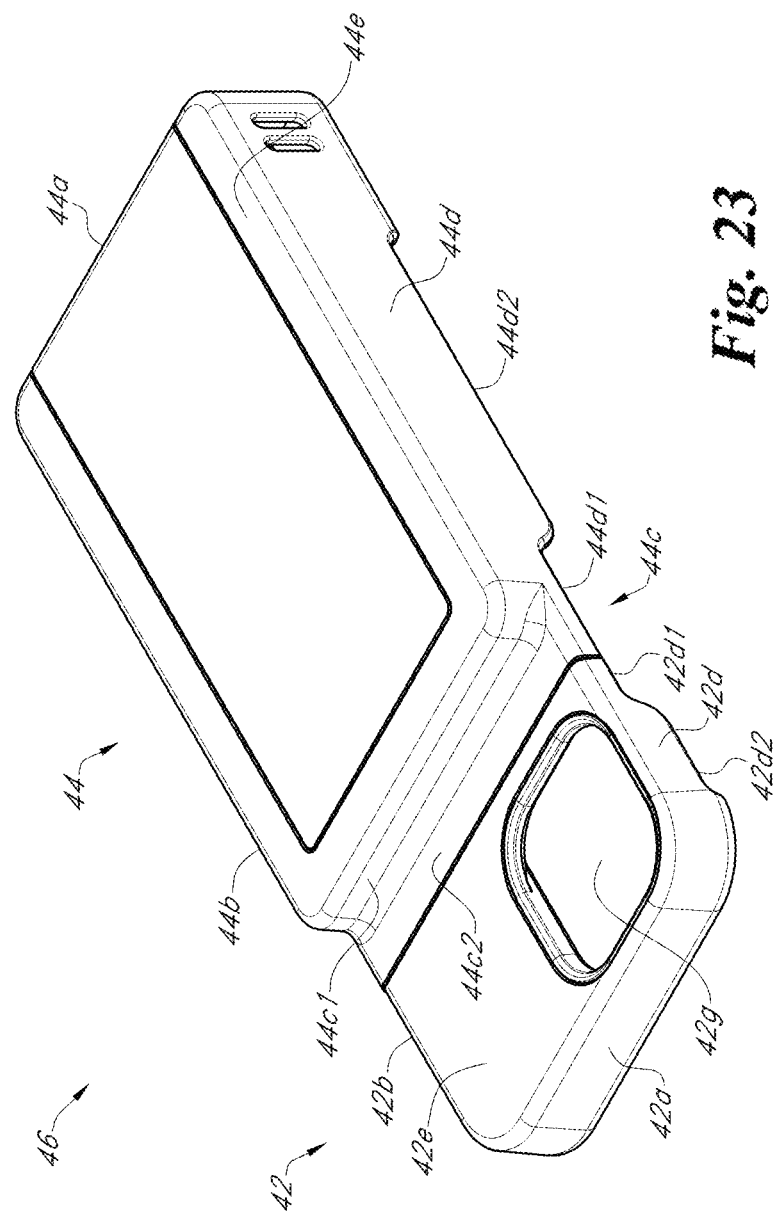
FIG. 23 is a front-bottom-perspective view of the case assembly of FIG. 22.

Turning to FIG. 23, depicted therein is a front-bottom-perspective view of case assembly 40.

Figure 24:
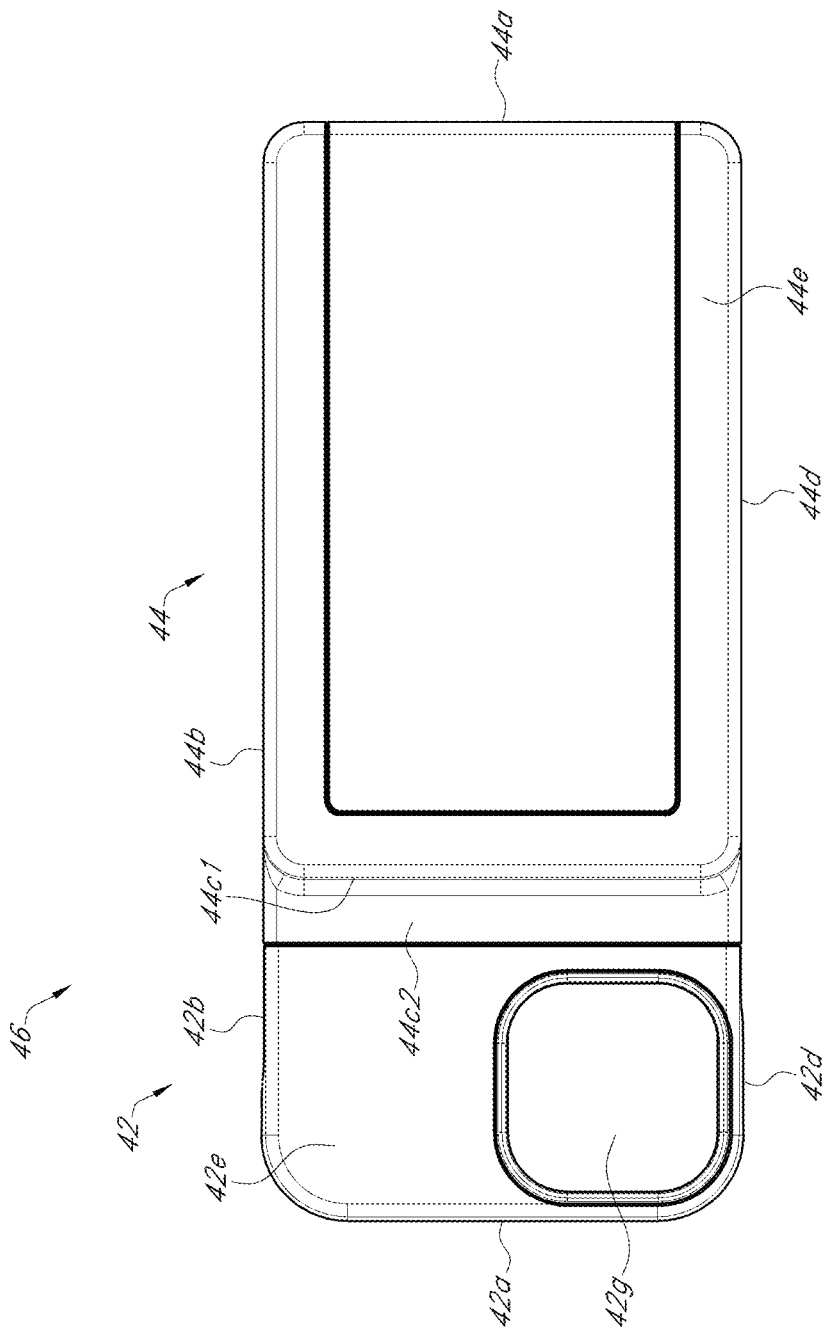
FIG. 24 is a bottom-plan view of the case assembly of FIG. 22.

Turning to FIG. 24, depicted therein is a bottom-plan view of case assembly 40.

Figure 25:
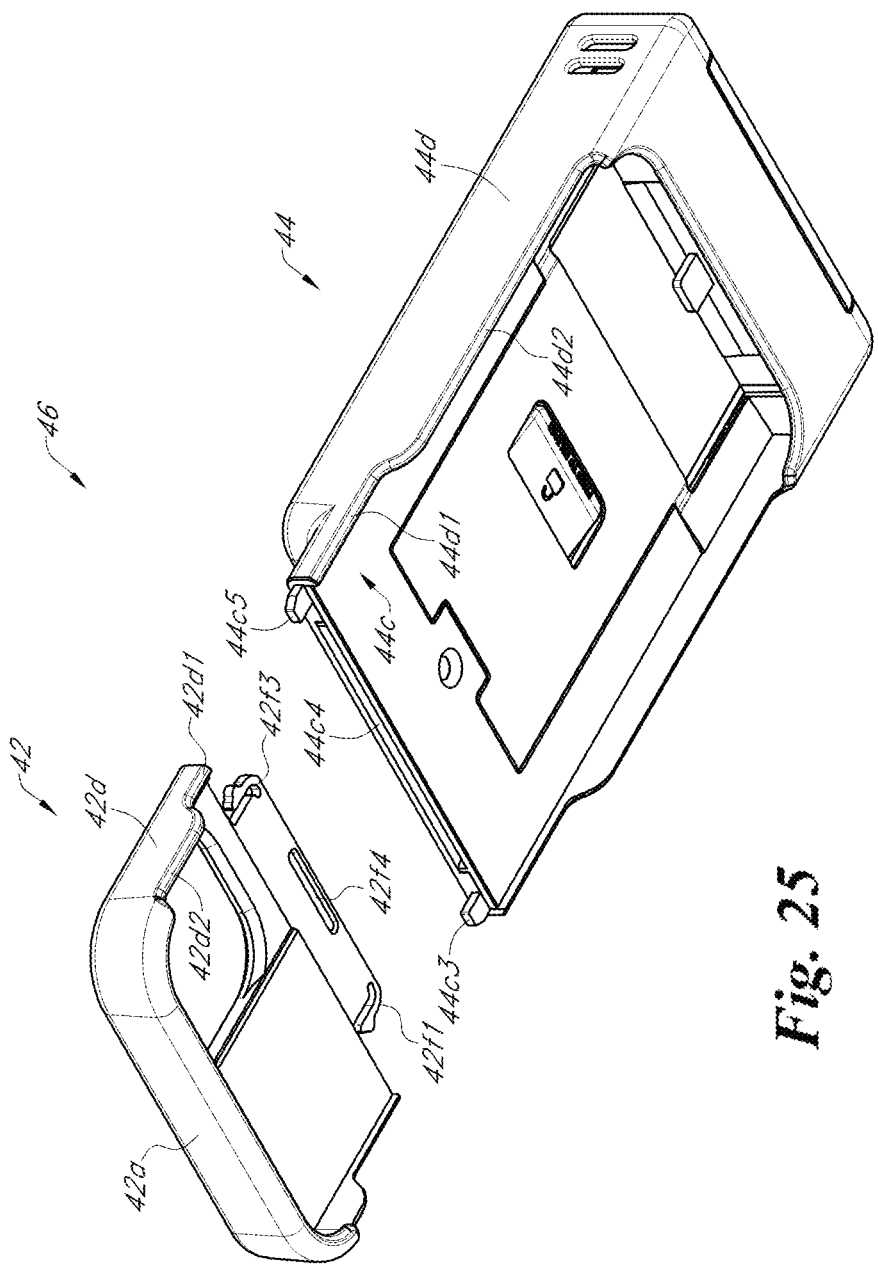
FIG. 25 is a partial-exploded-front-top-perspective view of the case assembly of FIG. 22.

Turning to FIG. 25, depicted therein is a partial-exploded-front-top-perspective view of case assembly 40. Depicted implementation of tab member 42f is shown to include recess 42f4.

Figure 26:
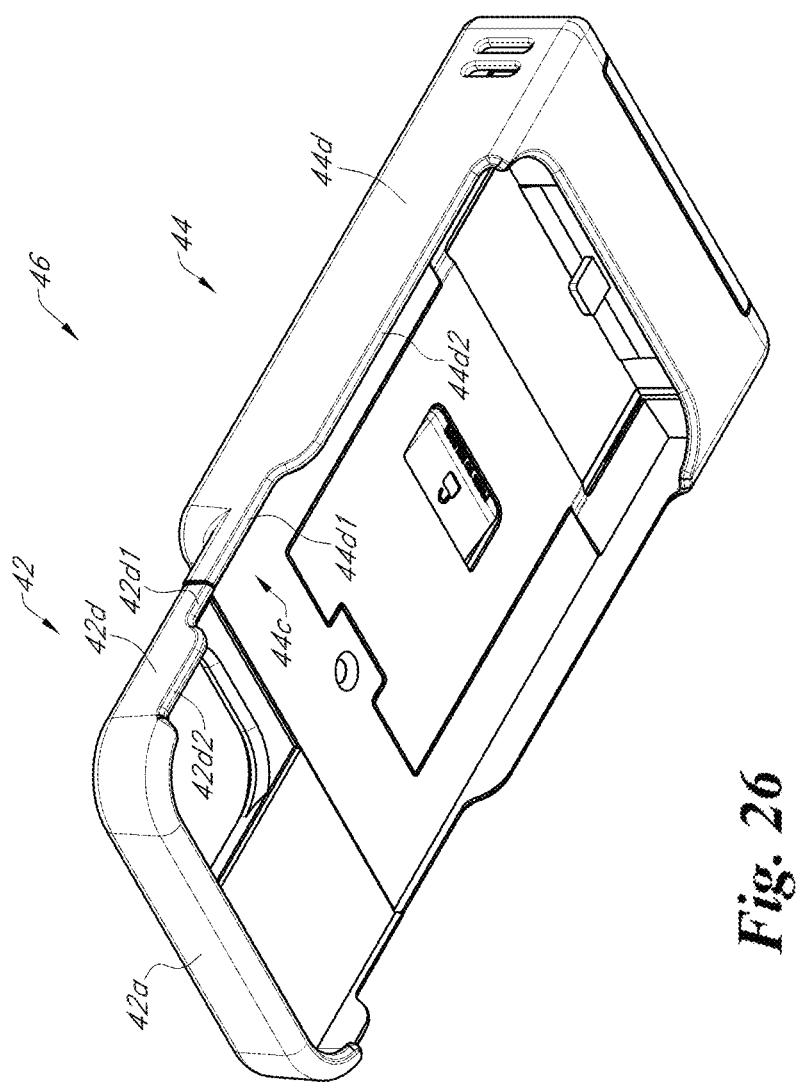
FIG. 26 is a front-top-perspective view of the case assembly of FIG. 22.

Turning to FIG. 26, depicted therein is a front-top-perspective view of case assembly 40.

Figure 27:
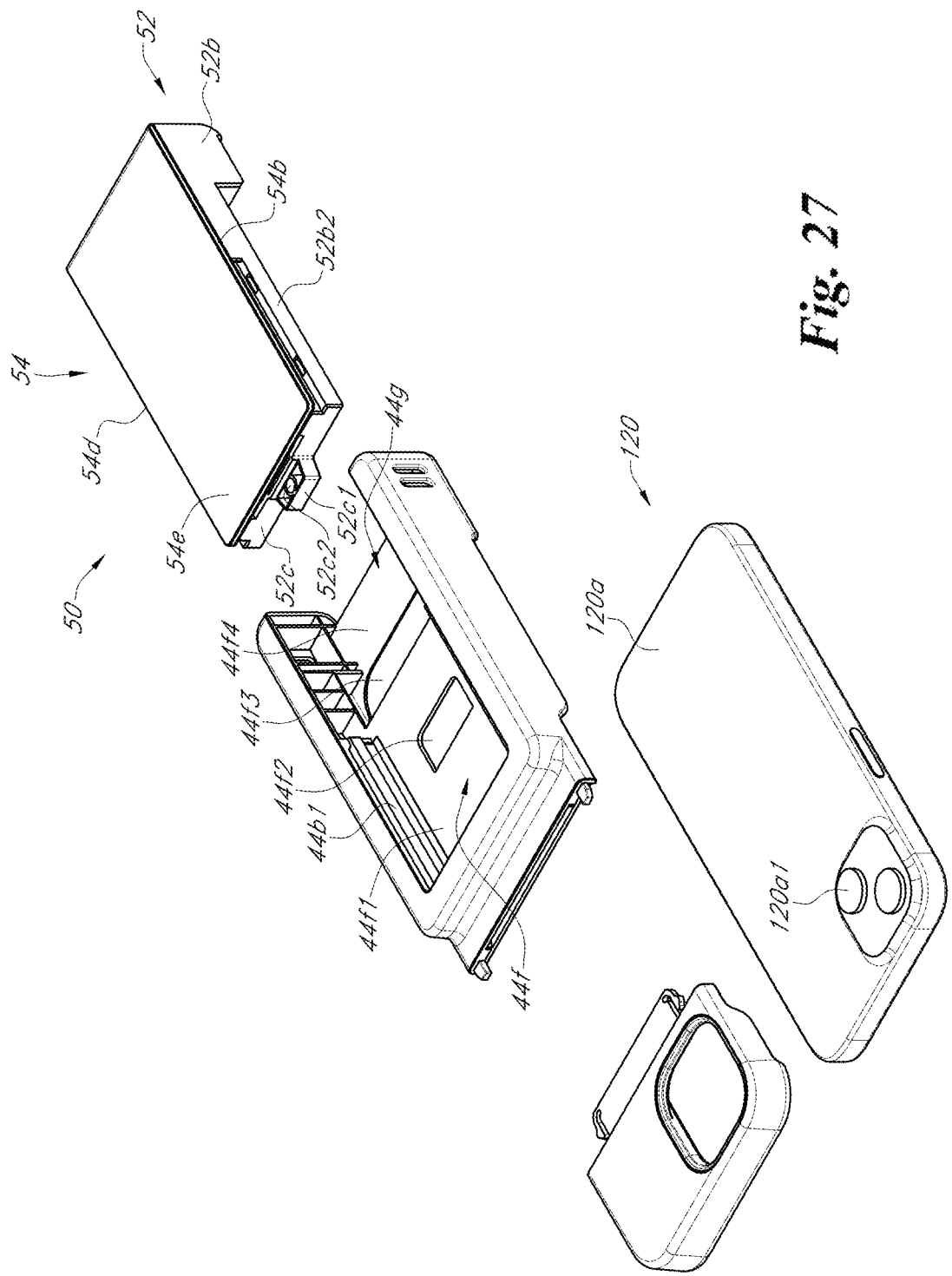
FIG. 27 is an exploded front-bottom perspective view of the case assembly of FIG. 22, the accessory assembly of FIG. 1, and an electronic device.

Turning to FIG. 27, depicted therein is an exploded front-bottom perspective view of case assembly 40, accessory assembly 50, and portable electronic phone device implementation 120. Depicted implementation of main assembly 44 is shown to include elongated protrusion 44b1, and interior area 44f with raised base portion 44f/1, aperture 44f/2, aperture 44f/3, and recessed base portion 44f/4. Depicted implementation of portable electronic phone device implementation 120 is shown to include back 120a with camera 120a1.

Figure 28:
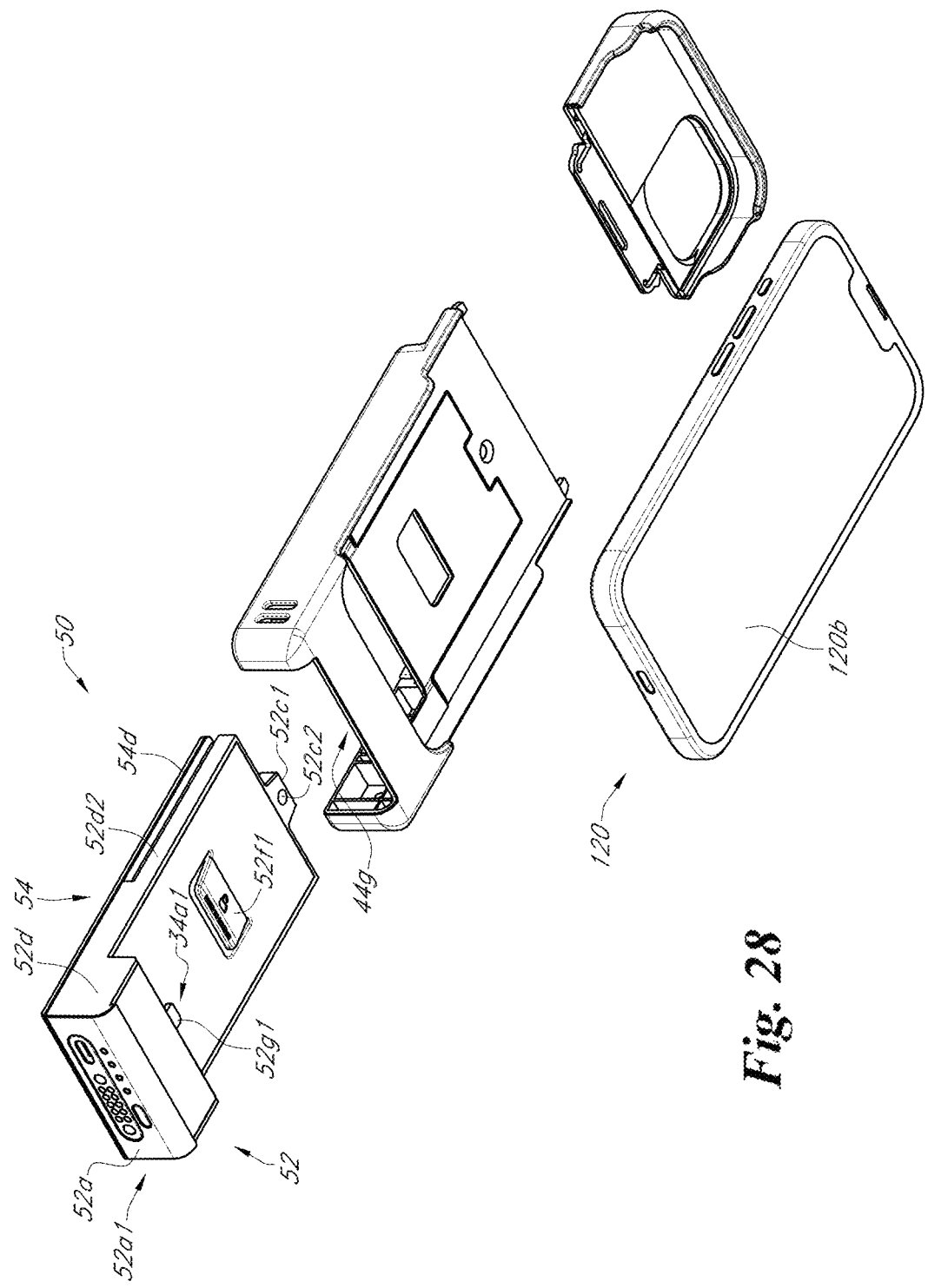
FIG. 28 is an exploded rear-top perspective view of the case assembly of FIG. 22, the accessory assembly of FIG. 1, and an electronic device.

Turning to FIG. 28, depicted therein is an exploded rear-top perspective view of case assembly 40, accessory assembly 50, and portable electronic phone device implementation 120. Depicted implementation of portable electronic phone device implementation 120 is shown to include front 120b.

Figure 29:
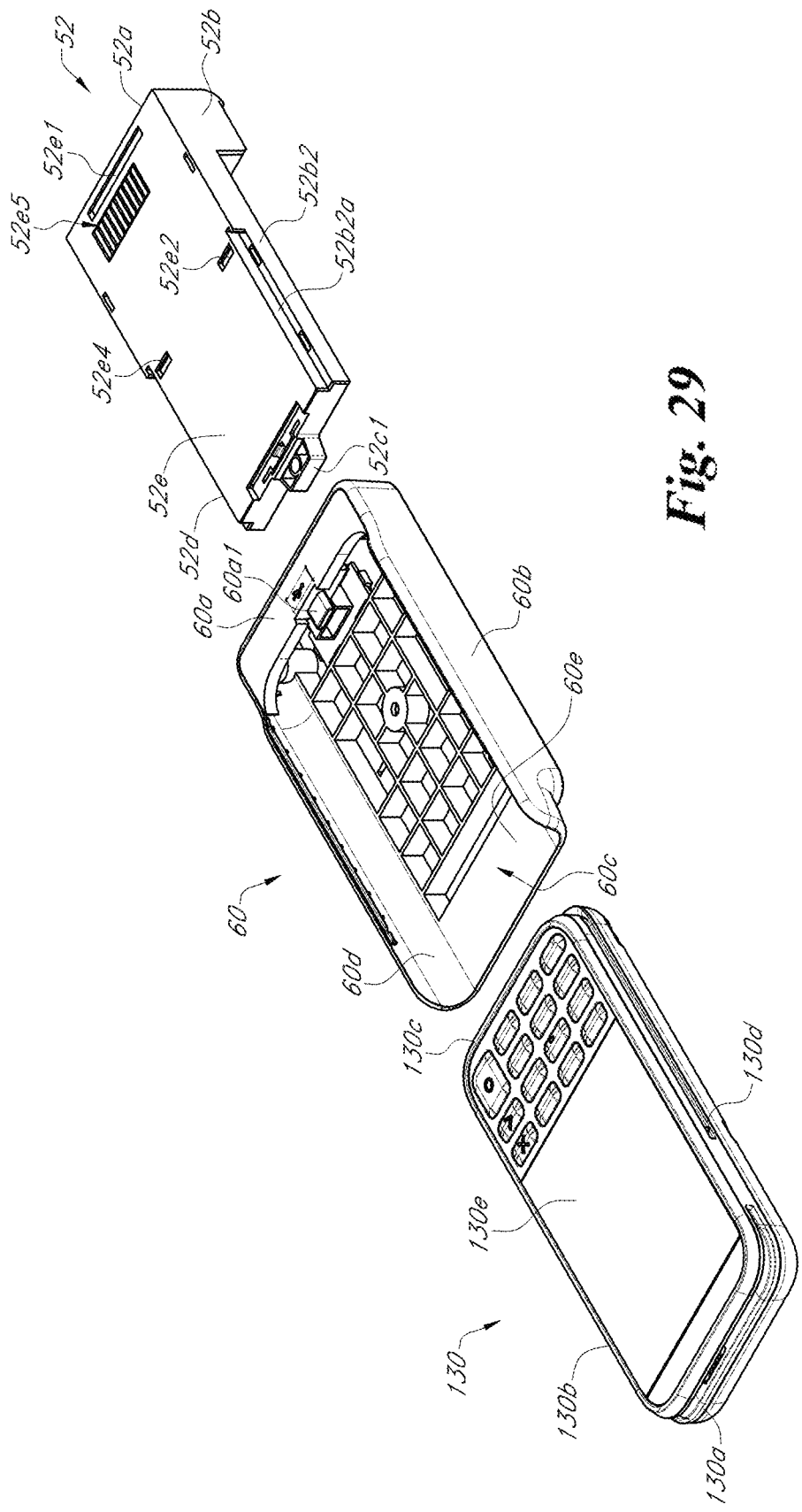
FIG. 29 is an exploded front-bottom perspective view of a portion of the accessory assembly of FIG. 1, an interface assembly, and a keypad assembly.

Turning to FIG. 29, depicted therein is an exploded front-bottom perspective view of a portion of accessory assembly 50, interface assembly 60, and payment card reader assembly 130. Depicted implementation of interface assembly 60 is shown to include end wall 60a with electric plug 60a1, side wall 60b, interior area 60c, side wall 60d, and base 60e. Depicted implementation of payment card reader assembly 130 is shown to include side 130a, side 130b, side 130c, side 130d, and side 130e.

Figure 30:
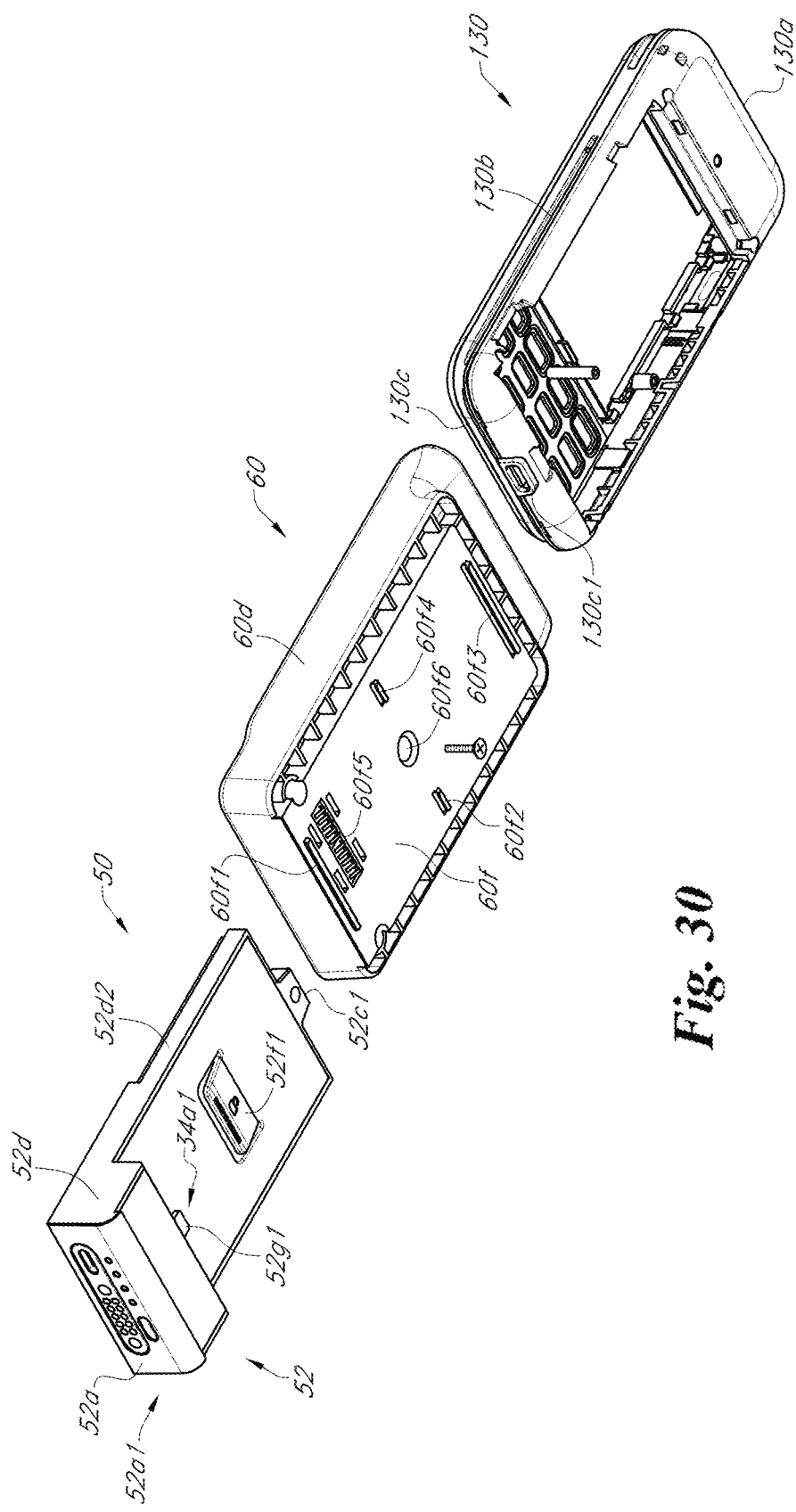
FIG. 30 is an exploded rear-top perspective view of a portion of the accessory assembly of FIG. 1, the interface assembly of FIG. 88, and the keypad assembly of FIG. 29.

Turning to FIG. 30, depicted therein is an exploded rear-top perspective view of a portion of accessory assembly 50, interface assembly 60, and payment card reader assembly 130. Depicted implementation of base 60f is shown to include prong 60f/1, prong 60f/2, prong 60f/3, prong 60f/4, electric contacts interface 60f/5, and aperture 60f/6. In implementations electric contacts interface 60f/5 is sized and positioned to engage with electric contacts interface 52e5 when interface assembly 60 is coupled with main assembly 52. Depicted implementation of side 130c is shown to include receptacle 130c1.

Figure 31:
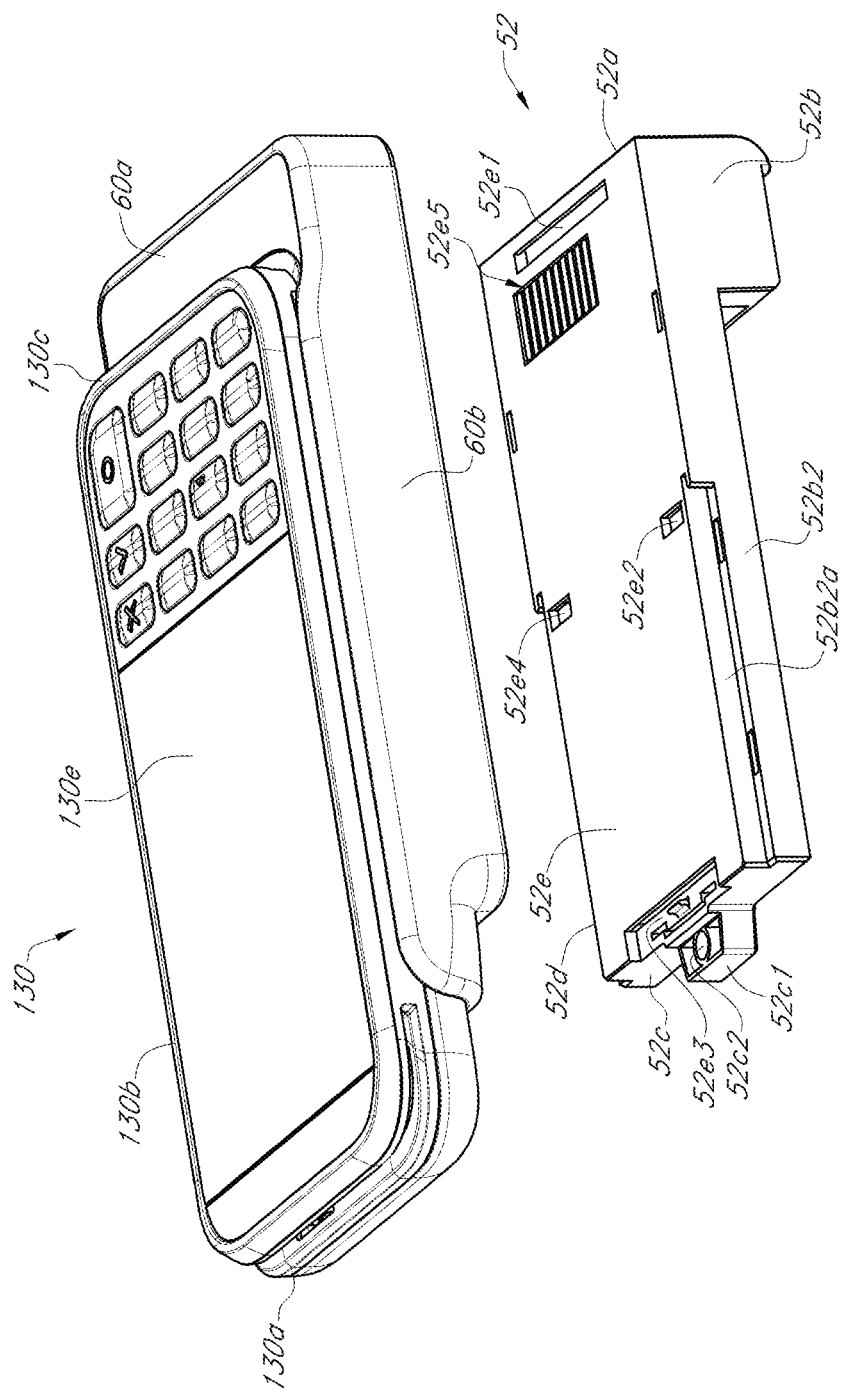
FIG. 31 is a partial exploded front-bottom perspective view of the keypad assembly of FIG. 29 coupled with the interface assembly of FIG. 29, and uncoupled with a portion of the accessory assembly of FIG. 1.

Turning to FIG. 31, depicted therein is a partial exploded front-bottom perspective view of payment card reader assembly 130, coupled with interface assembly 60, and uncoupled with a portion of accessory assembly 50.

Figure 32:
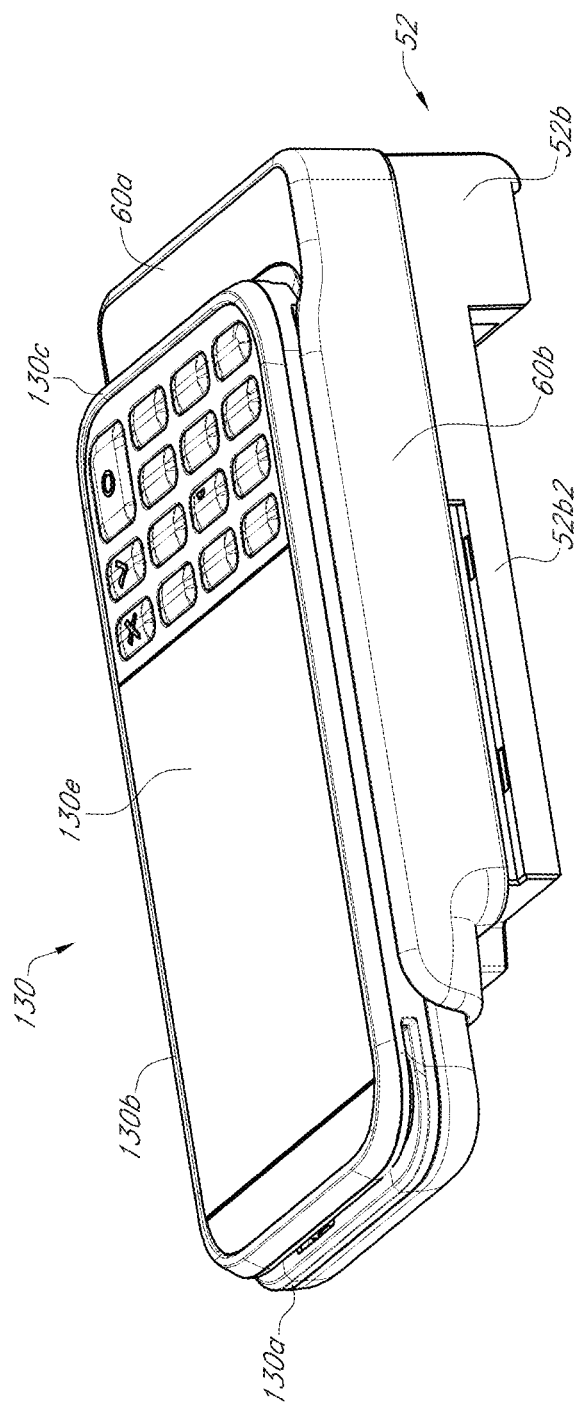
FIG. 32 is a front-bottom perspective view of the keypad assembly of FIG. 29 coupled with the interface assembly of FIG. 29, and coupled with a portion of the accessory assembly of FIG. 1.

Turning to FIG. 32, depicted therein is a front-bottom perspective view of payment card reader assembly 130 coupled with interface assembly 60, and coupled with a portion of accessory assembly 50.

Figure 33:
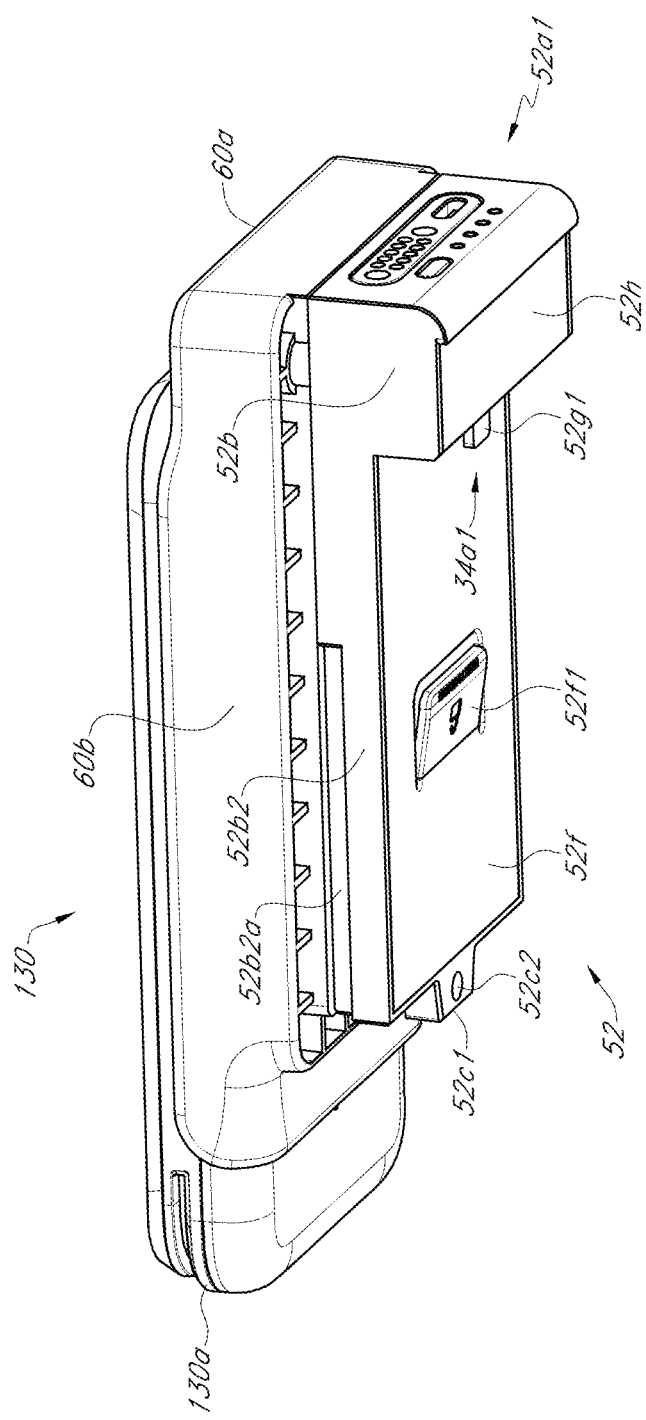
FIG. 33 is a partial exploded rear-top perspective view of the keypad assembly of FIG. 29 coupled with the interface assembly of FIG. 29, and uncoupled with a portion of the accessory assembly of FIG. 1.

Turning to FIG. 33, depicted therein is a partial exploded rear-top perspective view of payment card reader assembly 130, coupled with interface assembly 60, and uncoupled with a portion of accessory assembly 50.

Figure 34:
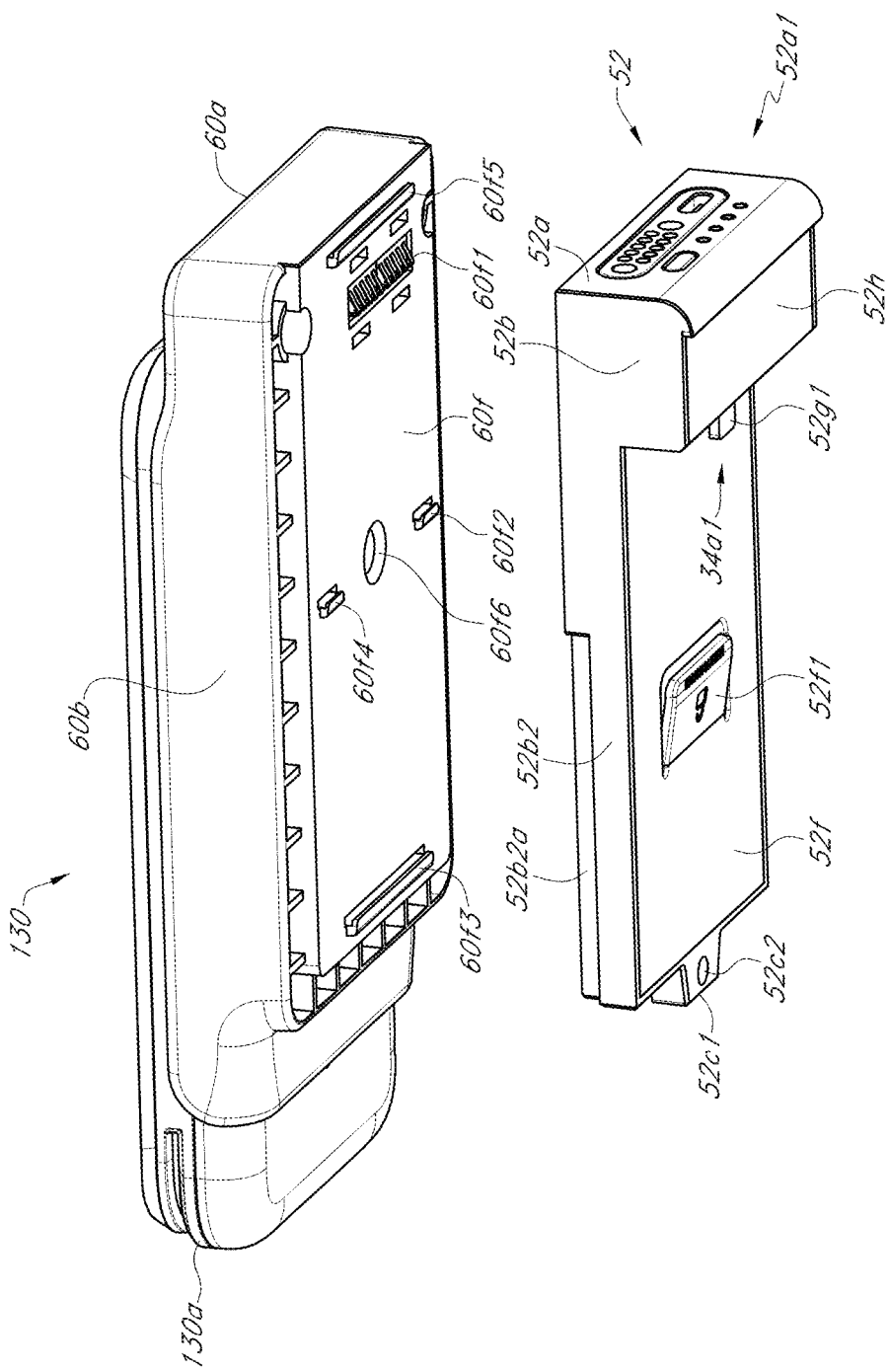
FIG. 34 is a rear-top perspective view of the keypad assembly of FIG. 29 coupled with the interface assembly of FIG. 29, and coupled with a portion of the accessory assembly of FIG. 1.

Turning to FIG. 34, depicted therein is a rear-top perspective view of payment card reader assembly 130 coupled with interface assembly 60, and coupled with a portion of accessory assembly 50.

Figure 35:
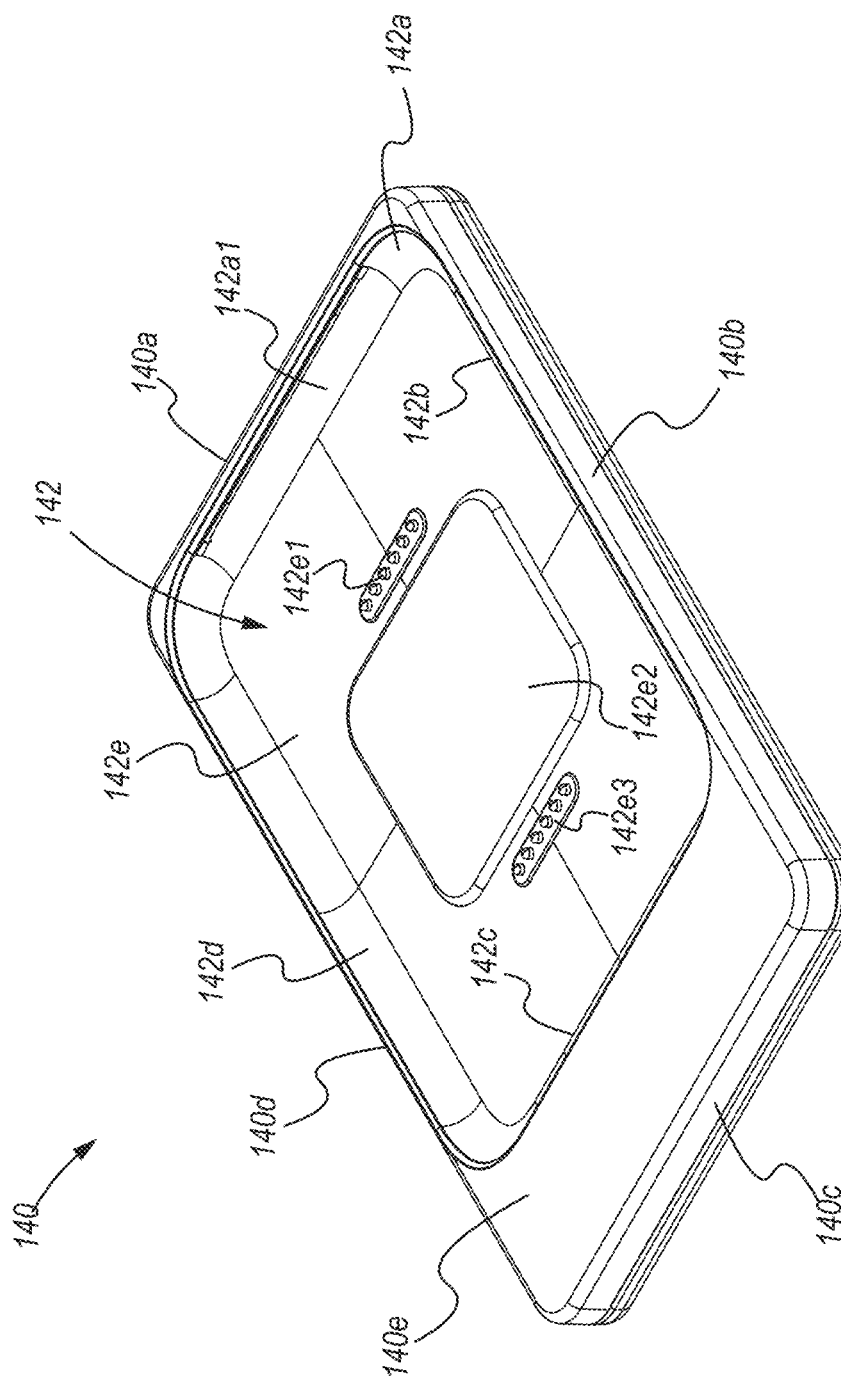
FIG. 35 is a top perspective view of an adapter assembly.

Turning to FIG. 35, depicted therein is a top perspective view of adapter assembly 140. Depicted implementation of adapter assembly 140 is shown to include side 140a, side 140b, side 140c, side 140d, upper face 140e, and depressed portion 142. Depicted implementation of depressed portion 142 is shown to include side 142a with engagement 142a1, side 142b, side 142c, side 142d, and base 142e with electrical interface 142e1, coupling surface 142e2, and electrical interface 142e3.

Figure 36:
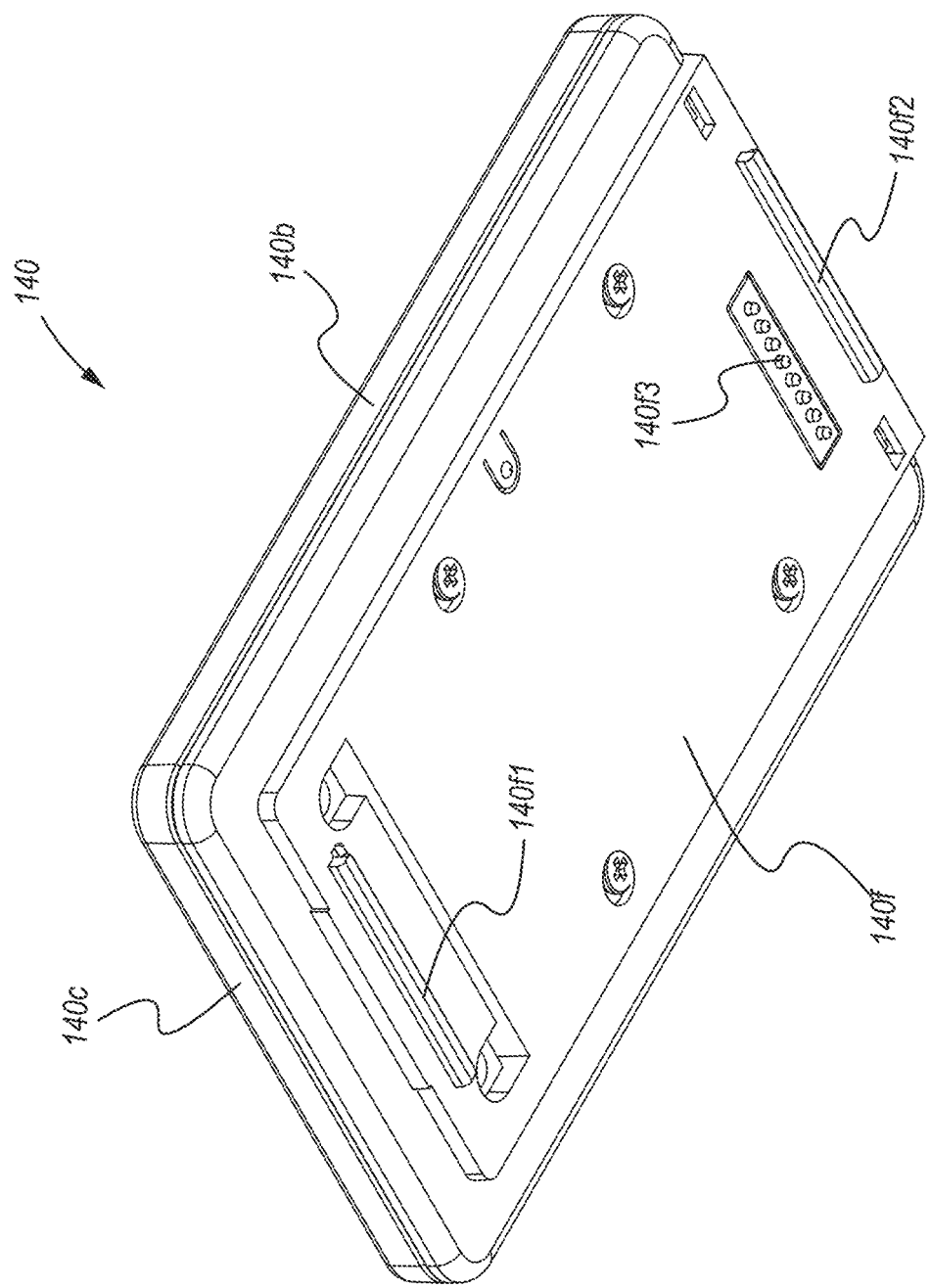
FIG. 36 is a bottom perspective view of the adapter assembly of FIG. 35.

Turning to FIG. 36, depicted therein is a bottom perspective view of adapter assembly 140. Depicted implementation of adapter assembly 140 is shown to include base 140f with engagement rail 140f/1, engagement rail 140f/2, and electrical interface 140f/3.

Figure 37:
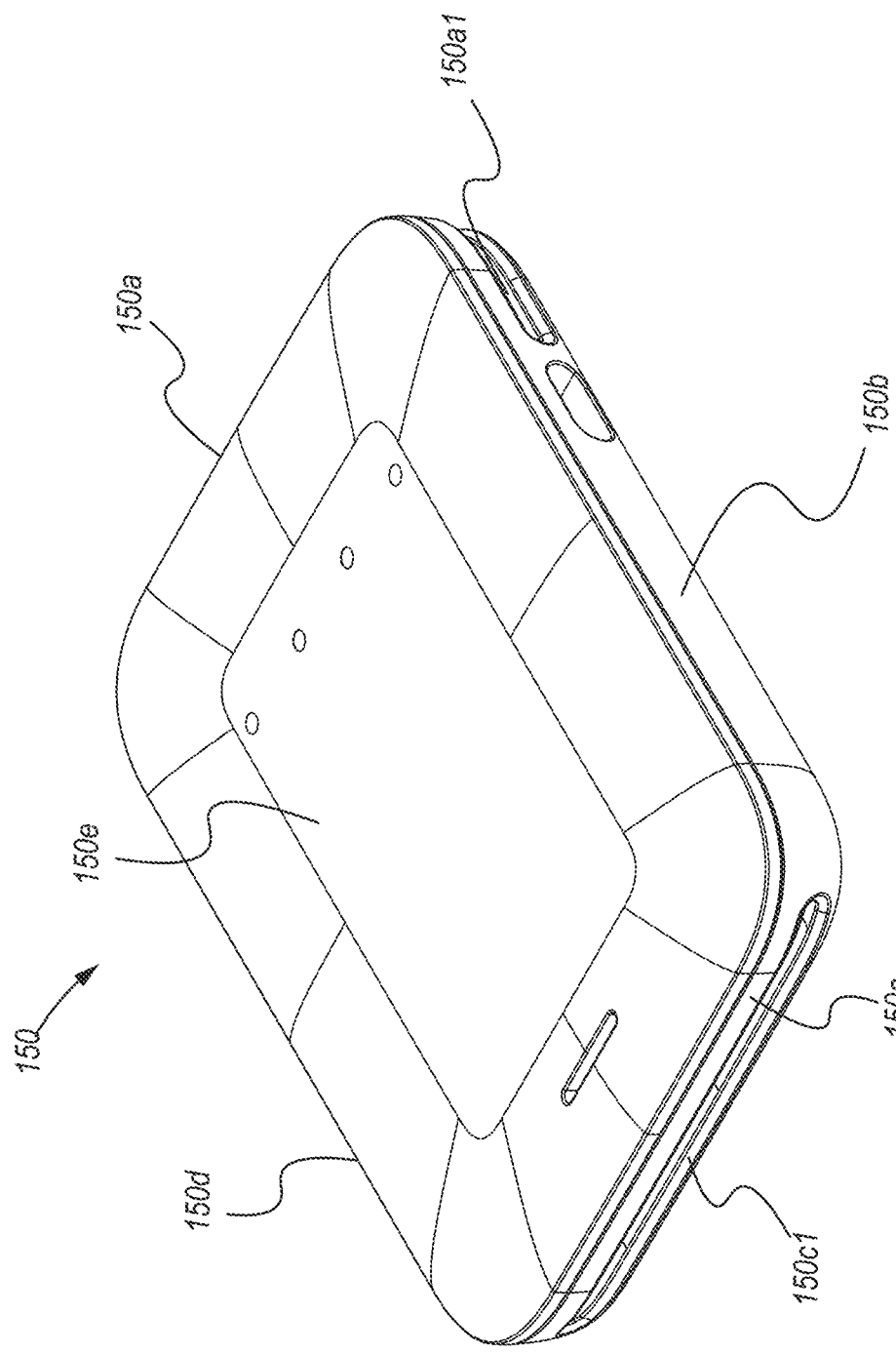
FIG. 37 is a first top perspective view of a card reader assembly.

Turning to FIG. 37, depicted therein is a first top perspective view of card reader assembly 150. Depicted implementation of card reader assembly 150 is shown to include side 150a with card slot 150a1, side 150b, side 150c with card slot 150c1, side 150d, and upper face 150e.

Figure 38:
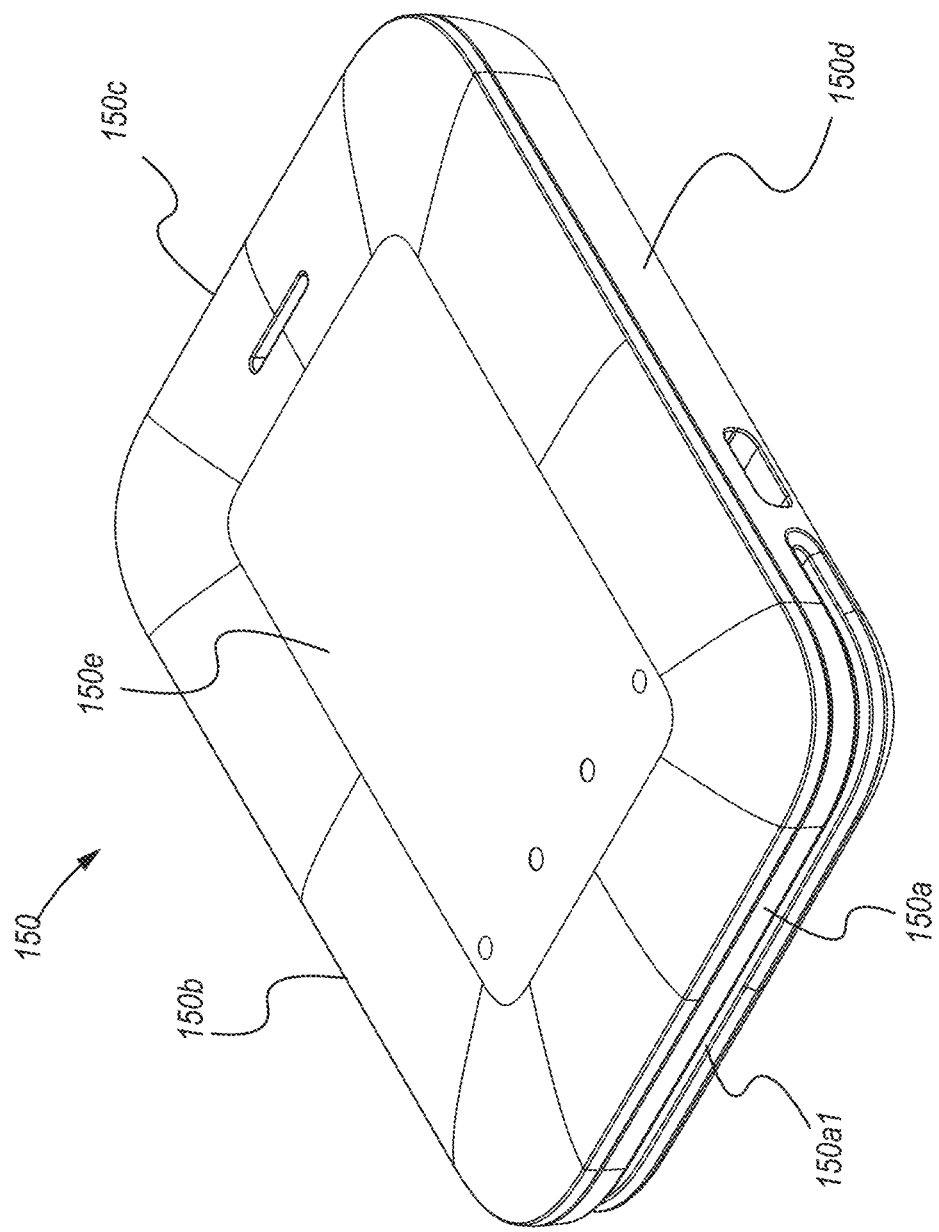
FIG. 38 is a second top perspective view of the card reader assembly of FIG. 37.

Turning to FIG. 38, depicted therein is a second top perspective view of card reader assembly 150.

Figure 39:
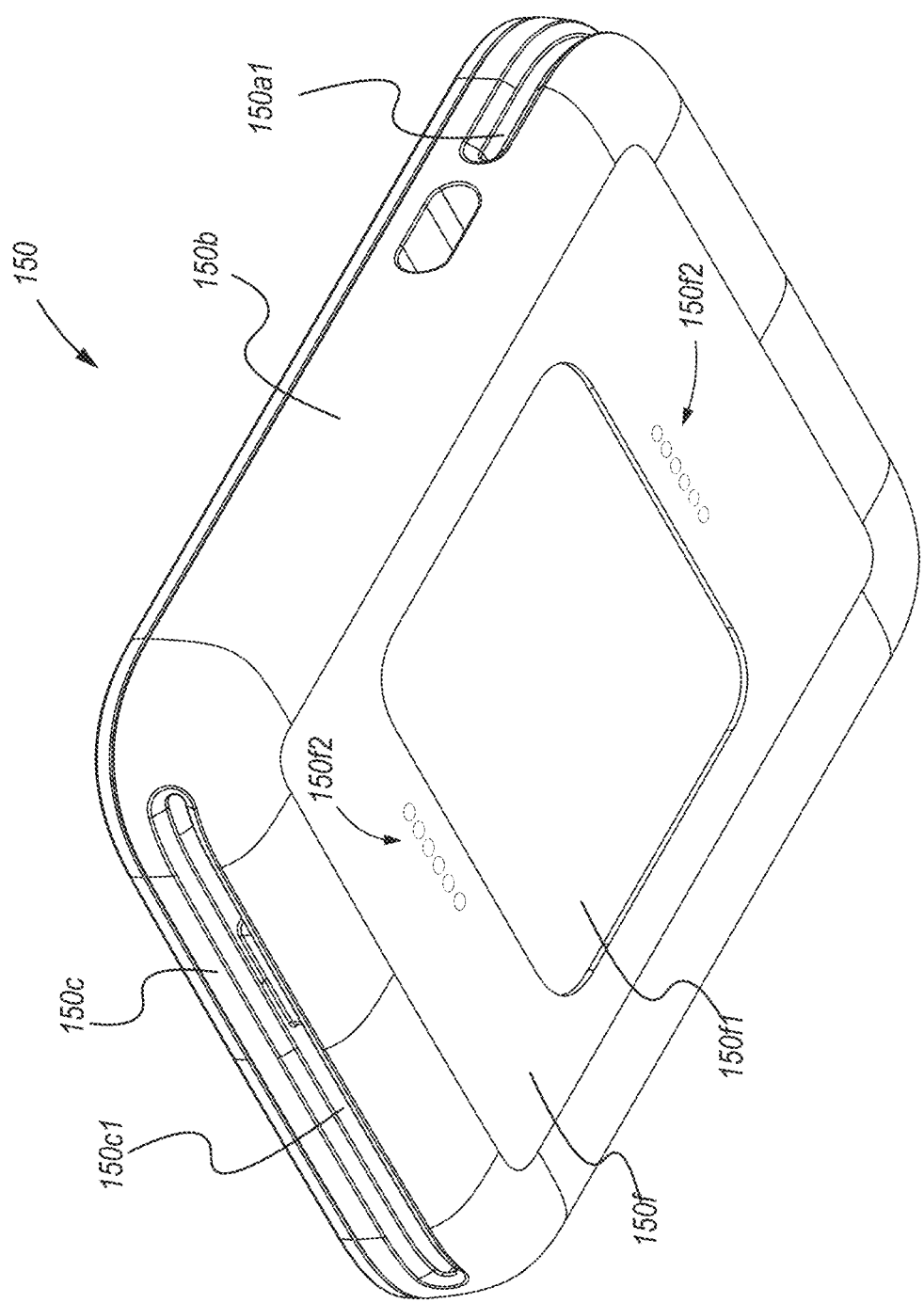
FIG. 39 is a first bottom perspective view of the card reader assembly of FIG. 37.

Turning to FIG. 39, depicted therein is a first bottom perspective view of card reader assembly 150. Depicted implementation of card reader assembly 150 is shown to include lower face 150f with coupling surface 150f/1, and electrical interface 150f/2.

Figure 40:
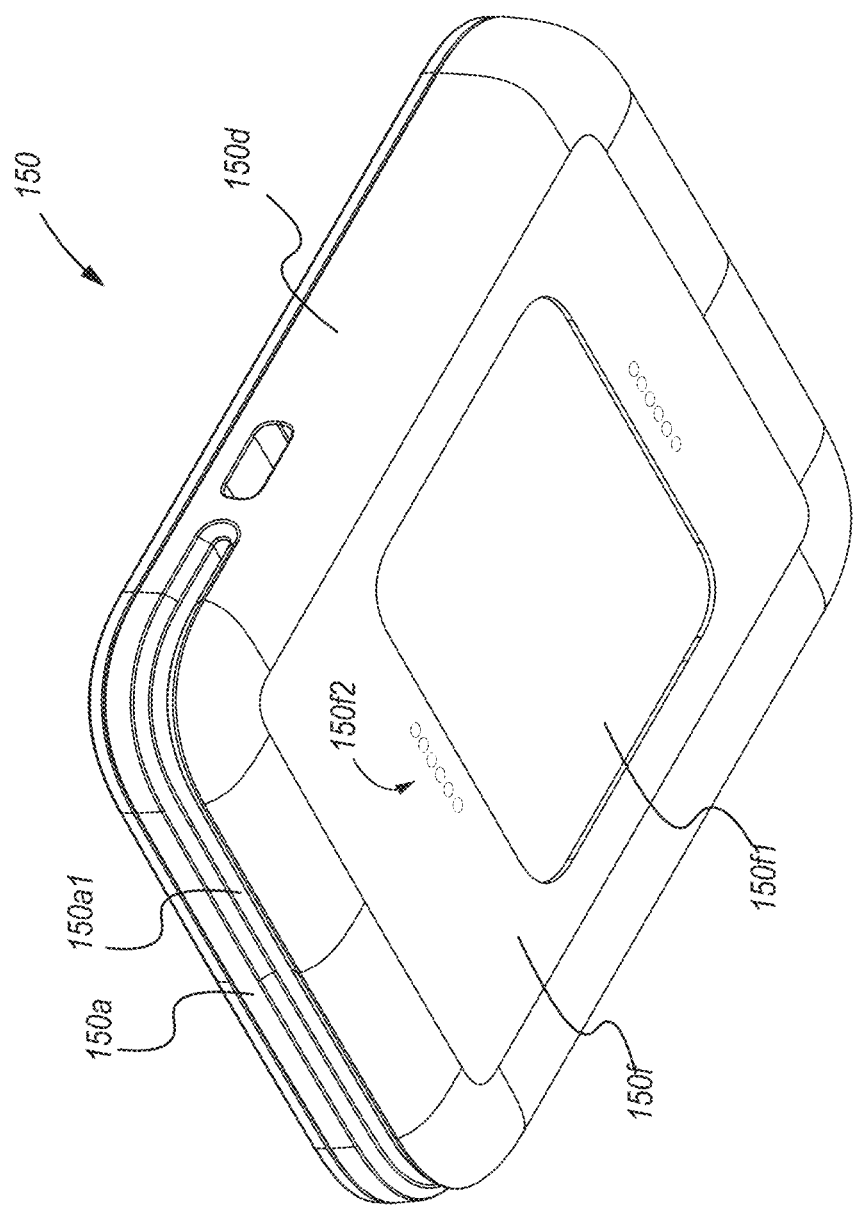
FIG. 40 is a second bottom perspective view of the card reader assembly of FIG. 37.

Turning to FIG. 40, depicted therein is a second bottom perspective view of card reader assembly 150.

Figure 41:
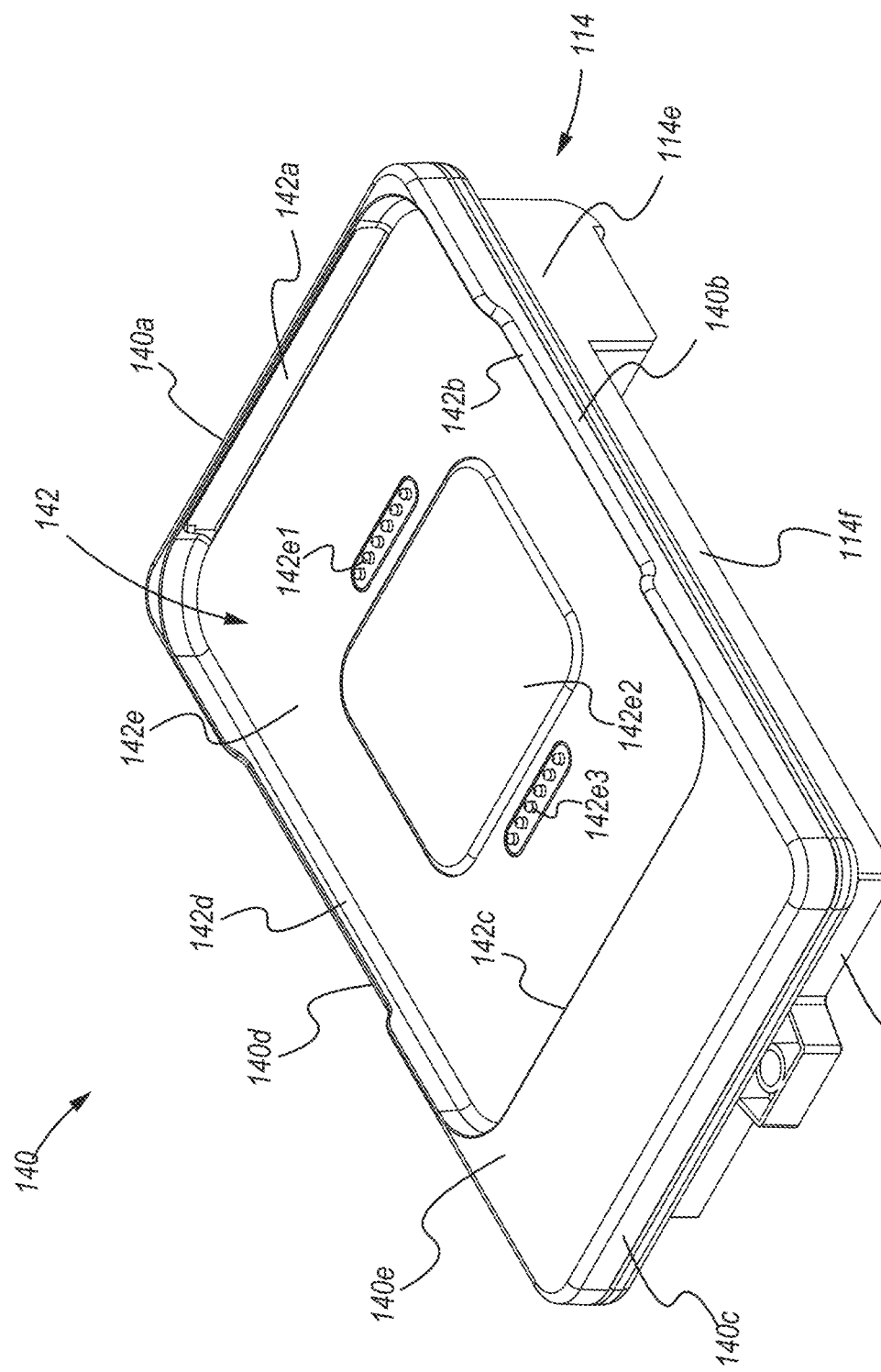
FIG. 41 is a top perspective view of the adapter assembly of FIG. 35 coupled with the accessory assembly of FIG. 1.

Turning to FIG. 41, depicted therein is a top perspective view of adapter assembly 140 coupled with accessory assembly 114.

Figure 42:
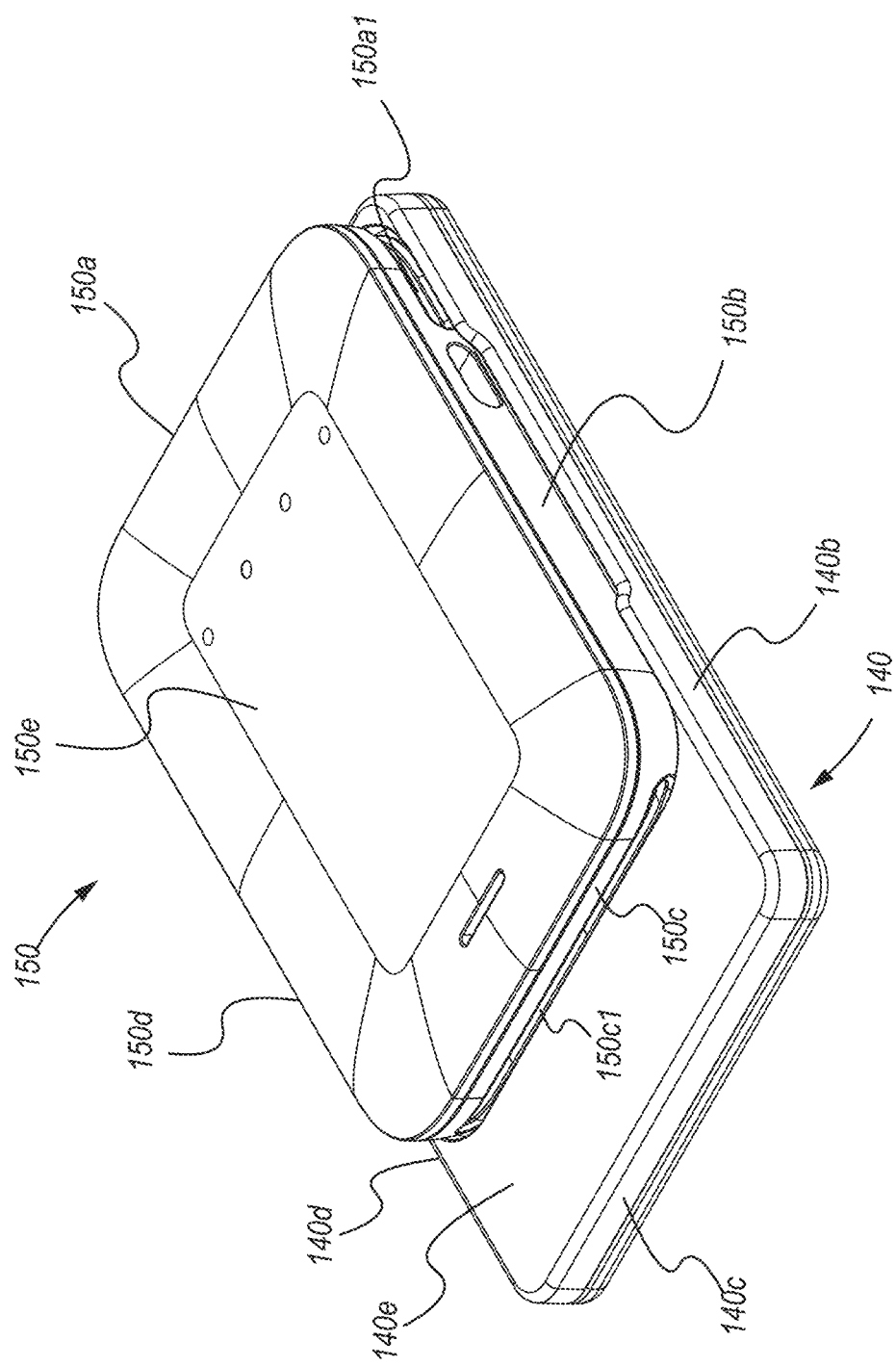
FIG. 42 is a first top perspective view of the card reader assembly of FIG. 37 coupled with the adapter assembly of FIG. 35.

Turning to FIG. 42, depicted therein is a first top perspective view of card reader assembly 150 coupled with adapter assembly 140.

Figure 43:
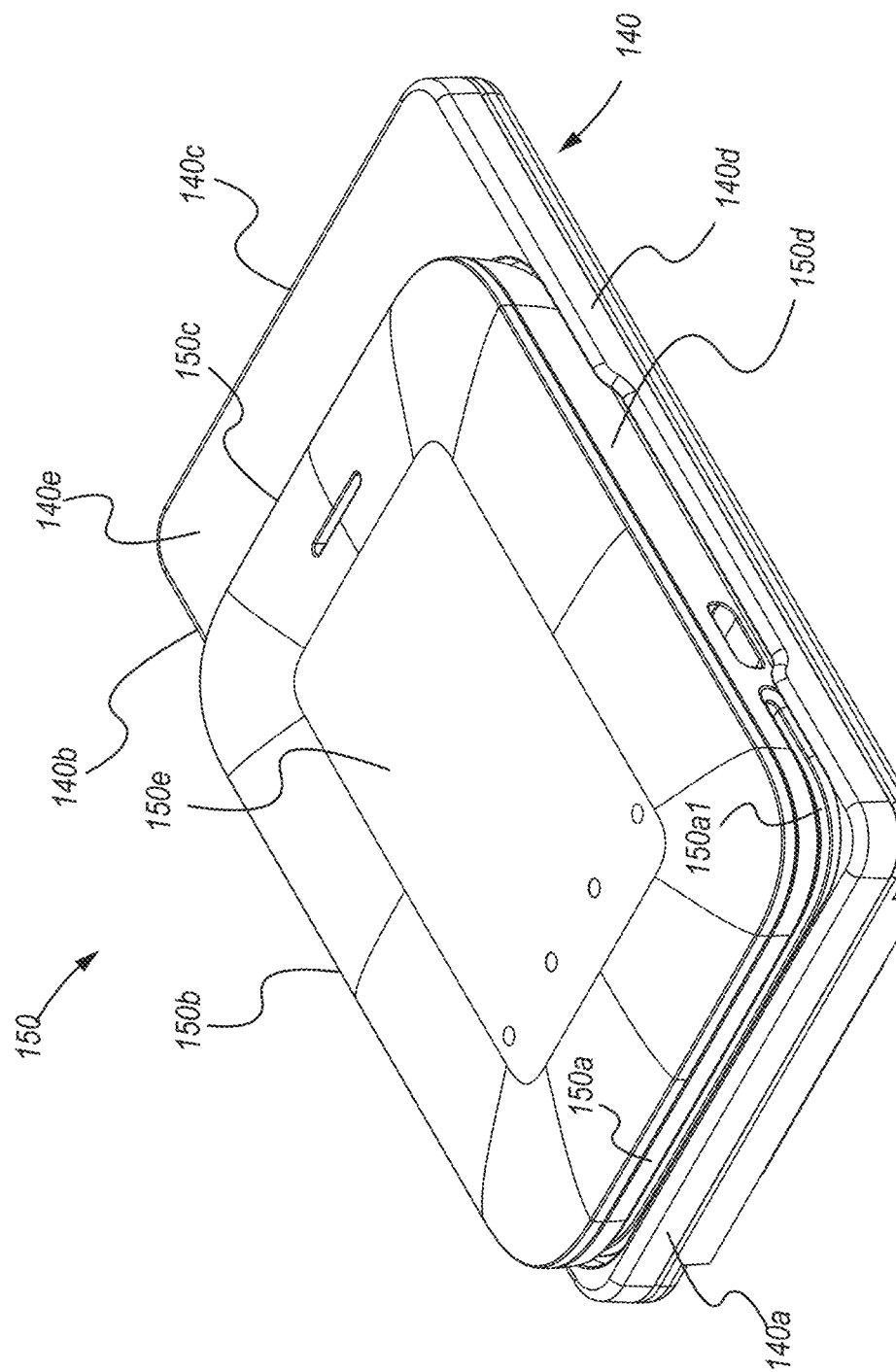
FIG. 43 is a second top perspective view of the card reader assembly of FIG. 37 coupled with the adapter assembly of FIG. 35.

Turning to FIG. 43, depicted therein is a second top perspective view of card reader assembly 150 coupled with adapter assembly 140.

Figure 44:
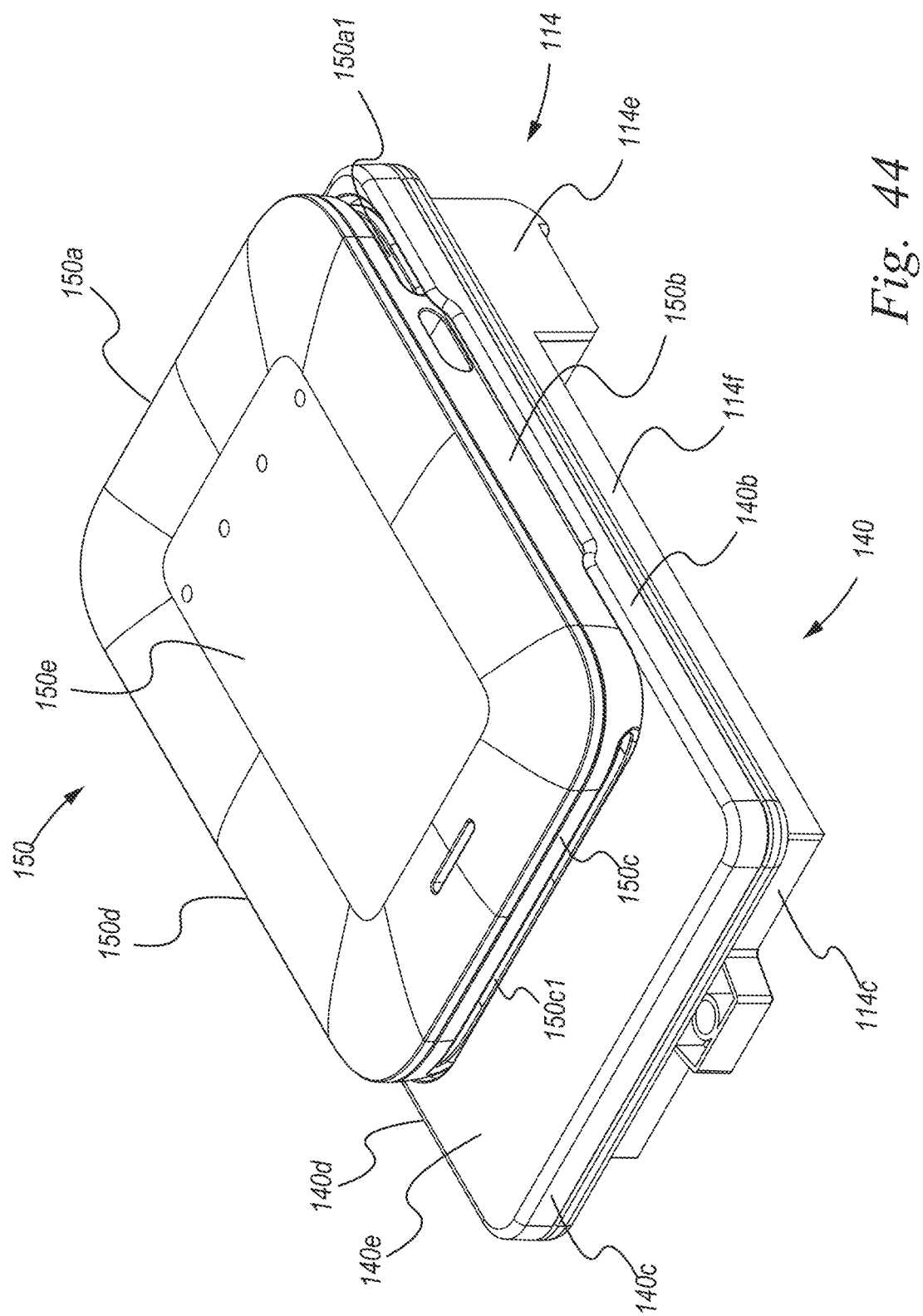
FIG. 44 is a top perspective view of the card reader assembly of FIG. 37 coupled with the adapter assembly of FIG. 35 coupled with the accessory assembly of FIG. 1.

Turning to FIG. 44, depicted therein is a top perspective view of card reader assembly 150 coupled with adapter assembly 140 coupled with accessory assembly 114.

Figure 45:
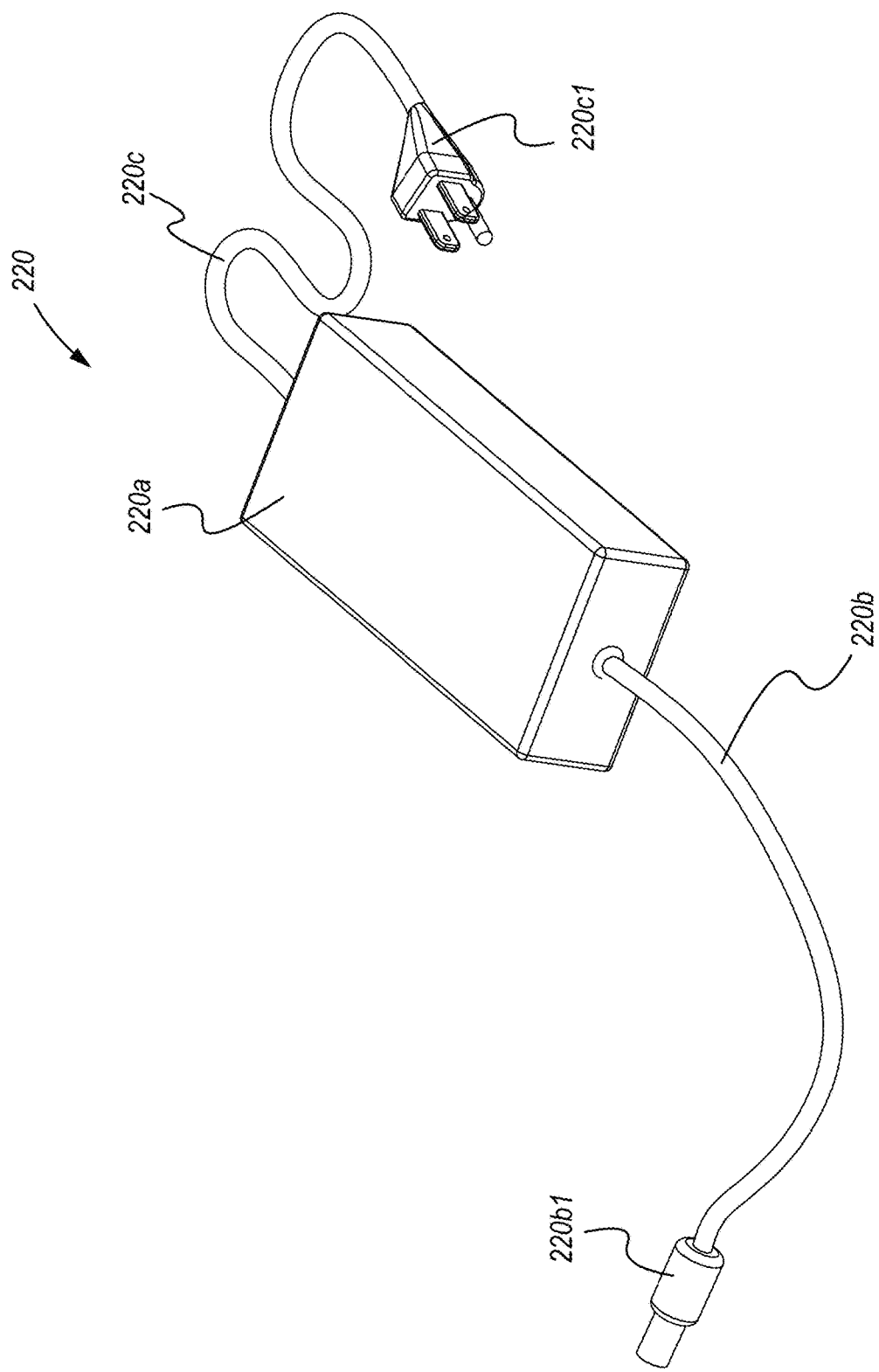
FIG. 45 is a top perspective view of a power adapter.

Turning to FIG. 45, depicted therein is a top perspective view of a power adapter 220 including power brick 220a, DC power cord 220b with DC plug 220b1, and AC power cord 220c with AC plug 220c1.

Figure 46:
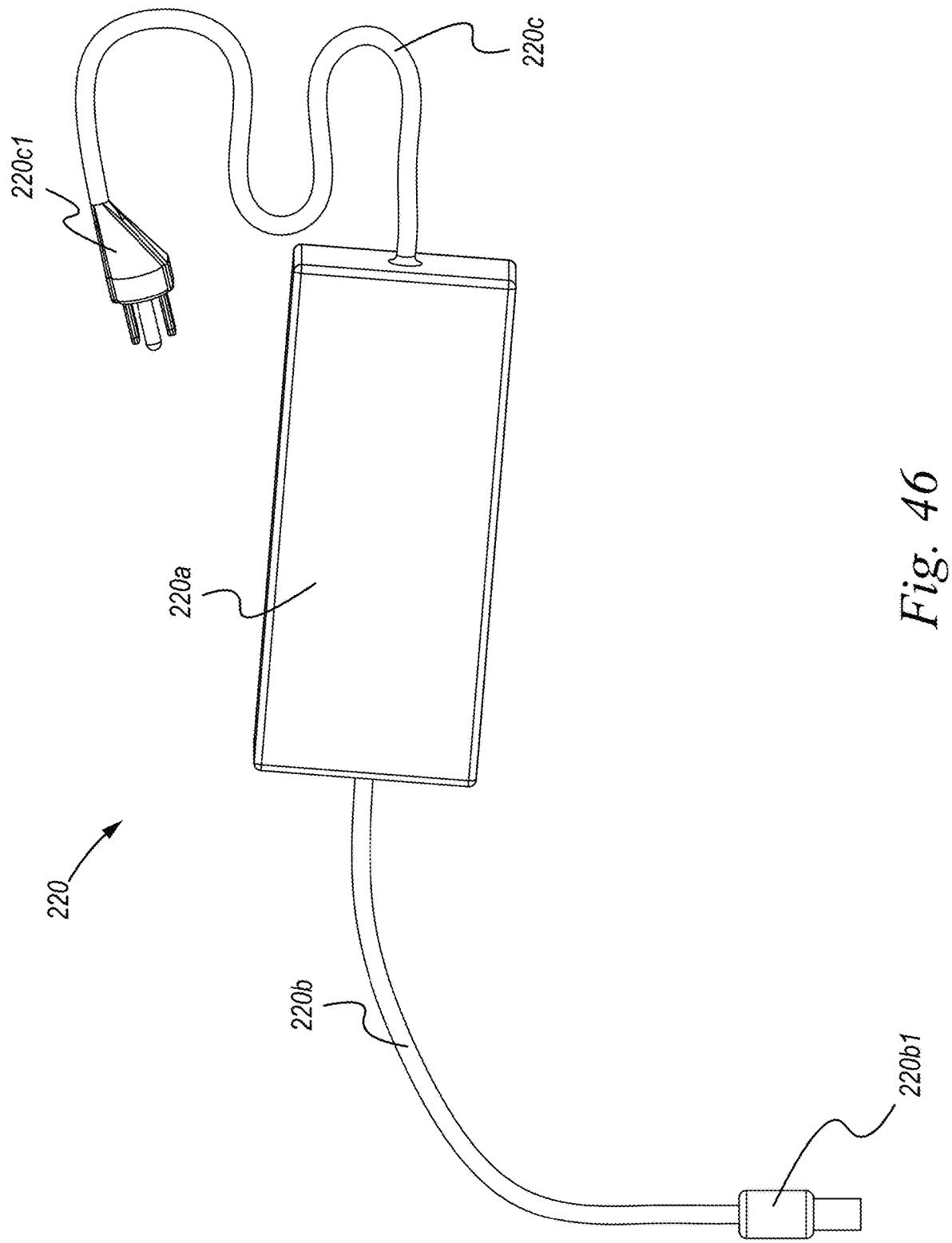
FIG. 46 is a top plan view of the power adapter of FIG. 45.

Turning to FIG. 46, depicted therein is a top plan view of power adapter 220.

Figure 47:
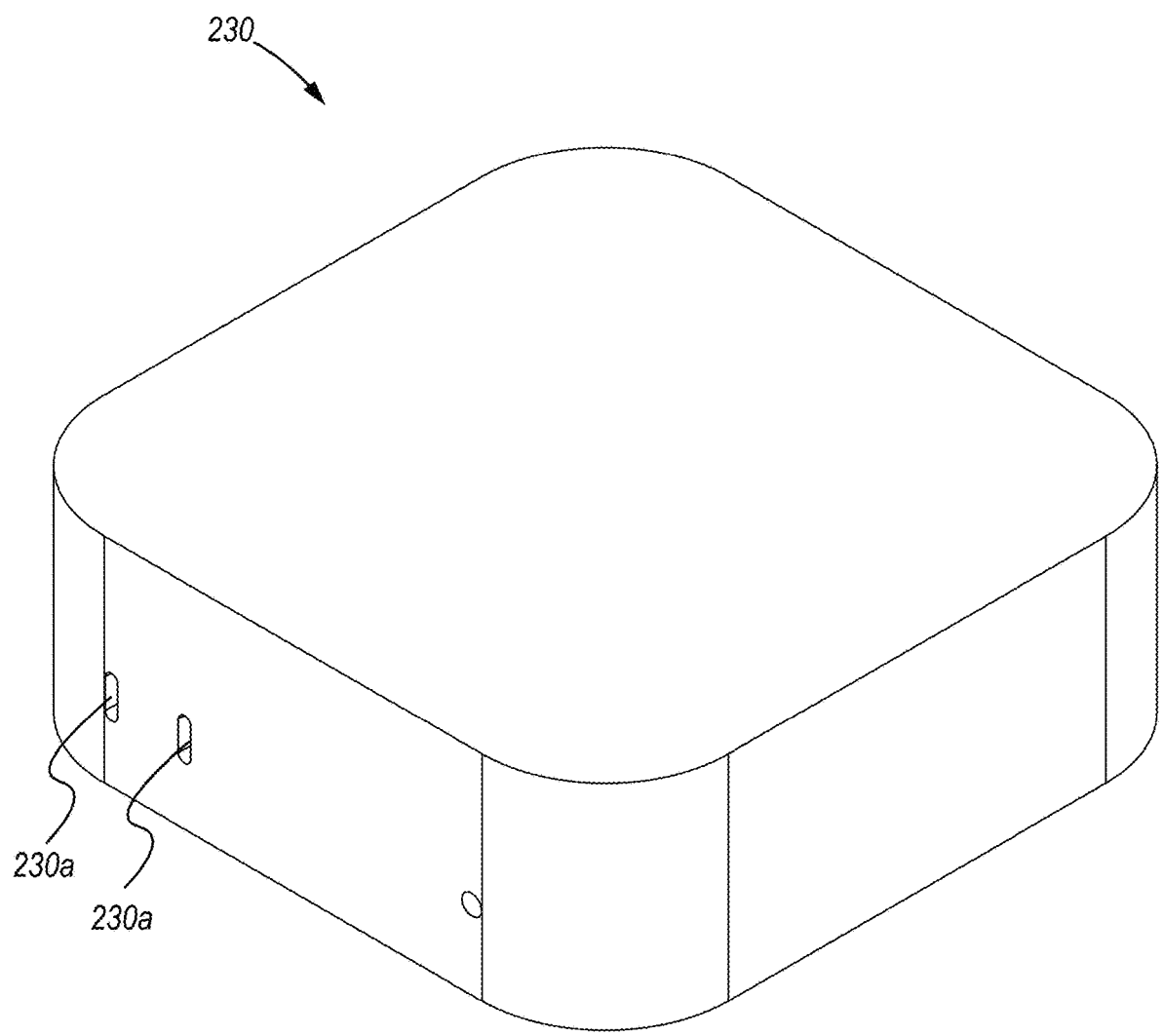
FIG. 47 is a front perspective view of a computer assembly.

Turning to FIG. 47, depicted therein is a front perspective view of computer assembly 230 with elongated member 230a.

Figure 48:
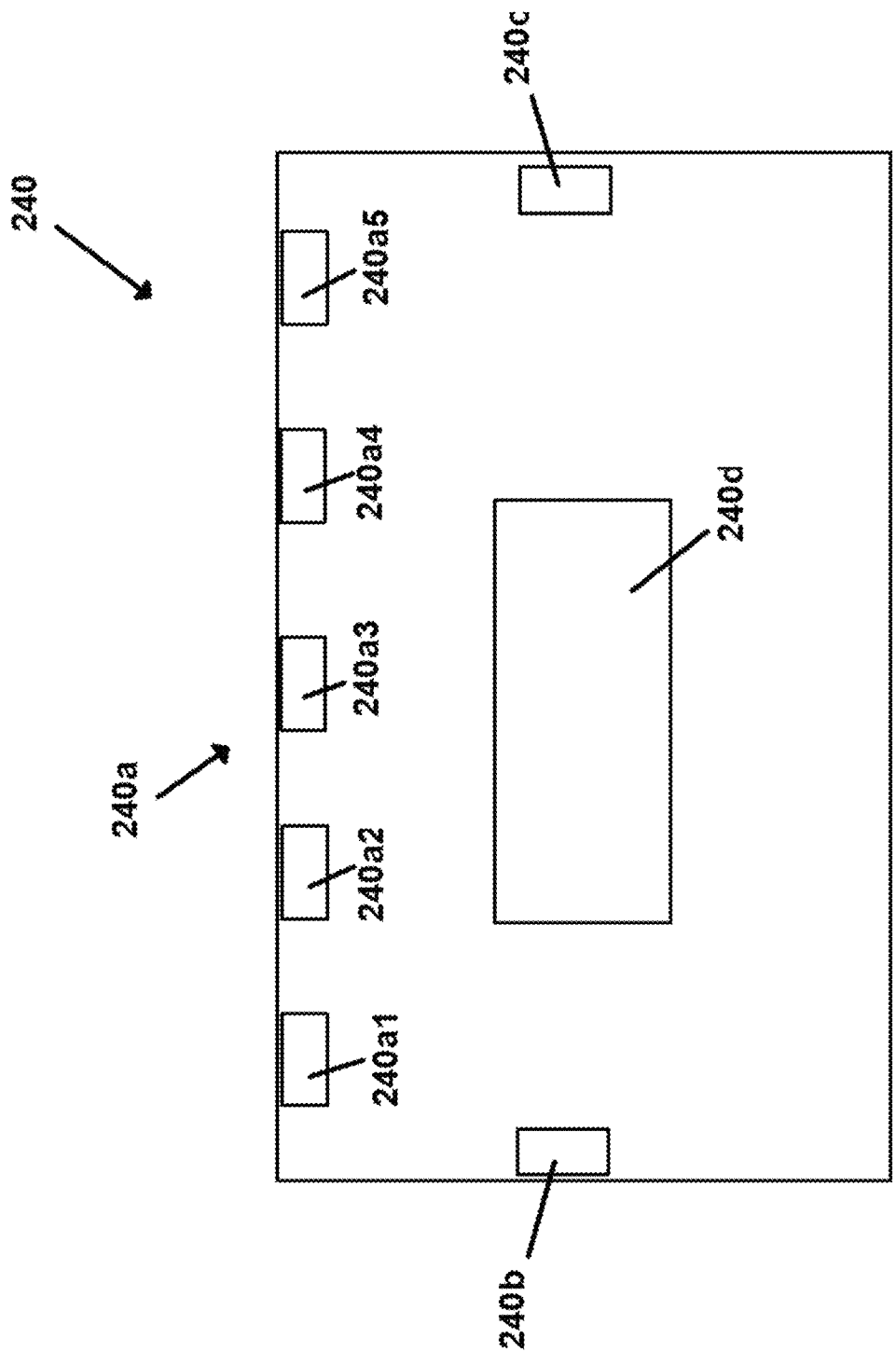
FIG. 48 is a schematic of a circuit assembly.

Turning to FIG. 48, depicted therein is circuit assembly 240 including data-power interface 240a with data-power port 240a1, data-power port 240a2, data-power port 240a3, data-power port 240a4, and data-power port 240a5, DC power input 240b, data port 240c, and circuitry 240d.

Figure 49:
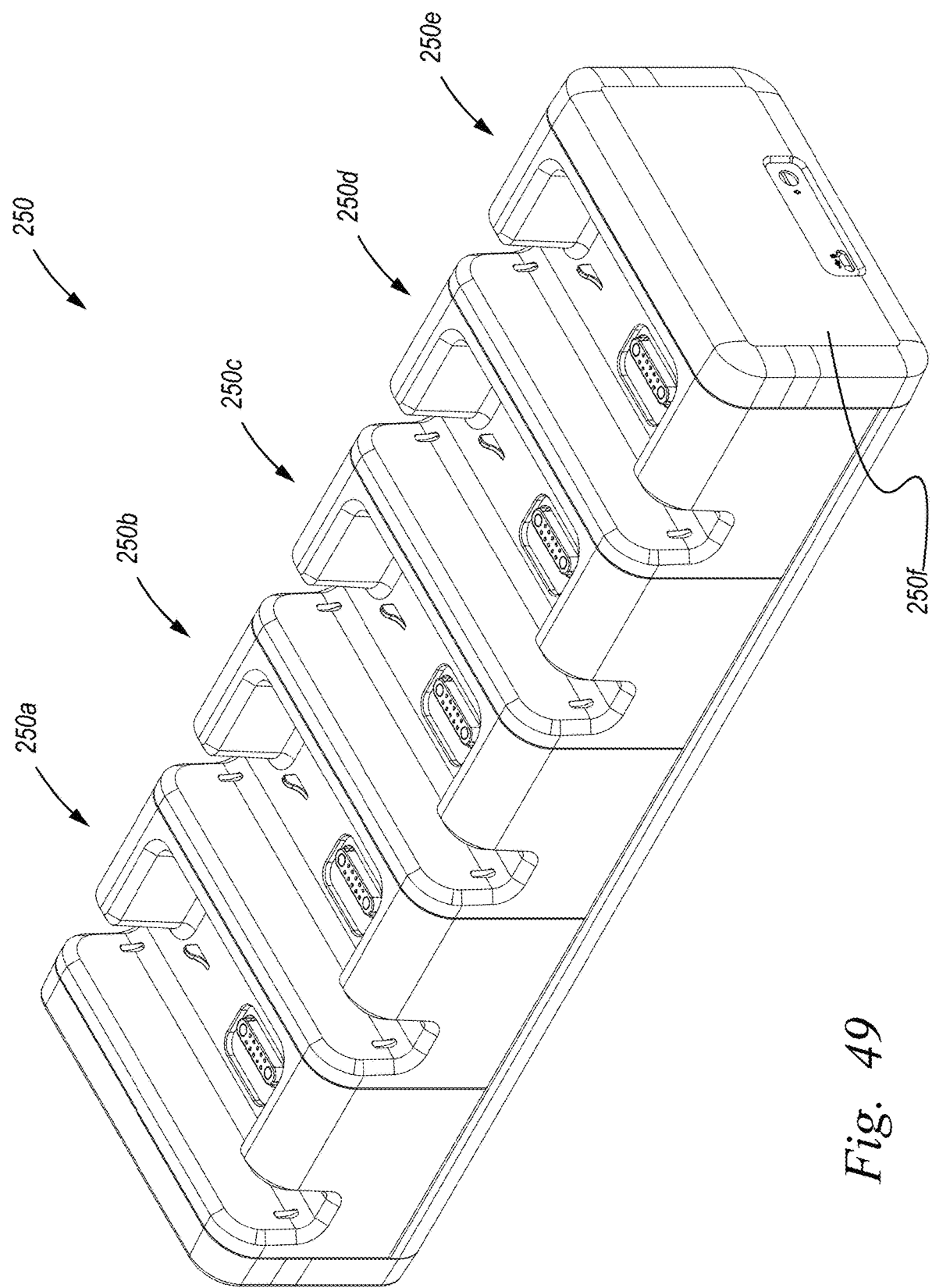
FIG. 49 is a rear perspective view of a device data-power station assembly.

Turning to FIG. 49, depicted therein is a rear perspective view of device data-power station assembly 250 including device bay portion 250a, device bay portion 250b, device bay portion 250c, device bay portion 520d, device bay portion 250e, and side 250f.

Figure 50:
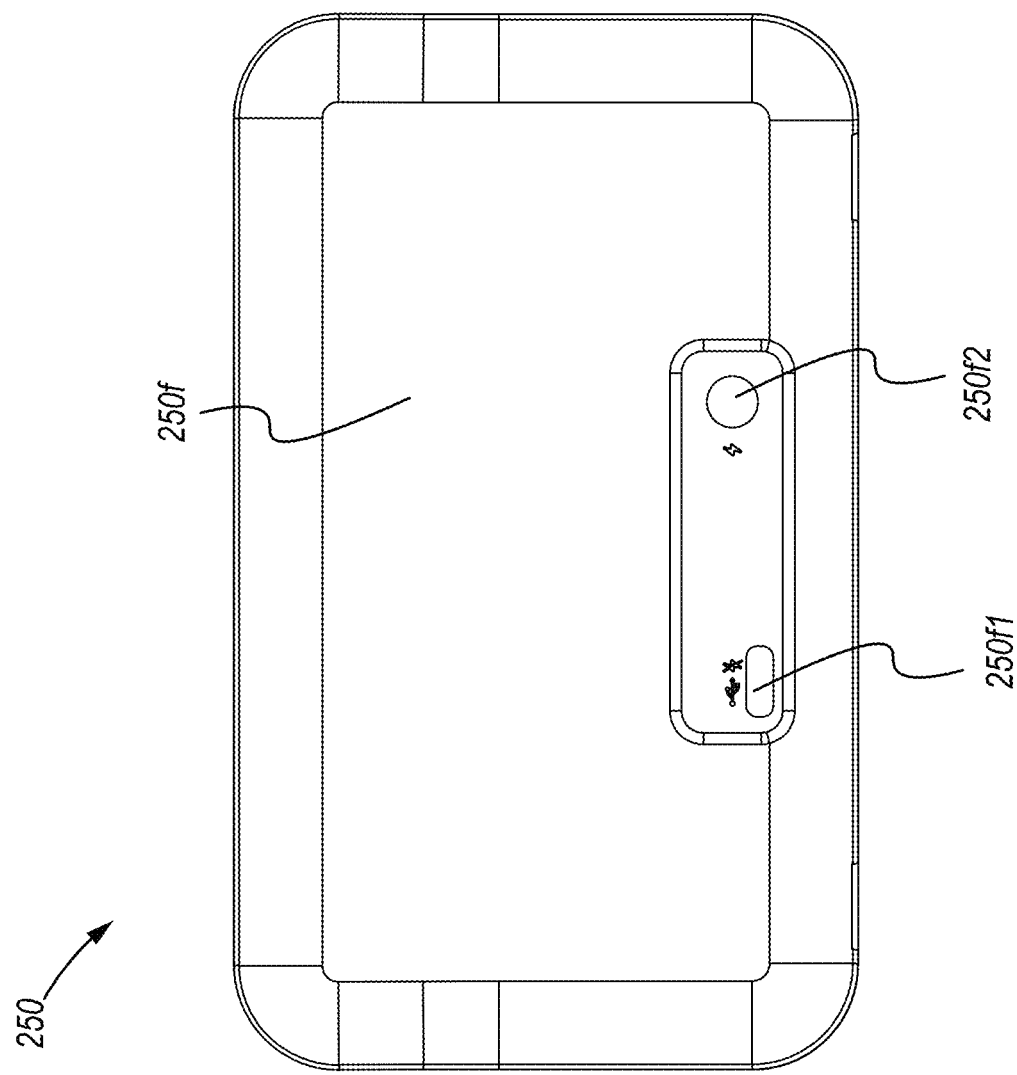
FIG. 50 is a rear elevational view of the device data-power station assembly of FIG. 49.

Turning to FIG. 50, depicted therein is a rear elevational view of device data-power station assembly 250 with data port 250f1 and DC power input port 250f2.

Figure 51:
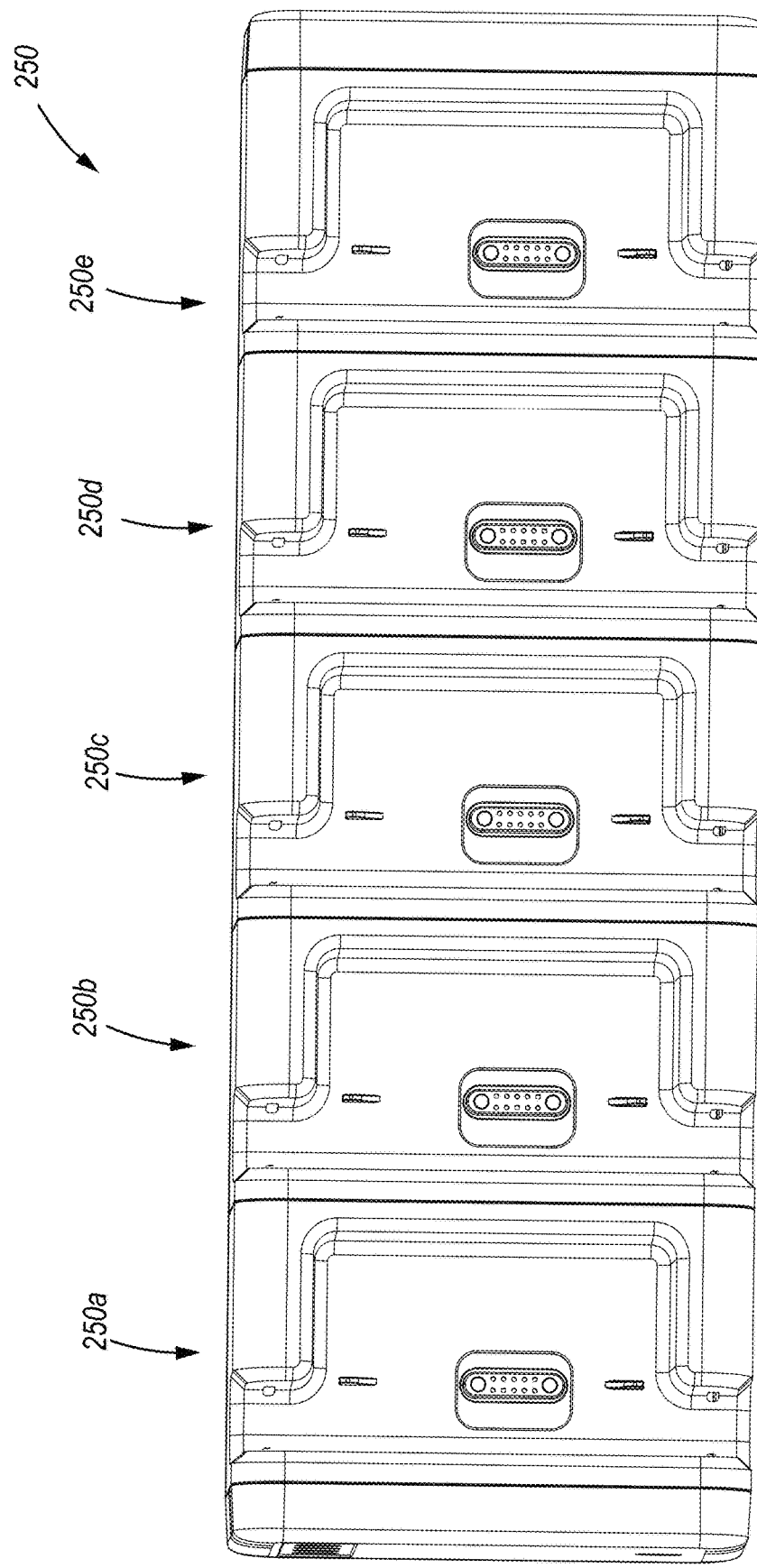
FIG. 51 is a top plan view of the device data-power station assembly of FIG. 49.

Turning to FIG. 51, depicted therein is a top plan view of device data-power station assembly 250.

Figure 52:
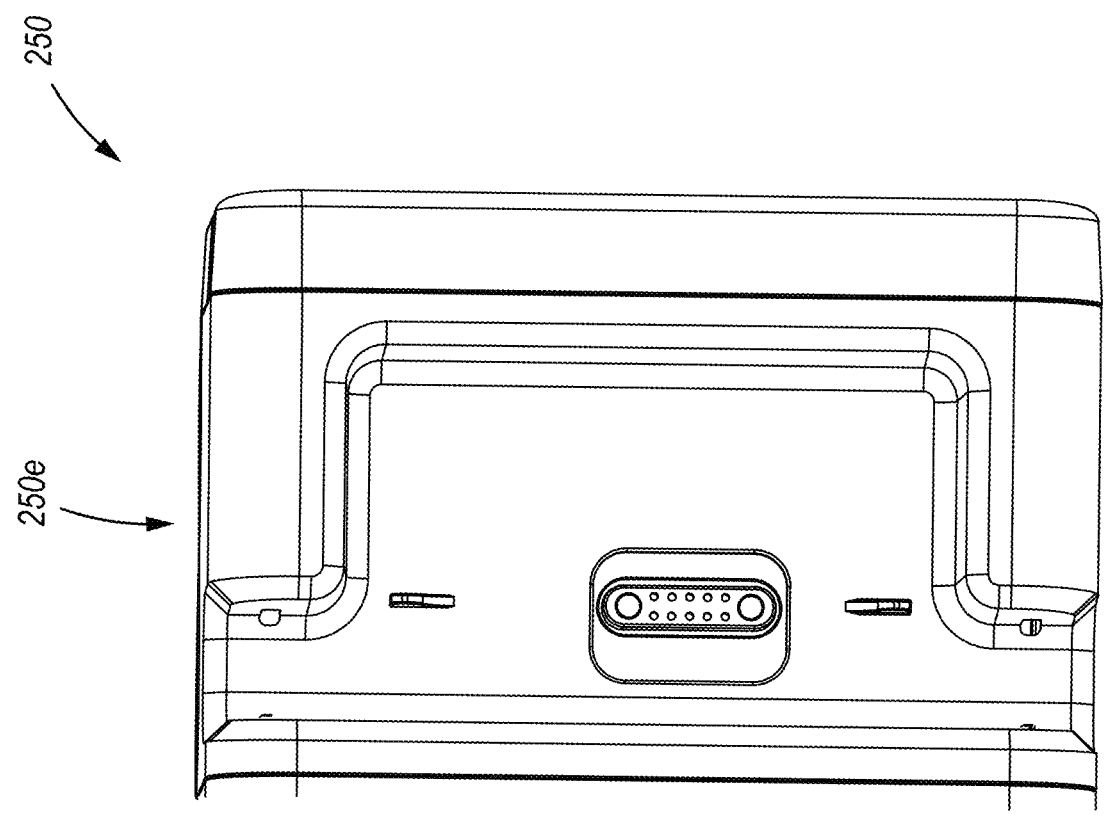
FIG. 52 is a top plan enlarged view of a device bay portion of the device data-power station assembly of FIG. 49.

Turning to FIG. 52, depicted therein is a top plan enlarged view of device bay portion 250e of device data-power station assembly 250.

Figure 53:
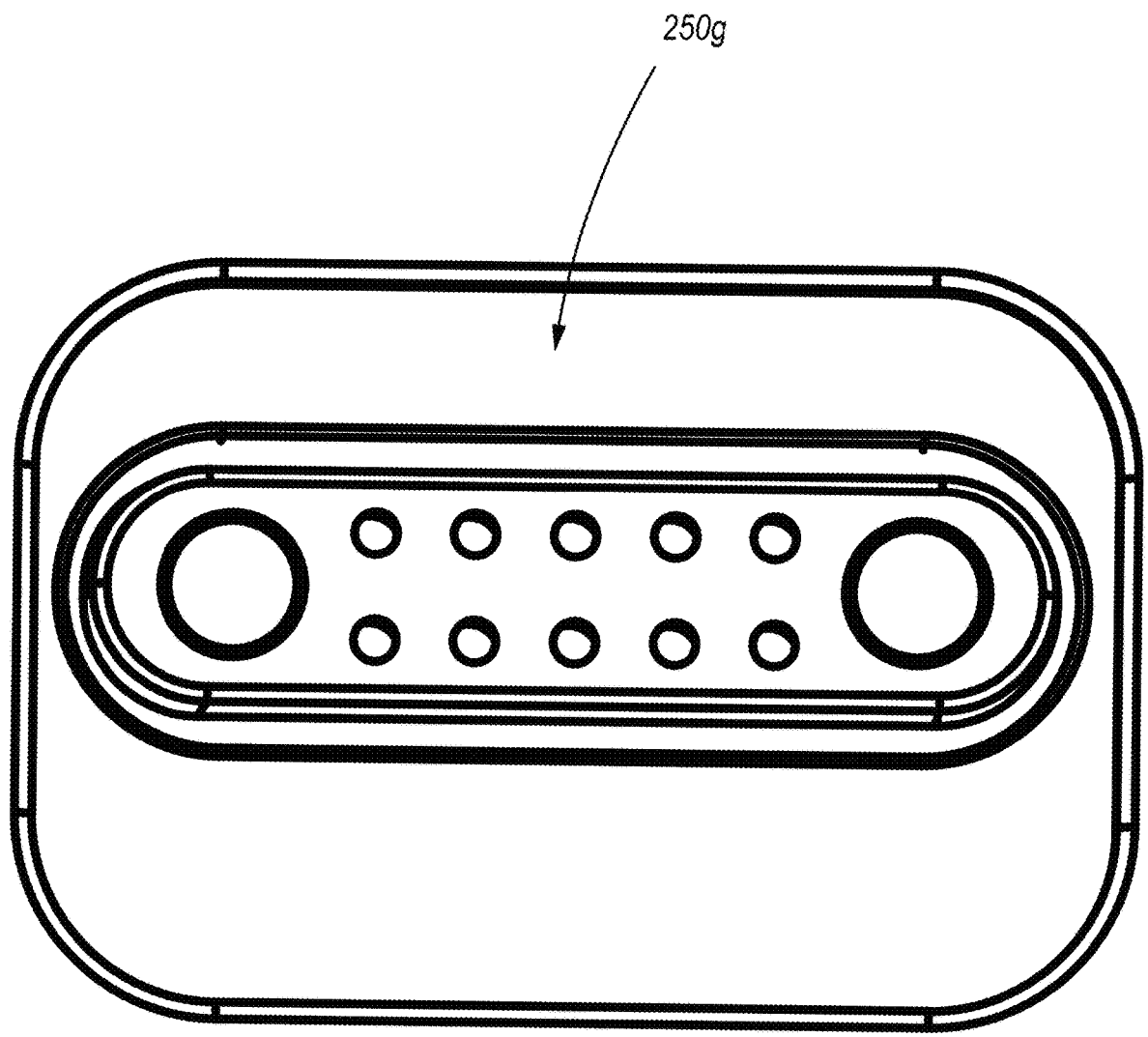
FIG. 53 is a top plan enlarged view of an interface portion of the device bay portion of FIG. 52.

Turning to FIG. 53, depicted therein is a top plan enlarged view of data-power interface 250g of device bay portion 250e of device data-power station assembly 250.

Figure 54:
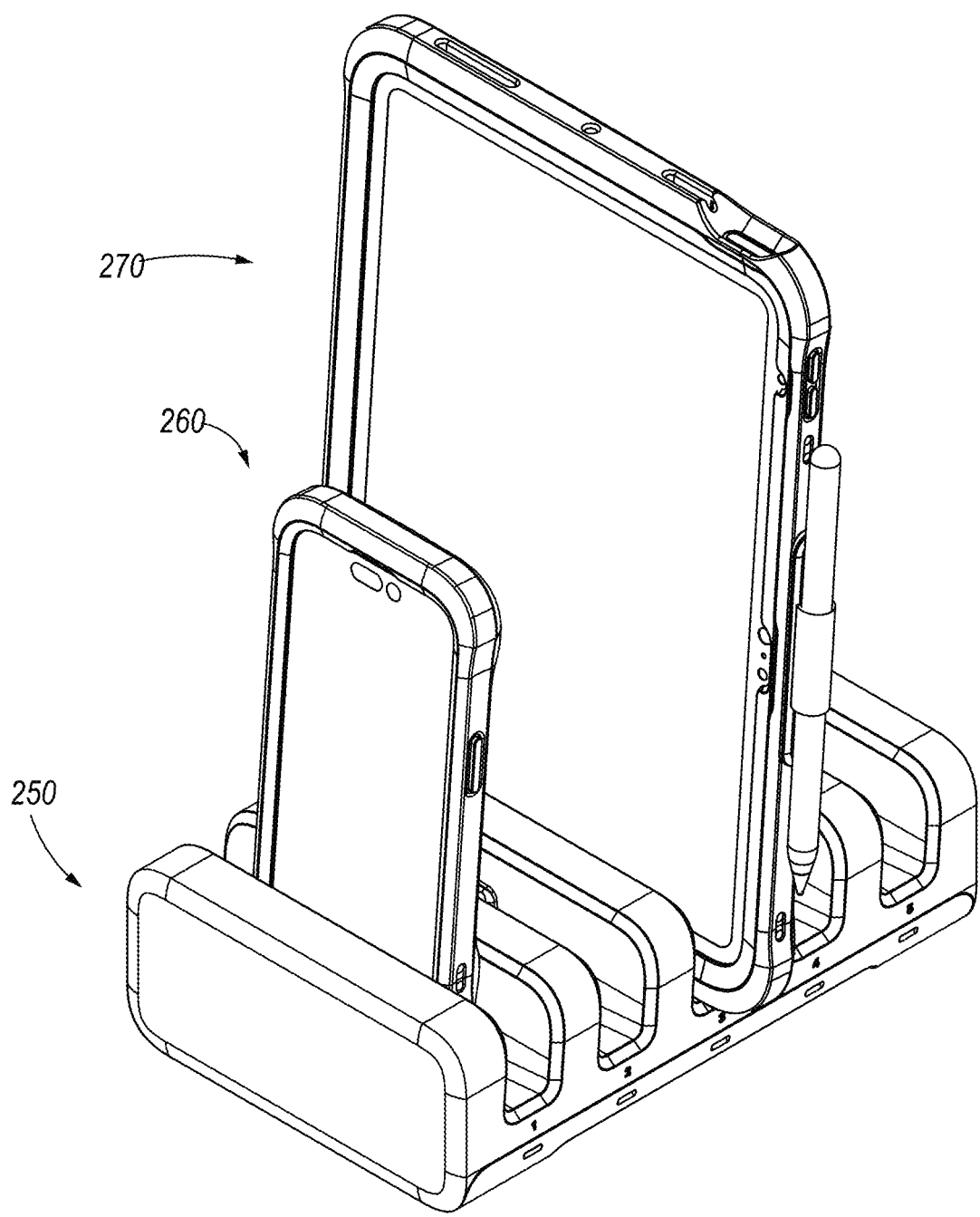
FIG. 54 is a front perspective view of the device data-power station assembly of FIG. 49 coupled with portable electronic devices.

Turning to FIG. 54, depicted therein is a front perspective view of device data-power station assembly 250 coupled with portable electronic device 260 and portable electronic device 270.

Figure 55:
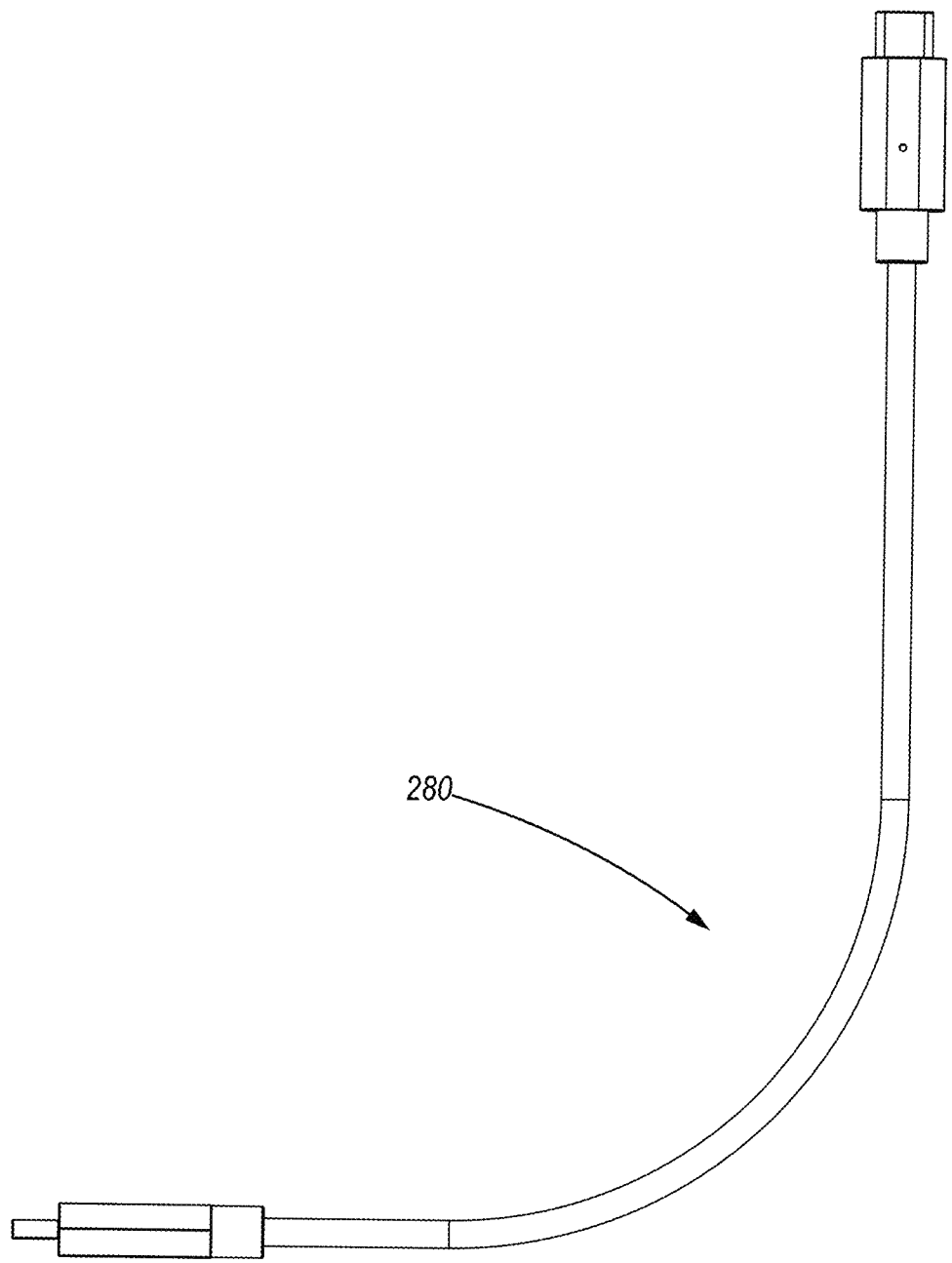
FIG. 55 a top plan view of a data-power cable.

Turning to FIG. 55, depicted therein a top plan view of data cable 280.

Figure 56:
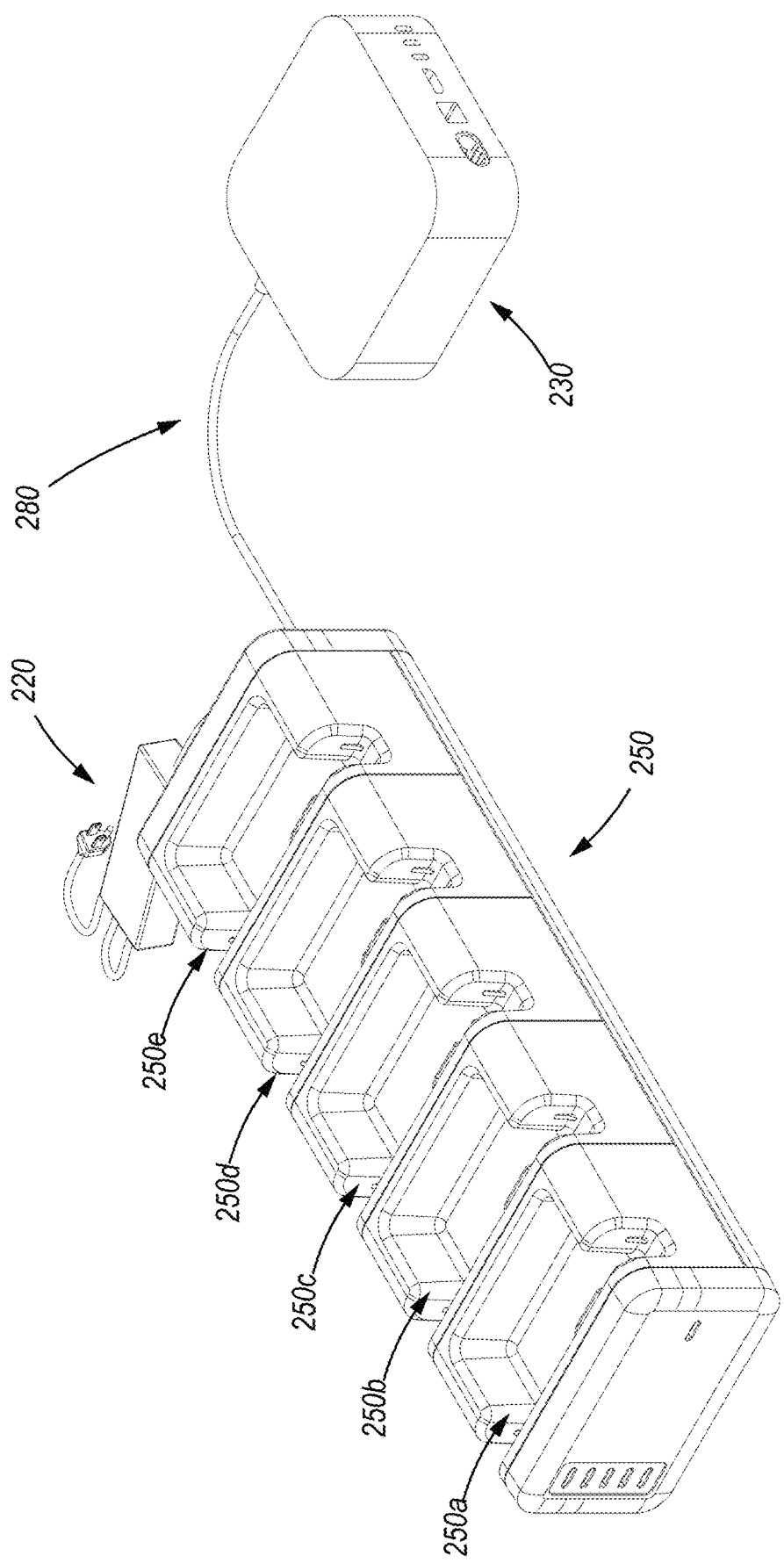
FIG. 56 is a front perspective view of device data-power station assembly of FIG. 49 coupled with the power adapter of FIG. 45 and coupled with the computer assembly of FIG. 47.

Turning to FIG. 56, depicted therein is a front perspective view of device data-power station assembly 250 coupled with power adapter 220 and computer assembly 230.

Figure 57:
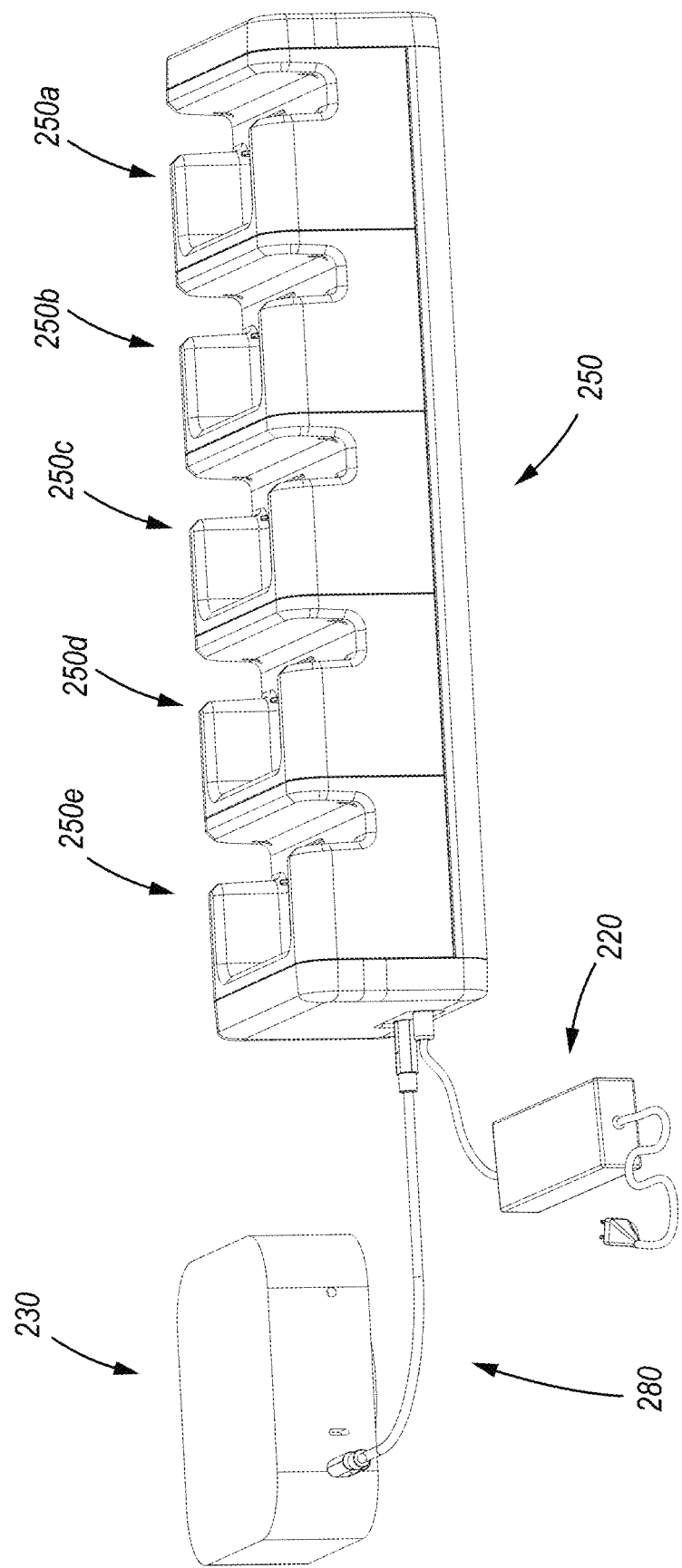
FIG. 57 is a side elevational view of device data-power station assembly of FIG. 49 coupled with the power adapter of FIG. 45 and coupled with the computer assembly of FIG. 47.

Turning to FIG. 57, depicted therein is a side elevational view of device data-power station assembly 250 coupled with power adapter 220 and computer assembly 230.

Figure 58:
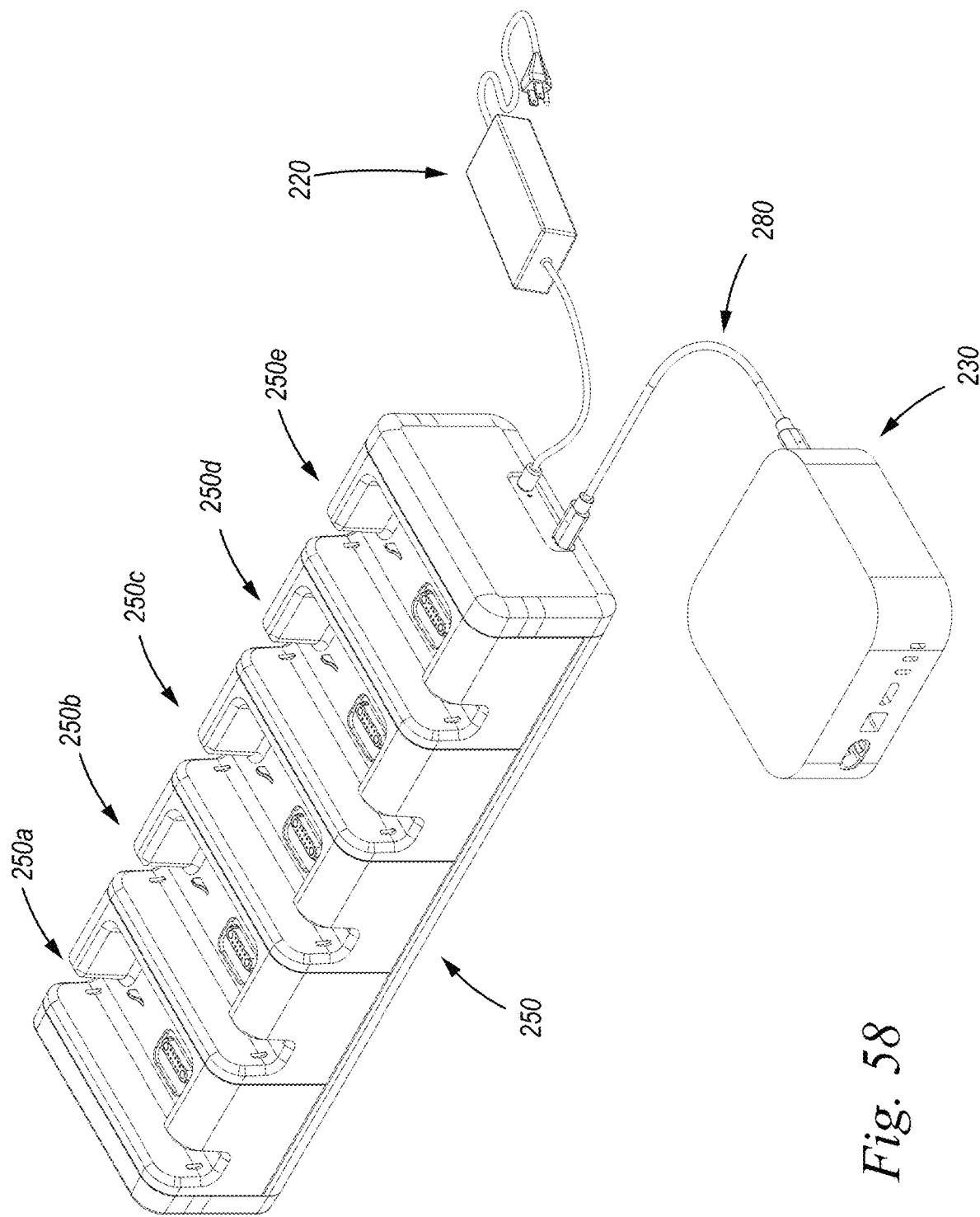
FIG. 58 is a rear perspective view of device data-power station assembly of FIG. 49 coupled with the power adapter of FIG. 45 and coupled with the computer assembly of FIG. 47.

Turning to FIG. 58, depicted therein is a rear perspective view of device data-power station assembly 250 coupled with power adapter 220 and computer assembly 230.

Figure 59:
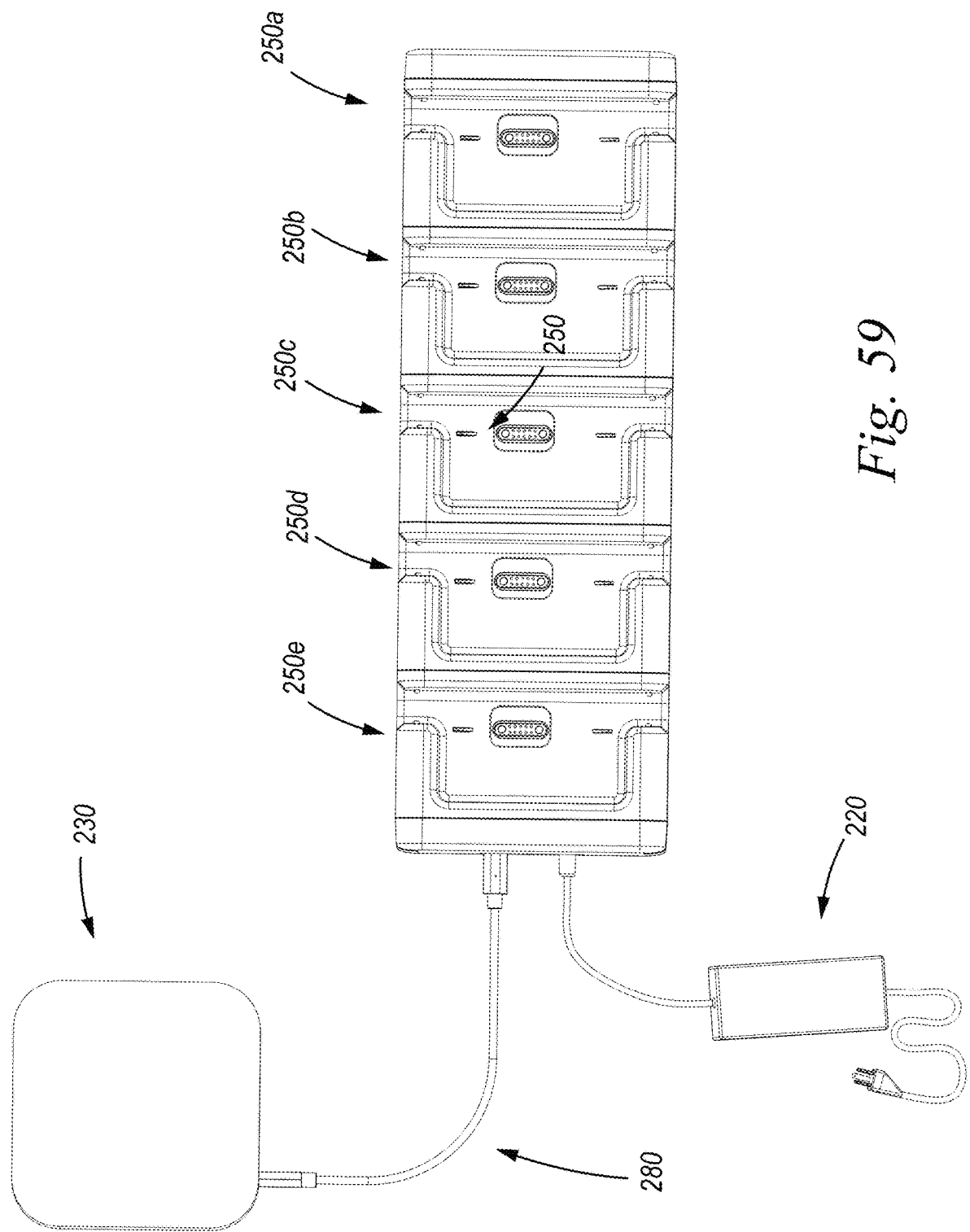
FIG. 59 is a top plan view of device data-power station assembly of FIG. 49 coupled with the power adapter of FIG. 45 and coupled with the computer assembly of FIG. 47.

Turning to FIG. 59, depicted therein is a top plan view of device data-power station assembly 250 coupled with power adapter 220 and computer assembly 230.

Figure 60:
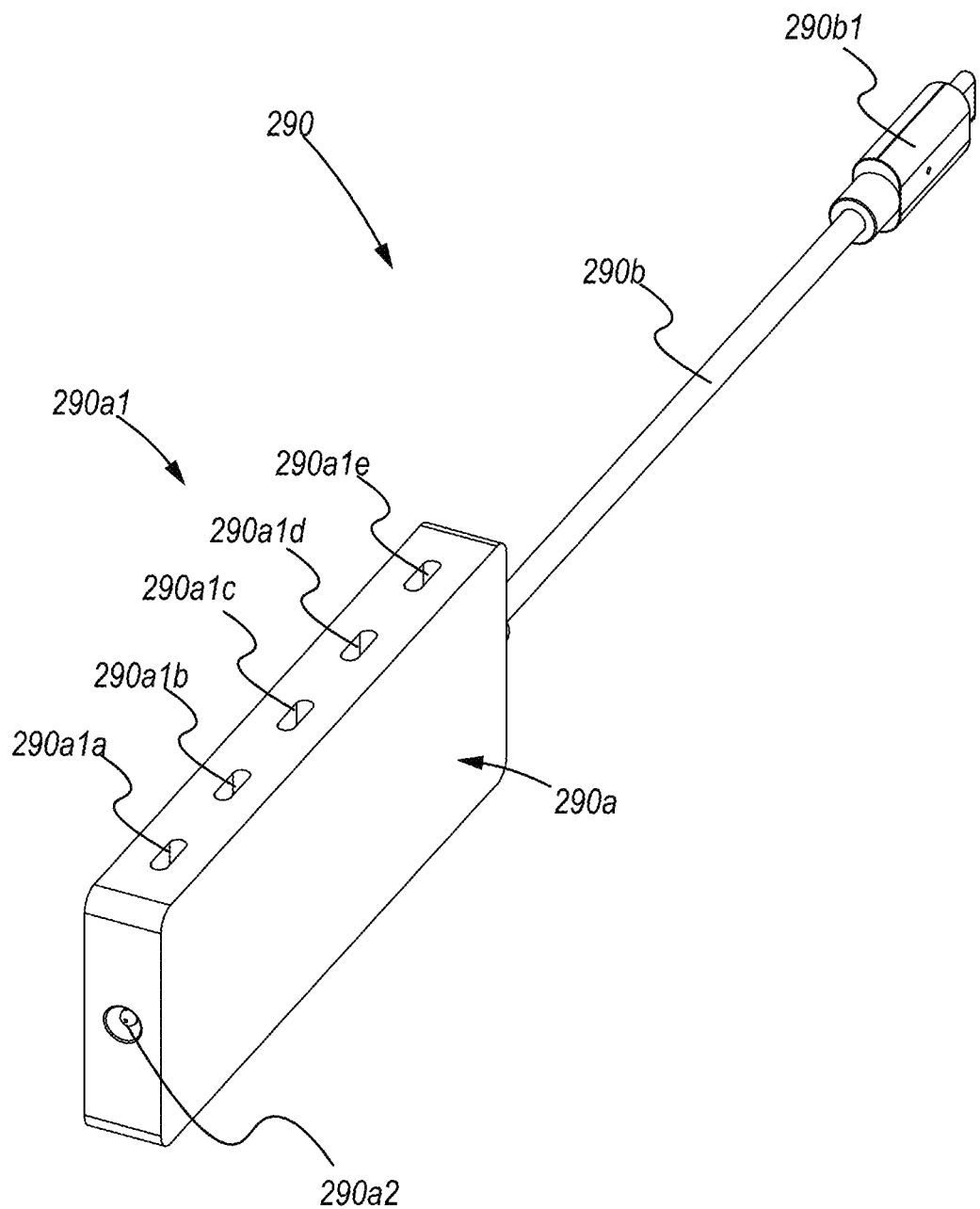
FIG. 60 is a perspective view of a device data-power dongle assembly.
Figure 61:
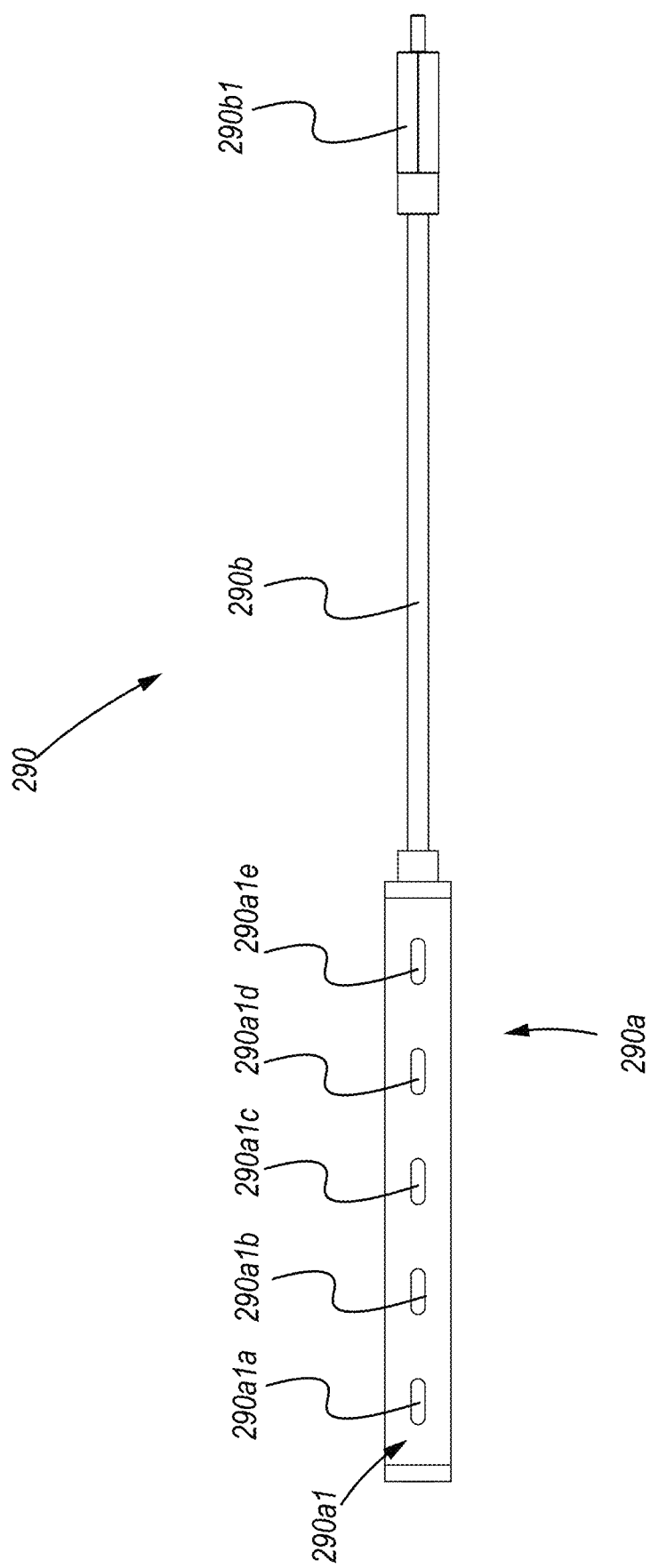
FIG. 61 is a side elevational view of the device data-power dongle assembly of FIG. 60.

Turning to FIG. 60, depicted therein is a perspective view of device data-power dongle assembly 290 including data-power dongle 290a with data-power interface 290a1 having data-power port 290a1a, data-power port 290a1b, data-power port 290a1c, data-power port 290a1d, and data-power port 290a1e, and with DC power input 290a2, and including data cable 290b with data plug 290b1, Turning to FIG. 61, depicted therein is a side elevational view of device data-power dongle assembly 290.

Figure 62:
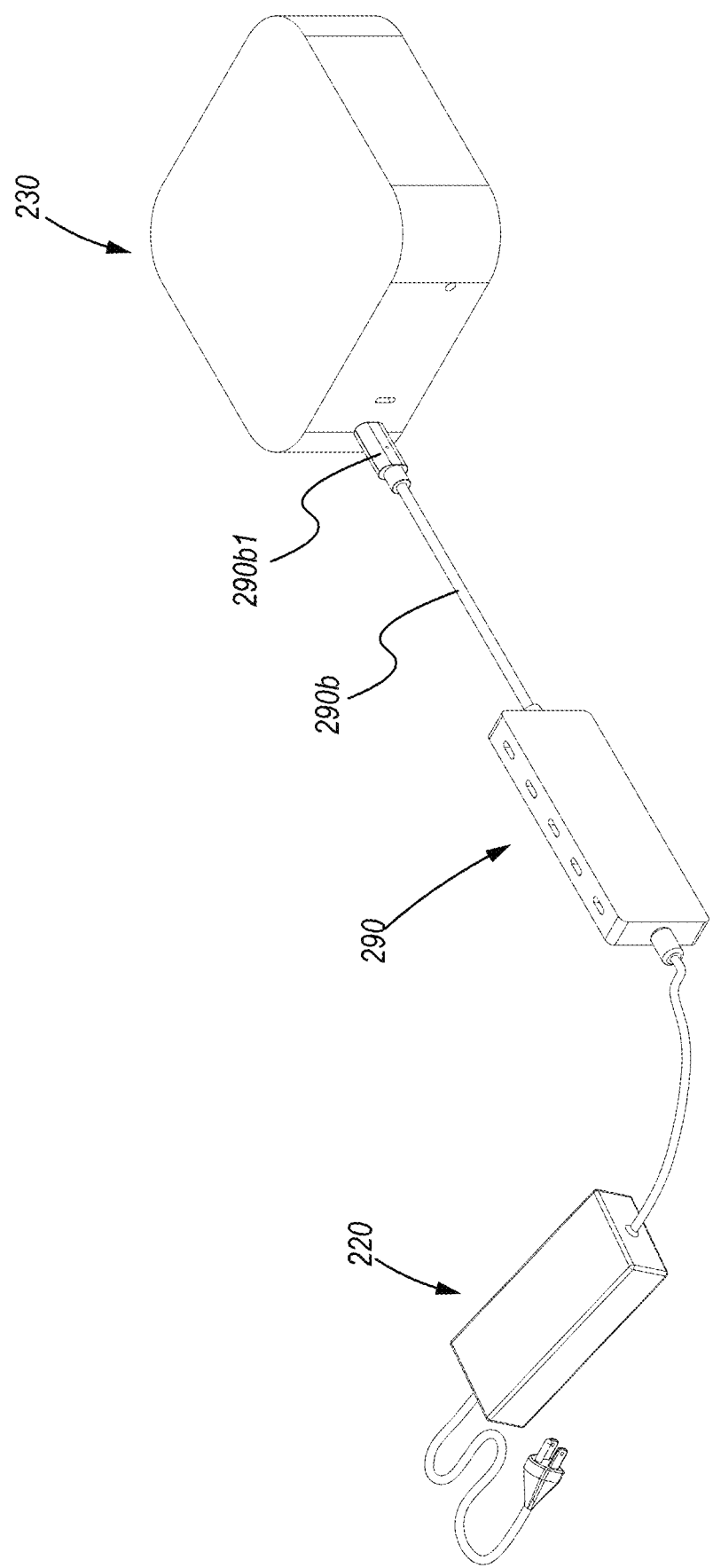
FIG. 62 is a top perspective view of device data-power dongle assembly of FIG. 60 coupled with the power adapter of FIG. 45 and coupled with the computer assembly of FIG. 47.

Turning to FIG. 62, depicted therein is a top perspective view of device data-power dongle assembly 290 coupled with power adapter 220 and coupled with computer assembly 230.

Figure 63:
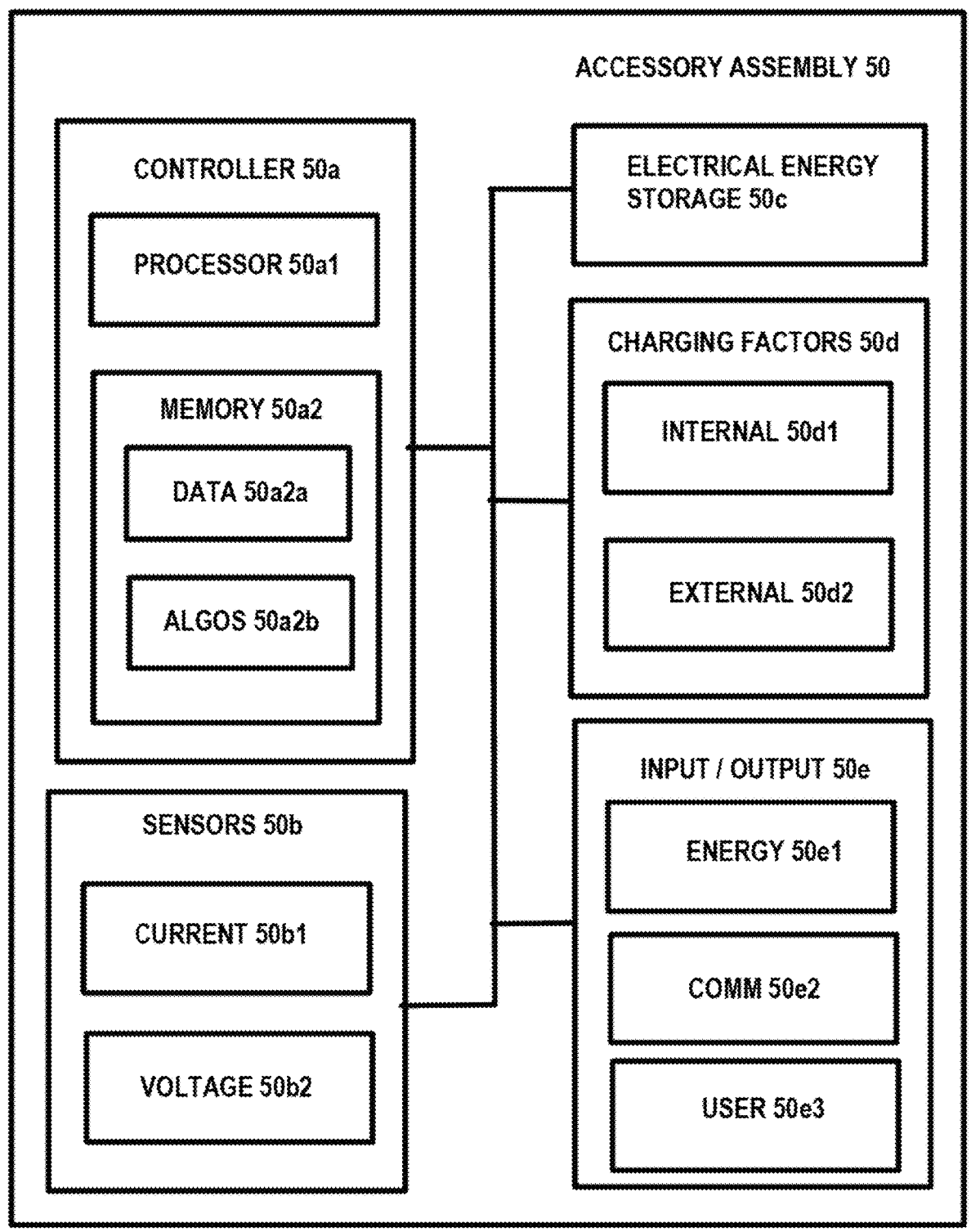
FIG. 63 is a schematic representation of electrically related components of the accessory assembly of FIG. 1.

Turning to FIG. 63, depicted therein is a schematic representation of electrically related components of the accessory assembly 50, which can be configured in various combinations, arrangements, and additions inside of accessory assembly 50. As depicted, implementations of accessory assembly 50 in the shown to include controller 50a, sensors 50b, electrical energy storage 50c, charging factors 50d, and input/output 50e shown to be interconnected. In implementations, interconnection can include various approaches such as involving wires, traces on or more circuit boards such as one or more printed circuit boards, electrical power buses, communication interconnections such as those that convey various communication protocols, etc.

In implementations, controller 50a shown to include processor 50a1, memory 50a2, with data 50a2a, and algos 50a2b. In implementations, sensors 50b shown to include current sensor 50b1 and voltage sensor 50b2. In implementations, charging factors 50d shown to include internal charging factor 50d1 and external charging factor 50d2. In implementations, input/output 50e shown to include energy input/output 50e1, communication input/output 50e2, and user input/output 50e3.

In implementations, controller 50a can performed one or more functions involving operation of accessory assembly 50. For instance, in implementations, controller 50a can use information obtained by sensors 50b to determine an estimated charging rate, such as in terms of mAh/min or Ah/min, for either internal charging factor 50d1 or external charging factor 50d2, which controller 50a can then evaluate according to a predetermined threshold, optionally also involving a predetermined time period, to inform of status via user input/output 50e3 or to otherwise control activation or deactivation regarding at least one of the following charging scenarios: (1) charging by internal charging factor 50d1 of electrical energy storage 50c using energy obtained from one or more external energy sources, such as electrical energy provided through one or more forms of standard USB, Apple lightning, MagPower USB-C, alternative DC energy sources, AC energy sources, or other energy sources, via input portion of energy input/output 50e1; (2) charging by external charging factor 50d2 of external electric-based entities, such as including portable electronic tablet device implementation 100, portable electronic phone device implementation 120, and payment card reader assembly 130, via output portion of energy input/output 50e1 using energy obtained from electrical energy storage 50c; and (3) charging by external charging factor 50d2 of external electric-based entities, such as including portable electronic tablet device implementation 100, portable electronic phone device implementation 120, and payment card reader assembly 130, via output portion of energy input/output 50e1 using energy obtained from one or more external energy sources, such as electrical energy provided through one or more forms of standard USB, Apple lightning, MagPower USB-C, alternative DC energy sources, AC energy sources, or other energy sources, via input portion of energy input/output 50e1. In implementations, internal charging factor 50d1 can be activated when controller 50a determines in response to detecting an adequate connection to an external power source.

In implementations, controller 50a can performed other one or more functions involving operation of accessory assembly 50. For instance, in implementations, controller 50a can use at least one of (1) communication input/output 50e2 and (2) sensors 50b with input portion of energy input/output 50e1 to determine operational and/or connection status of external electric-based entities, such as including portable electronic tablet device implementation 100, portable electronic phone device implementation 120, and payment card reader assembly 130, communicatively connected, about to be communicatively connected, or recently communicatively disconnected with accessory assembly 50 to determine subsequent operational control of accessory assembly 50 and/or the external electric-based entities, such as including portable electronic tablet device implementation 100, portable electronic phone device implementation 120, and payment card reader assembly 130. In implementations, such operational control can include at least one of activation of a communication function, deactivation of a communication function, sending communication to external electric-based entities, such as including portable electronic tablet device implementation 100, portable electronic phone device implementation 120, and payment card reader assembly 130, from accessory assembly 50, and receiving communication at accessory assembly 50 from external electric-based entities, such as including portable electronic tablet device implementation 100, portable electronic phone device implementation 120, and payment card reader assembly 130. In implementations, such operational control can include at least one of activation of a communication function, deactivation of a communication function, sending communication protocols and/or data to external electric-based entities, such as including portable electronic tablet device implementation 100, portable electronic phone device implementation 120, and payment card reader assembly 130, from accessory assembly 50, and receiving communication protocols and/or data at accessory assembly 50 from external electric-based entities, such as including portable electronic tablet device implementation 100, portable electronic phone device implementation 120, and payment card reader assembly 130.

In implementations, processor 50a1 can include one or more sub-processors, such as a central processing unit (CPU), a digital signal processor (DSP), a graphical processing unit (GPU), an application-specific integrated circuit (ASIC), microprocessor, a field-programmable gate array (FPGA), or any other suitable electronic processing components. In implementations, processor 50a1 can receive energy from electrical energy storage 50c via internal charging factor 50d1 or from an external energy source via external charging factor 50d2. In implementations, processor 50a1 can obtain data and execute instructions from data 50a2a and algos 50a2b of memory 50a2, respectively. In implementations, memory 50a2 can include at least one computer memory components such as at least one of ROM, RAM, EEPROM, flash memory, or registers. In implementations memory 50a2 can be integrated to such as with processor 50a1 or be an ASIC or FPGA.

In implementations, if adequately charged, electrical energy storage 50c can supply energy to controller 50a and sensors 50b via internal charging factor 50d1 and to external electric-based entities, such as including portable electronic tablet device implementation 100, portable electronic phone device implementation 120, and payment card reader assembly 130, via external charging factor 50d2 and via output portion of energy input/output 50e1. In implementations electrical energy storage 50c can include various conventional cell chemistries to provide suitable voltages and charge durations and charge levels such as in mAh or Ah. In implementations, electrical energy storage 50c can include capacitive energy storage such as with a conventional capacitor or super-capacitor.

In implementations, communication input/output 50e2 can involve wired or wireless communication with external electric-based entities, such as including portable electronic tablet device implementation 100, portable electronic phone device implementation 120, and payment card reader assembly 130. In implementations, communication input 200a portion of user input/output 50e3 can include tactile, such as keypad or pushbuttons, audio such as microphone, or any other suitable means for communication input 200a.

In implementations, communication output 200b portion of user input/output 50e3 can include audio (such as buzzer or acoustic speakers) or tactile (such as pulsed vibration actuator modifying pulse frequency, intensity, or duration), or visual output. For instance, in implementations, one or more light emitters (such as conventional light emitting diodes (LED), organic LED, liquid-crystal emitters, e-ink display, etc.) optionally arranged in various patterns such as linearly in series, in matrix configuration, randomly, etc., according to predetermined symbology or particular nomenclature involved. In implementations, communication output 200b versions of user input/output 50e3 can include other visual output, acoustic output. In implementations, controller 50a can provide control to activate or deactivate LED communication output 200b versions of user input/output 50e3 for extended periods of time, flash intermittently, project or emit patterns or characters, or can provide control for intensity of emission by light emitter versions.

Figure 64:
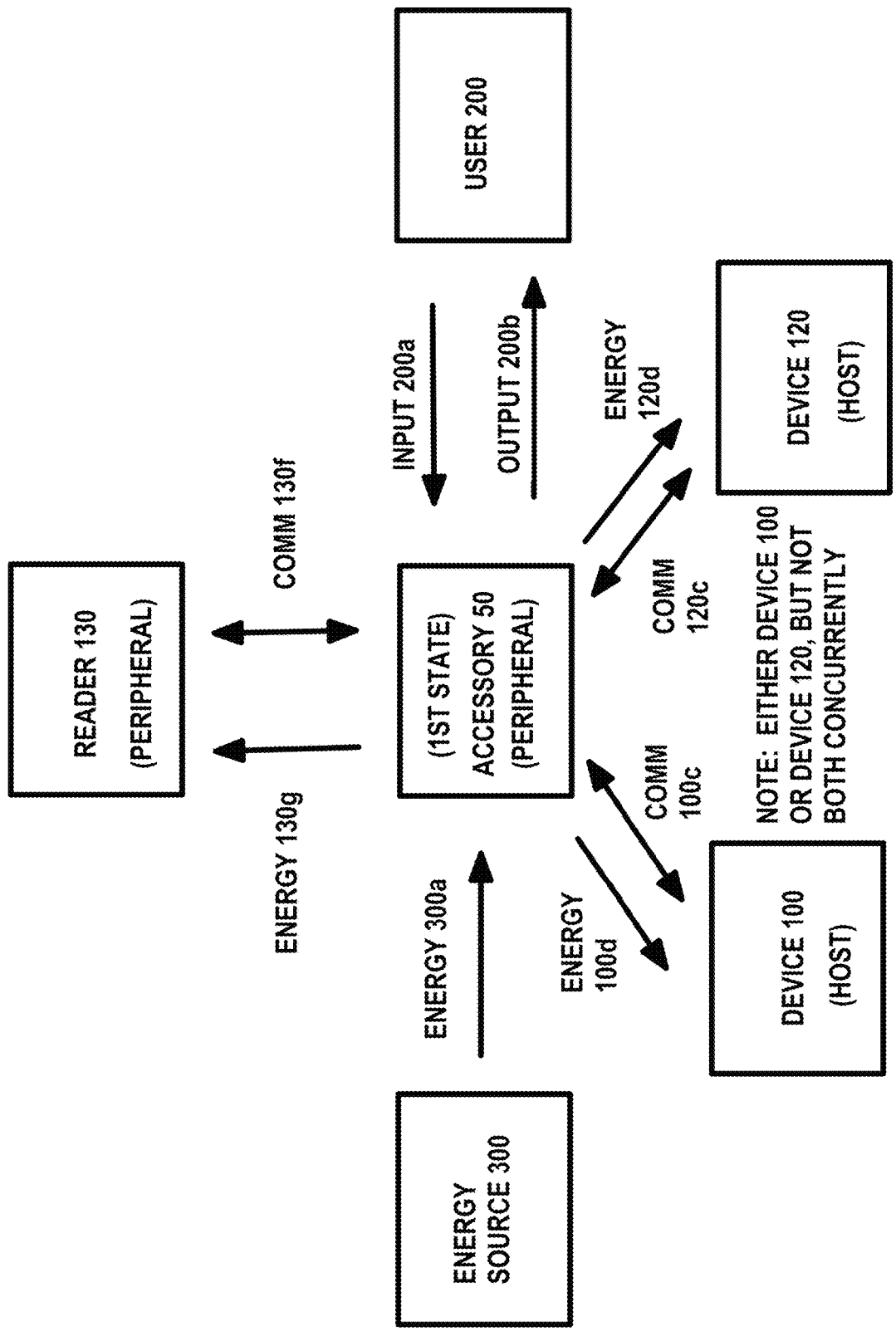
FIG. 64 is a schematic representation of implementations of flows of communication and/or electrical energy regarding the accessory assembly of FIG. 1.

Turning to FIG. 64, depicted therein is a schematic representation of implementations of flows of communication and/or electrical energy when accessory assembly 50 is either physically coupled (e.g., through structural engagement shown in prior figures or overt wiring) or wirelessly coupled (e.g., through IEEE-based or other protocols or energy fields) to portable electronic tablet device implementation 100 (generally known as a form of portable electronic computing device), portable electronic phone device implementation 120 (generally known as a form of portable electronic computing device), payment card reader assembly 130, and/or energy source 300. Also schematic representation of FIG. 36 depicts some implementations to include communication flows with user 200 being interactively engaged with accessory assembly 120.

As depicted, in implementations, electrical-based communication 100c can flow between accessory assembly 50 and portable electronic tablet device implementation 100; and electrical energy 100d can flow from accessory assembly 50 to portable electronic tablet device implementation 100. As depicted, in implementations, electrical-based communication 120c can flow between accessory assembly 50 and portable electronic phone device implementation 120; and electrical energy 120d can flow from accessory assembly 50 to portable electronic phone device implementation 120. As depicted, in implementations, electrical-based communication 130f can flow between accessory assembly 50 and payment card reader assembly 130; and electrical energy 130g can flow from accessory assembly 50 to payment card reader assembly 130. As depicted, in implementations, communication input 200a can flow from accessory assembly 50 to user 200; and communication output 200b can flow from user 200 to accessory assembly 50. As depicted, in implementations, electrical energy 300*a* can flow from electrical energy source 300 to accessory assembly 50.

In implementations, such components of accessory assembly 50 conduct functions such as activation or deactivation upon a two second button hold of communication input 200*a* portions or versions of user input/output 50*e*3, displaying energy storage status using various light patterns of communication output 200*b* portions or versions of user input/output 50*e*3 upon single button press of communication input 200*a* portions or versions of user input/output 50*e*3. Such light patterns can involve multiple lights to include long pulses or one or more lights being activated to indicate of percentage of electrical charge remaining or charging status of electrical energy storage 50*c*.

Charging mode can be selected based on manual control such as button pushes to charge only the accessory assembly 50, charge accessory assembly 50 and the portable electronic tablet device implementation 100, charge accessory assembly 50 and portable electronic phone device implementation 120, or accessory assembly 50 only when accessory assembly 50 charge is below a threshold such as ten percent. Other charging modes can include a quick charge which temporarily disables data connectivity between accessary assembly 50 and portable electronic tablet device implementation 100 or portable electronic phone device implementation 120 to allow for faster charging. In implementations the accessory assembly 50 can be put into a data mode only, to allow for a wired data connection between payment card reader assembly 130 and portable electronic tablet device implementation 100 or portable electronic phone device implementation 120.

In implementations accessory assembly 50 conducts various verification routines from data 50*a*2*a* of memory 50*a*2 such as to allow for reliable operations. These routines can include but are not limited to the following such as after a press and hold of such as manual button control of communication input 200*a* portion of user input/output 50*e*3 to activate accessory assembly 50, verification of charging is done such as related to certain voltage and/or current levels being supplied to or from the accessory assembly 50. Other verification routines can include whether attached card reader accessory 130 is being charged or whether data connectivity has been established between one or more of accessory assembly 50, portable electronic tablet device implementation 100, portable electronic phone device implementation 120, and payment card reader assembly 130.

Certain communication input 200*a* from communication input 200*a* portion of user input/output 50*e*3 such as a double-press by user 200 of one or more buttons included with implementations of communication input 200*a* portions of user input/output 50*e*3 can be sensed by processor 50*a*1 to deactivate charging of the portable electronic tablet device implementation 100 or portable electronic phone device implementation 120 with subsequent verification. This deactivation of portable electronic device charging can occur while charging of payment card reader assembly 130 or accessory assembly 50 can remain active or data connectivity between the accessory assembly 50 and payment card reader assembly 130 can also remain active. Manual activation of portable electronic device charging can occur through for example double-button-press of input portion of user input/output 50*e*3 of accessory assembly 50 along with charging and data connectivity with payment card reader assembly 130 remaining active. Even with accessory assembly charging and portable electronic device charging being deactivated, data connectivity may still be active between accessory assembly 50 and payment card reader assembly 130.

In implementations charging can be performed for instance with USB-C cable or an Apple lightening cable in which the accessory assembly is activated through coupling with either cable. Charging status can be indicated though use of status lights for communication output 200*b* portion of user input/output 50*e*3. In implementations, electrical energy storage 50*c* of accessory assembly 50, electrical energy storage of portable electronic tablet device implementation 100 or portable electronic phone device implementation 120, and electrical energy storage of card reader accessory 130 can all be charged simultaneously by accessory assembly 50 via internal charging factor 50*d*1 and external charging factor 50*d*2. In implementations, when an electrical energy cable is disconnected the accessory assembly 50 can remain to allow for continued portable electronic device charging and the payment card reader assembly charging along with data connectivity remaining viable between accessory assembly 50, portable electronic tablet device implementation 100 or portable electronic phone device implementation 120, and payment card reader assembly 130. In implementations, for instance, these charging functions can remain even though a USB-C charging cable has been initially unplugged from accessory assembly 50 and flipped over in an inverse physical configuration.

In implementations, user communication input 200*a* to communication input 200*a* portion of user input/output 50*e*3, such as a single-press button procedure, can show charge level of electrical energy storage 50*c* through such as one or more LEDs of communication output 200*b* portion of user input/output 50*e*3. In implementations, user communication input 200*a* to communication input 200*a* portion of user input/output 50*e*3, such as a double-press button procedure, can deactivate portable electronic device charging, In implementations, connecting input portion of energy input/output 50*e*1 of accessory assembly 50 to an electrical energy source for a predetermined amount of time, such as two seconds, and then disconnecting such can activate portable electronic device charging by external device charging factor 50*d*2.

In implementations, disconnecting portable electronic tablet device implementation 100 or portable electronic phone device implementation 120 from accessory assembly 50 can be detected by processor 50*a*1, which can then be based upon this detection deactivate card reader accessory 130. In implementations, the accessory assembly 50 can automatically be deactivated by processor 50*a*1 within a predetermined time frame such as two minutes. In implementations with portable electronic tablet device implementation 100 or portable electronic phone device implementation 120 being in an inactive state and accessory assembly 50 also in an inactive state, if portable electronic tablet device implementation 100 or portable electronic phone device implementation 120 is coupled with accessory assembly 50, processor 50*a*1 of accessory assembly 130 will not activate either the portable electronic tablet device implementation 100 or portable electronic phone device implementation 120, accessory assembly 50, or payment card reader assembly 130.

In implementations, both electrical energy and network connectivity can be furnished via IEEE standards-based power-over-ethernet PoE in which both input portion of energy input/output 50*e*1 and input/output portions of communication input/output 50*e* are wired or wirelessly coupled with an electrical energy source and a network source. For instance, MagPower cabling could provide both to accessory assembly 50 from proper sources. For instance, when accessory assembly 50 has been deactivated and a MagPower or other type cable is coupled with the accessory assembly 50 and a USB hub having ethernet and power available is coupled with the MagPower cable, accessory assembly 50 can be activated processor 50a1 for both electrical energy input and network connectivity input. Through this means, charging of accessory assembly 50, portable electronic tablet device implementation 100 or portable electronic phone device implementation 120, and the payment card reader assembly 130 can be had along with availability of network connectivity, such as ethernet connectivity, to them all.

In implementations, in some cases where portable electronic tablet device implementation 100 or portable electronic phone device implementation 120 are active and accessory assembly 50 is inactivate, charging of portable electronic tablet device implementation 100 or portable electronic phone device implementation 120 can be activated by processor 50a1 through coupling of accessory assembly 50 with network and electrical energy source such as if a MagPower cable that is coupled with a USB hub having ethernet and electrical energy available, is coupled with accessory assembly, then accessory assembly 50 can be activated by processor 50a1. In implementations, these activations can also allow for charging and provide network connectivity to payment card reader assembly 130 and portable electronic tablet device implementation 100 or portable electronic phone device implementation 120.

In implementations, when portable electronic tablet device implementation 100 or portable electronic phone device implementation 120 and accessory assembly 50 are inactive, when portable electronic tablet device implementation 100 or portable electronic device assembly 120, and accessory assembly 50 are coupled together they along with payment card reader assembly 130 will remain inactive through management by processor 50a1 of accessory assembly 50.

Following includes implementations of methods performed by implementations of accessory assembly 50 as also described above.

Implementations of accessory assembly 50 can determine activation status of accessory assembly 50 and when portable electronic tablet device implementation 100 or portable electronic phone device implementation 120 is electrical-energy-communication based coupled and structurally coupled with the accessory assembly 50, accessory assembly 50 can control at least a portion of electrical-energy-based charging of the portable electronic tablet device implementation 100 or portable electronic phone device implementation 120 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and accessory assembly 50 can control at least a portion of electrical-energy-based charging of the portable electronic tablet device implementation 100 or portable electronic phone device implementation 120 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-energy-based charging of the portable electronic tablet device implementation 100 or portable electronic phone device implementation 120 based at least in part on the activation status of the accessory payment card reader assembly 130.

In implementations of accessory assembly 50, accessory assembly 50 can determine activation status of the accessory assembly 50; and accessory assembly 50 can control at least a portion of electrical-energy-based charging of the accessory assembly 50 based at least in part on the activation status of the accessory assembly 50.

In implementations of accessory assembly 50, when the portable electronic tablet device implementation 100 or portable electronic phone device implementation 120 is electrical-energy-communication-based and structurally coupled with the accessory assembly 50, accessory assembly 50 can determine activation status of the portable electronic tablet device implementation 100 or portable electronic phone device implementation 120; and accessory assembly 50 can control at least a portion of electrical-energy-based charging of the accessory assembly 50 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-energy-based charging of the accessory assembly 50 based at least in part on the activation status of the payment card reader assembly 130.

In implementations of accessory assembly 50, accessory assembly 50 can determine activation status of the accessory assembly 50; and when the payment card reader assembly 130 is electrical-energy-communication-based coupled and structurally coupled with the accessory assembly 50, accessory assembly 50 can control at least a portion of electrical-energy-based charging of the payment card reader assembly 130 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and when the payment card reader assembly 130 is electrical-energy-communication-based coupled and structurally coupled with the accessory assembly 50, accessory assembly 50 can control at least a portion of electrical-energy-based charging of the payment card reader assembly 130 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-energy-based charging of the payment card reader assembly 130 based at least in part on the activation status of the payment card reader assembly 130.

In implementations of accessory assembly 50, accessory assembly 50 can determine activation status of the accessory assembly 50; and when the portable electronic tablet device implementation 100 or portable electronic phone device implementation 120 is electrical-energy-communication-based coupled and structurally coupled with the accessory assembly 50, accessory assembly 50 can control at least a portion of electrical-communication status of the portable electronic tablet device implementation 100 or portable electronic phone device implementation 120 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and accessory assembly 50 can control at least a portion of electrical-communication-based connectivity of the portable electronic tablet device implementation 100 or portable electronic phone device implementation 120 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and when the portable electronic tablet device implementation 100 or portable electronic phone device implementation 120 is electrical-energy-communication-based coupled and structurally coupled with the accessory assembly 50, accessory assembly 50 can control at least a portion of electrical-communication-based connectivity of the portable electronic tablet device implementation 100 or portable electronic phone device implementation 120 based at least in part on the activation status of the payment card reader assembly 130.

In implementations of accessory assembly 50, accessory assembly 50 can determine activation status of the accessory assembly 50; and accessory assembly 50 can control at least a portion of electrical-communication-based connectivity of the accessory assembly 50 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and accessory assembly 50 can control at least a portion of electrical-communication-based connectivity of the accessory assembly 50 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-communication-based connectivity of the accessory assembly 50 based at least in part on the activation status of the payment card reader assembly 130.

In implementations of accessory assembly 50, accessory assembly 50 can determine activation status of the accessory assembly 50; and when the payment card reader assembly 130 is electrical-energy-communication-based coupled and structurally coupled with the accessory assembly 50, accessory assembly 50 can control at least a portion of electrical-communication-based connectivity of the payment card reader assembly 130 based at least in part on the activation status of the accessory assembly 50.

In implementations of accessory assembly 50, when the portable electronic tablet device implementation 100 or portable electronic phone device implementation 120 is electrical-energy-communication-based coupled and structurally coupled with the accessory assembly 50, accessory assembly 50 can determine activation status of the portable electronic tablet device implementation 100 or portable electronic phone device implementation 120; and when the payment card reader assembly 130 is electrical-energy-communication-based coupled and structurally coupled with the accessory assembly 50, accessory assembly 50 can control at least a portion of electrical-communication-based connectivity of the payment card reader assembly 130 based at least in part on the activation status of the portable electronic tablet device implementation 100 or portable electronic phone device implementation 120.

In implementations of accessory assembly 50, when the payment card reader assembly 130 is electrical-energy-communication-based coupled and structurally coupled with the accessory assembly 50, accessory assembly 50 can determine activation status of the payment card reader assembly 130; and accessory assembly 50 can control at least a portion of electrical-communication-based connectivity of the payment card reader assembly 130 based at least in part on the activation status of the payment card reader assembly 130.

In implementations of accessory assembly 50, accessory assembly 50 can determine electrical-energy-communication-based coupling status of the accessory assembly 50 with the portable electronic tablet device implementation 100 or portable electronic phone device implementation 120; and accessory assembly 50 can control at least a portion of electrical-communication-based connectivity of the portable electronic tablet device implementation 100 or portable electronic phone device implementation 120 based at least in part on the electrical-energy-communication-based coupling status of the accessory assembly 50 with the portable electronic tablet device implementation 100 or portable electronic phone device implementation 120.

In implementations of accessory assembly 50, accessory assembly 50 can determine electrical-energy-communication-based coupling status of the accessory assembly 50 with the payment card reader assembly 130; and accessory assembly 50 can control at least a portion of electrical-communication-based connectivity of the payment card reader assembly 130 based at least in part on the electricalenergy-communication-based coupling status of the accessory assembly 50 with the payment card reader assembly 130.

In implementations accessory assembly 50 can determine whether accessory assembly is in a first electrical state or a second electrical state such as whether a particular pin of interface portion 52*a*1*d* of exterior electric interface 52*a*1 of accessory assembly (see FIGS. 3 and 6) is at a grounded voltage level (e.g. first electrical state or alternatively second electrical state) or a high voltage (e.g. 3V or 5V) level (e.g. second electrical state or alternatively first electrical state). Such as using a pull-up resistor method (e.g. pulling a floating voltage to a high voltage such as 3V or 5V), a push-down resistor method (e.g. pushing a floating voltage down to 0V), direct digital read through an analog-to-digital converter) can be used to measure voltage levels and to determine grounding conditions. In implementations internal or external firmware, microcontrollers, or discrete components can be utilized by accessory assembly 50 for such determination. In implementations a pin of data-power interface 250*g* of device data-power station assembly 250 (see FIG. 53) can be permanently grounded such that accessory assembly 50 can be in the first electrical state when the particular pin of interface portion 52*a*1*d* of exterior electric interface 52*a*1 of accessory assembly 50 discussed above is coupled to the permanently grounded pin of data-power interface 250*g* when portable electronic tablet device implementation 100 or portable electronic phone device implementation 120 are coupled with device data-power station assembly 250.

In computing and peripheral device interactions, a host device typically refers to a device that controls communication with other connected devices, often referred to as peripherals. In implementations host devices can provide power, data communication, and/or control operations of peripheral devices connected to the host devices. The most common example is how a computer (host) controls USB peripherals like keyboards, mice, or external drives. In these instant cases, a host device generally means controlling and communicating with one or more accessories, for instance, as described above for the cases shown if FIGS. 64 and 65.

In implementations, for instance as shown in FIG. 64, when in a first electrical state is in a first electrical state, accessory assembly 50 and payment card reader assembly 130 as peripheral devices of either portable electronic tablet device implementation 100 (aka "portable electronic computing device") as host device or portable electronic phone device implementation 120 (aka "portable electronic computer device") as host device, can communicate (e.g., either two-way with commands received from host device and data received from peripheral device; or one-way commands from host device or one-way data from peripheral device) and be controlled as peripheral devices of either portable electronic tablet device implementation 100 (aka "portable electronic computing device") as host device or portable electronic phone device implementation 120 (aka "portable electronic computer device") as host device.

Figure 65:
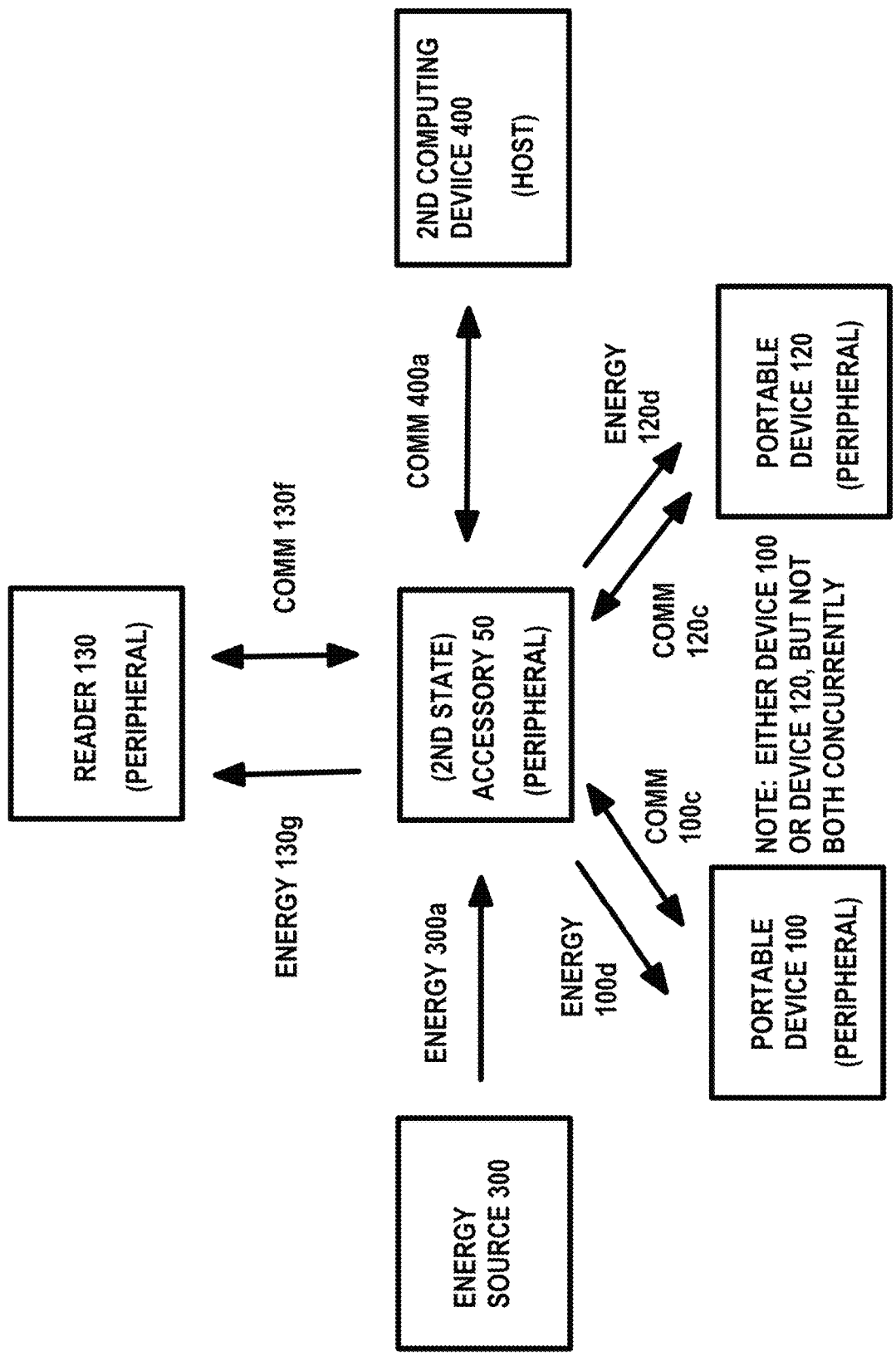
FIG. 65 is a schematic representation of implementations of flows of communication and/or electrical energy regarding the accessory assembly of FIG. 1.

In implementations, for instance as shown in FIG. 65, when in a second electrical state, as peripheral devices, accessory assembly 50, payment card assembly 130, and either portable electronic computing device 100 or portable electronic computing device 120 can communicate (e.g., either two-way with commands received from host device and data received from peripheral device(s); or one-way commands from host device or one-way data from peripheral device(s)) and be controlled as peripheral device(s) of second computing device 400 as host device. In implementations, when accessory assembly 50 is in second electrical state, second computing device 400 can initiate and manage communication with its one or more peripheral devices (e.g. accessory assembly 50, payment card reader 130, and either portable electronic computing device 100 or electronic computing device 120).

In implementations accessory assembly 50 when in first electrical state can serve as a hub peripheral device of either portable electronic computing device 100 as host device or portable electronic computing device 120 as host device in first electrical state of accessory assembly 50 to forward data from or commands to peripheral devices such as payment card reader 130. In implementations accessory assembly 50 when in second electrical state can serve as a hub peripheral device of second computing device 130 as host device to forward data from or commands to payment card reader 130, and either portable electronic computing device 100 or portable electronic computing device 120 as peripheral devices. In implementations two-way communication can occur between second computing device 400, as host device, and one or more peripheral devices including accessory assembly 50 while still distinguishing between host device role and peripheral device role(s). In implementations the amount of one-way or two-way communication is dependent about how accessory assembly 50 manages data flow using protocols, universal serial bus configuration, etc.

In implementations universal serial bus (USB) protocols are used that are based on a host-peripheral model in which one device (the host device) controls communication, while one or more other devices (the peripheral devices) respond to requests from the host device. In implementations the USB host device initiates communication, which can include requesting data and sending commands; manages power distribution; enumerates, which can include detecting and configuring attached peripheral devices. In implementations USB peripheral devices respond to requests from their host device and do not initiate communication on their own. With two-way communication the host device can both send requests and receive data from its peripheral devices, which allows more extensive control of its peripheral devices. With one-way communication the host device pulls data from its peripheral devices, which do not initiate communication to push data to their host device. Again, whether communication is two-way or one-way is dependent upon particular USB implementations involved.

In implementations various USB operating modes and roles can be utilized such as USB On-The-Go (OTG) mode, which allows devices such as portable electronic computing devices 100 and 120 to switch roles between being host device and peripheral device. In implementations USB Accessory Role Switch can occur based on host or peripheral connection type or based in firmware programming of the accessory assembly 50. In implementations, with accessory assembly 50 being in second electrical state, second computing device 400 could dictate what data is exchanged and may restrict interactions between payment card reader assembly 130 and portable electronic computing devices 100 or 120 such as in some implementations fully restricting interaction between payment card reader assembly 130 and portable electronic computing devices 100 or 120. In implementations accessory assembly 50 can be configured as a passive hub such that all data is forwarded through accessory assembly 50. In implementations accessory assembly 50 can be configured as an active hub such that some data may be controlled by accessory assembly 50 as far as whether it is forwarded or when it is forwarded.

In implementations one or more USB device classes are chosen to execute implementations described herein. USB device classes include Mass Storage Class (MSC), Human Interface Device (HID), Communications Device Class (CDC), Media Transfer Protocol/Picture Transfer Protocol (MTP/PTP). In implementations MTP/PTP protocol can be used for one-way communication by portable electronic computing devices 100 or 120 with second computing device 400 when accessory assembly 50 is in second electrical state. In implementations MSC protocol can be used by portable electronic computing devices 100 or 120 are in host device mode to provide two-way communication and to control accessory assembly 50 and payment card reader assembly 130 when accessory assembly 50 is in first electrical state. In implementations MTP protocol can be used with portable electronic computing devices 100 or 120 being in peripheral device mode with second computing device 400 pulling data either one of them when accessory assembly 50 is in second electrical state.

Turning to FIGS. 66 and 67, depicted therein is a representative flow diagram associated with aspects of accessory assembly 50 involving method 500 including step 502 determining whether the accessory assembly is in a first electrical state or a second electrical state, step 502's substep 502*a* determining at least one voltage level status according to at least one voltage threshold, step 502's substep 502*b* determining at least one current level status according to at least one current threshold, step 504 when the accessory assembly is in the first electrical state and is electrical-energy-communication-based coupled to the portable electronic computing device, executing electrical-based communication between the accessory assembly and the portable electronic computing device with the portable electronic computing device as a host device of the accessory assembly, step 504's substep 504*a* executing electrical-based communication between the accessory assembly and the electronic computing device using in part universal serial bus on-the-go mode designating the portable electronic computing device as a host, step 504's substep 504*b* utilizing at least one accessory role switch at least in part of the universal serial bus on-the-go mode designating the portable electronic computing device as a host, step 506 when the accessory assembly is in the second electrical state, executing electrical-based communication between the accessory assembly and the portable electronic computing device with the portable electronic computing device as a peripheral device, step 506's substep 506*a* executing electrical-based communication between the accessory assembly and the electronic computing device using in part universal serial bus on-the-go mode designating the portable electronic computing device as a peripheral device, and step 506's substep 506*b* utilizing at least one accessory role switch at least in part of the universal serial bus on-the-go mode designating the portable electronic computing device as a peripheral device.

Turning to FIG. 68, depicted therein is a representative flow diagram associated with aspects of accessory assembly 50 involving method 510 including step 512 the determining whether the accessory assembly is in a first electrical state or a second electrical state includes determining at least one voltage level of an externally accessed electrically conductive portion of the accessory assembly, step 512's substep 512*a* determining at least one voltage level status of an external pin according to at least one voltage threshold, step 512's substep 512*b* enabling at least one pull-up resistor as connected between the external pin and a supply voltage, and step 512's substep 512*c* reading a logic state of the external pin as either low equated to a zero voltage or as high equated to a floating or disconnected pin.

Turning to FIG. 69, depicted therein is a representative flow diagram associated with aspects of accessory assembly 50 involving method 520 including step 522 when the accessory assembly is in the first electrical state and is electrical-energy-communication-based coupled to the portable electronic computing device, controlling at least a portion of electrical-energy-based charging of the portable electronic computing device, step 522's substep 522*a* controlling electrical-energy-based charging via current level metering, step 522's substep 522*b* controlling electrical-energy-based charging via voltage level metering, step 524 when the accessory assembly is in the second electrical state and is electrical-energy-communication-based coupled to the portable electronic computing device, controlling at least a portion of electrical-energy-based charging of the portable electronic computing device, step 524's substep 524*a* controlling electrical-energy-based charging via current level metering, and step 524's substep 524*b* controlling electrical-energy-based charging via voltage level metering.

Turning to FIG. 70, depicted therein is a representative flow diagram associated with aspects of accessory assembly 50 involving method 530 including step 532 determining whether the accessory assembly is electrical-communication-based coupled with a second computing device, step 532's substep 532*a* transmitting ping communication packets from a pin interface, step 532's substep 532*b* determining if ping communication packets are received at the pin interface from the second computing device in response to the transmitting the ping communication packets from the pin interface, step 534 when the accessory assembly is in the second electrical state and is electrical-communication-based coupled to the second computing device, executing electrical-based communication between the accessory assembly and the second computing device with the second computing device as a host device of the accessory assembly, step 534's substep 534*a* executing electrical-based communication between the accessory assembly and the second computing device using in part universal serial bus on-the-go mode designating the second computing device as a host device of the accessory assembly, and step 534's substep 534*b* utilizing at least one accessory role switch at least in part of the universal serial bus on-the-go mode designating the second computing device as a host device of the accessory assembly.

Figure 71:
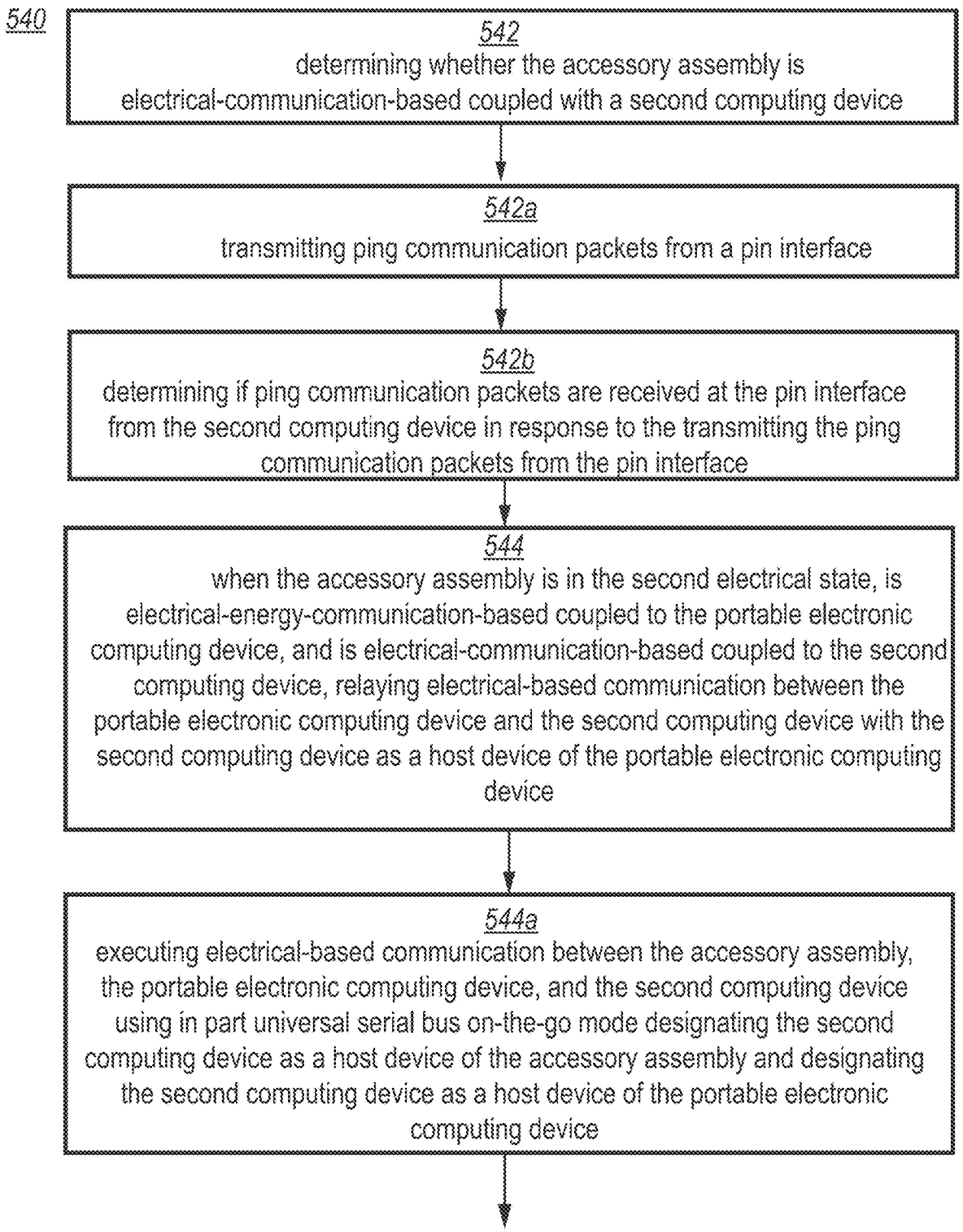

Turning to FIGS. 71 and 72, depicted therein is a representative flow diagram associated with aspects of accessory assembly 50 involving method 540 including step 542 determining whether the accessory assembly is electrical-communication-based coupled with a second computing device, step 542's substep 542*a* transmitting ping communication packets from a pin interface, step 542's substep 542*b* determining if ping communication packets are received at the pin interface from the second computing device in response to the transmitting the ping communication packets from the pin interface, step 544 when the accessory assembly is in the second electrical state, is electrical-energy-communication-based coupled to the portable electronic computing device, and is electrical-communication-based coupled to the second computing device, relaying electrical-based communication between the portable electronic computing device and the second computing device with the second computing device as a host device of the portable electronic computing device, step 544's substep 544*a* executing electrical-based communication between the accessory assembly, the portable electronic computing device, and the second computing device using in part universal serial bus on-the-go mode designating the second computing device as a host device of the accessory assembly and designating the second computing device as a host device of the portable electronic computing device, and step 544's substep 544b utilizing at least one accessory role switch at least in part of the universal serial bus on-the-go mode designating the second computing device as a host device of the accessory assembly and designating the second computing device as a host device of the portable electronic computing device.

Turning to FIG. 73, depicted therein is a representative flow diagram associated with aspects of accessory assembly 50 involving method 550 including step 552 determining whether the accessory assembly is electrical-communication-based coupled with a payment card reader assembly, step 552's substep 552a determining at least one voltage level from a card reader interface, step 522's substep 552b determining if the at least one determined voltage level is at a predetermined voltage threshold, step 554 when the accessory assembly is in the first electrical state, is electrical-communication-based coupled to the payment card reader, and is electrical-communication-based coupled to the portable electronic computing device, relaying electrical-based communication between the portable electronic computing device and the payment card reader assembly with the portable electronic computing device as a host device of the payment card reader assembly, step 554's substep 554a executing electrical-based communication between the accessory assembly, the portable electronic computing device, and the payment card reader assembly using in part universal serial bus on-the-go mode designating the portable electronic computing device as a host device of the payment card reader assembly, and step 554's substep 554b utilizing at least one accessory role switch at least in part of the universal serial bus on-the-go mode designating the portable electronic computing device as a host device of the payment card reader assembly.

Figure 74:
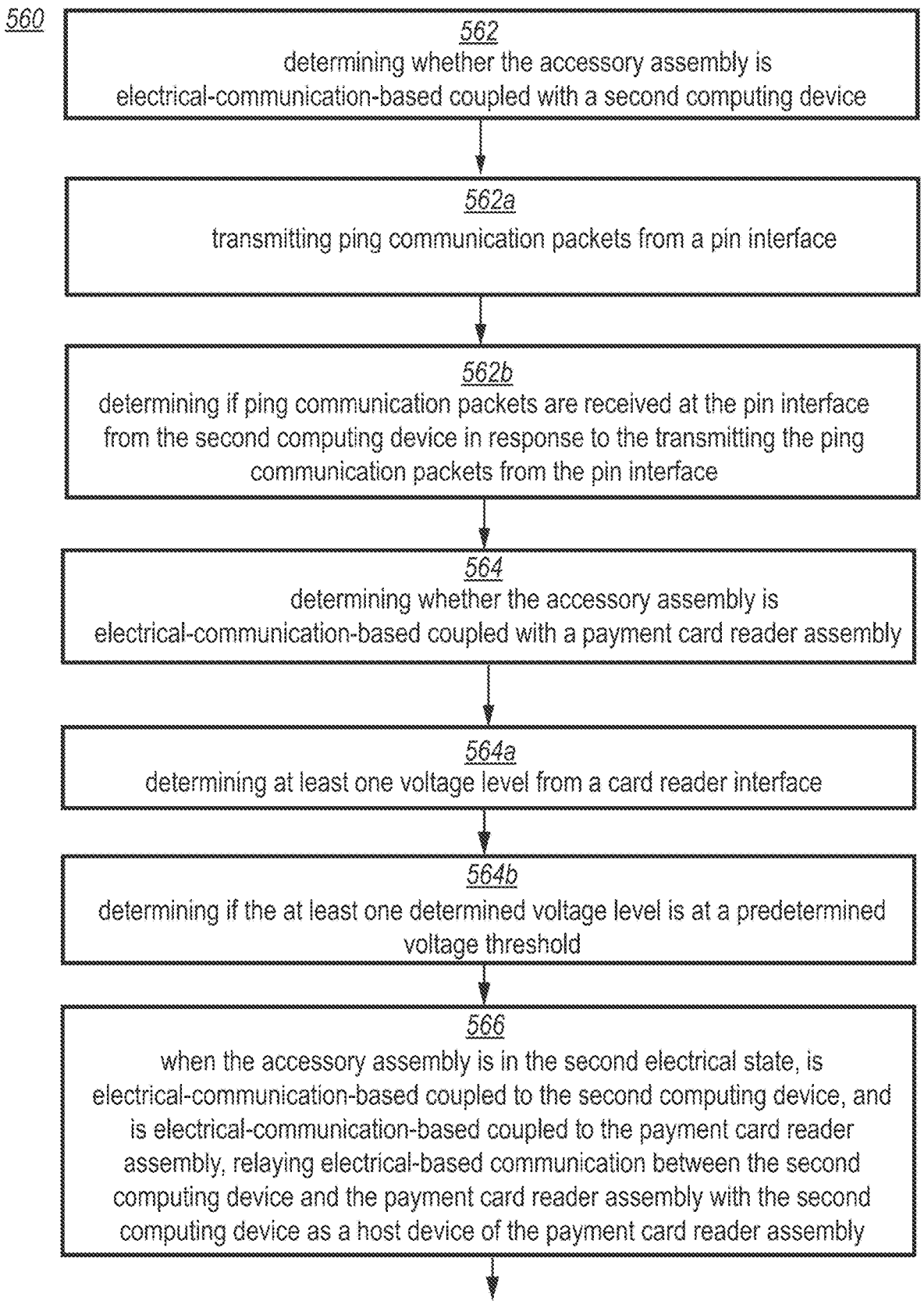

Turning to FIGS. 74 and 75, depicted therein is a representative flow diagram associated with aspects of accessory assembly 50 involving method 560 including step 562 determining whether the accessory assembly is electrical-communication-based coupled with a second computing device, step 562's substep 562a transmitting ping communication packets from a pin interface, step 562's substep 562b determining if ping communication packets are received at the pin interface from the second computing device in response to the transmitting the ping communication packets from the pin interface, step 564 determining whether the accessory assembly is electrical-communication-based coupled with a payment card reader assembly, step 564's substep 564a determining at least one voltage level from a card reader interface, step 564's substep 564b determining if the at least one determined voltage level is at a predetermined voltage threshold, step 566 when the accessory assembly is in the second electrical state, is electrical-communication-based coupled to the second computing device, and is electrical-communication-based coupled to the payment card reader assembly, relaying electrical-based communication between the second computing device and the payment card reader assembly with the second computing device as a host device of the payment card reader assembly, step 566's substep 566a executing electrical-based communication between the accessory assembly, the second computing device, and the payment card reader assembly using in part universal serial bus on-the-go mode designating the second computing device as a host device of the payment card reader assembly, and step 566's substep 566b utilizing at least one accessory role switch at least in part of the universal serial bus on-the-go mode designating the second computing device as a host device of the payment card reader assembly.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. An electronic-controller-implemented method for use with an accessory assembly electrical-energy-communication-based couplable and structurally couplable with a portable electronic computing device, the method comprising:
   determining whether the accessory assembly is in a first electrical state or a second electrical state;
   when the accessory assembly is in the first electrical state and is electrical-energy-communication-based coupled to the portable electronic computing device, executing electrical-based communication between the accessory assembly and the portable electronic computing device with the portable electronic computing device as a host device of the accessory assembly; and
   when the accessory assembly is in the second electrical state, executing electrical-based communication between the accessory assembly and the portable electronic computing device with the portable electronic computing device as a peripheral device.

2. The method of claim 1 wherein,
   the determining whether the accessory assembly is in a first electrical state or a second electrical state includes determining at least one voltage level of an externally accessed electrically conductive portion of the accessory assembly.

3. The method of claim 1 further comprising:
   when the accessory assembly is in the first electrical state and is electrical-energy-communication-based coupled to the portable electronic computing device, controlling at least a portion of electrical-energy-based charging of the portable electronic computing device; and
   when the accessory assembly is in the second electrical state and is electrical-energy-communication-based coupled to the portable electronic computing device, controlling at least a portion of electrical-energy-based charging of the portable electronic computing device.

4. The method of claim 1 further comprising:
   determining whether the accessory assembly is electrical-communication-based coupled with a second computing device; and
   when the accessory assembly is in the second electrical state and is electrical-communication-based coupled to the second computing device, executing electrical-based communication between the accessory assembly and the second computing device with the second computing device as a host device of the accessory assembly.

5. The method of claim 1 further comprising:
   determining whether the accessory assembly is electrical-communication-based coupled with a second computing device; and
   when the accessory assembly is in the second electrical state, is electrical-energy-communication-based coupled to the portable electronic computing device, and is electrical-communication-based coupled to the second computing device, relaying electrical-based communication between the portable electronic computing device and the second computing device with the second computing device as a host device of the portable electronic computing device.

6. The method of claim 1 further comprising:
   determining whether the accessory assembly is electrical-communication-based coupled with a payment card reader assembly; and
   when the accessory assembly is in the first electrical state, is electrical-communication-based coupled to the payment card reader, and is electrical-communication-based coupled to the portable electronic computing device, relaying electrical-based communication between the portable electronic computing device and the payment card reader assembly with the portable electronic computing device as a host device of the payment card reader assembly.

7. The method of claim 1 further comprising:
   determining whether the accessory assembly is electrical-communication-based coupled with a second computing device;
   determining whether the accessory assembly is electrical-communication-based coupled with a payment card reader assembly; and
   when the accessory assembly is in the second electrical state, is electrical-communication-based coupled to the second computing device, and is electrical-communication-based coupled to the payment card reader assembly, relaying electrical-based communication between the second computing device and the payment card reader assembly with the second computing device as a host device of the payment card reader assembly.

8. An electronic controller of an accessory assembly electrical-energy-communication-based couplable and structurally couplable with a portable electronic computing device, the electronic controller comprising:
   at least one memory; and
   at least one processor configured to:
   determining whether the accessory assembly is in a first electrical state or a second electrical state;
   when the accessory assembly is in the first electrical state and is electrical-energy-communication-based coupled to the portable electronic computing device, executing electrical-based communication between the accessory assembly and the portable electronic computing device with the portable electronic computing device as a host device of the accessory assembly; and
   when the accessory assembly is in the second electrical state, executing electrical-based communication between the accessory assembly and the portable electronic computing device with the portable electronic computing device as a peripheral device.

9. The electronic controller of claim 8 wherein,
   the determining whether the accessory assembly is in a first electrical state or a second electrical state includes determining at least one voltage level of an externally accessed electrically conductive portion of the accessory assembly.

10. The electronic controller of claim 8 wherein the at least one processor is further configured
    when the accessory assembly is in the first electrical state and is electrical-energy-communication-based coupled to the portable electronic computing device, controlling at least a portion of electrical-energy-based charging of the portable electronic computing device; and when the accessory assembly is in the second electrical state and is electrical-energy-communication-based coupled to the portable electronic computing device, controlling at least a portion of electrical-energy-based charging of the portable electronic computing device.

11. The electronic controller of claim 8 wherein the at least one processor is further configured to:

determining whether the accessory assembly is electrical-communication-based coupled with a second computing device; and when the accessory assembly is in the second electrical state and is electrical-communication-based coupled to the second computing device, executing electrical-based communication between the accessory assembly and the second computing device with the second computing device as a host device of the accessory assembly.

12. The electronic controller of claim 8 wherein the at least one processor is further configured to:

determining whether the accessory assembly is electrical-communication-based coupled with a second computing device; and when the accessory assembly is in the second electrical state, is electrical-energy-communication-based coupled to the portable electronic computing device, and is electrical-communication-based coupled to the second computing device, relaying electrical-based communication between the portable electronic computing device and the second computing device with the second computing device as a host device of the portable electronic computing device.

13. The electronic controller of claim 8 wherein the at least one processor is further configured to:

determining whether the accessory assembly is electrical-communication-based coupled with a payment card reader assembly; and when the accessory assembly is in the first electrical state, is electrical-communication-based coupled to the payment card reader, and is electrical-communication-based coupled to the portable electronic computing device, relaying electrical-based communication between the portable electronic computing device and the payment card reader assembly with the portable electronic computing device as a host device of the payment card reader assembly.

14. The electronic controller of claim 8 wherein the at least one processor is further configured to:

determining whether the accessory assembly is electrical-communication-based coupled with a second computing device;

determining whether the accessory assembly is electrical-communication-based coupled with a payment card reader assembly; and when the accessory assembly is in the second electrical state, is electrical-communication-based coupled to the second computing device, and is electrical-communication-based coupled to the payment card reader assembly, relaying electrical-based communication between the second computing device and the payment card reader assembly with the second computing device as a host device of the payment card reader assembly.

15. A non-transitory computer readable medium comprising instruction for use on one or more electronic computing devices, the instructions being usable to execute a method for use with an accessory assembly electrical-energy-communication-based couplable and structurally couplable with a portable electronic computing device, the method comprising:

determining whether the accessory assembly is in a first electrical state or a second electrical state;

when the accessory assembly is in the first electrical state and is electrical-energy-communication-based coupled to the portable electronic computing device, executing electrical-based communication between the accessory assembly and the portable electronic computing device with the portable electronic computing device as a host device of the accessory assembly; and when the accessory assembly is in the second electrical state, executing electrical-based communication between the accessory assembly and the portable electronic computing device with the portable electronic computing device as a peripheral device.

16. The method of claim 15 wherein, the determining whether the accessory assembly is in a first electrical state or a second electrical state includes determining at least one voltage level of an externally accessed electrically conductive portion of the accessory assembly.

17. The method of claim 15 further comprising:

when the accessory assembly is in the first electrical state and is electrical-energy-communication-based coupled to the portable electronic computing device, controlling at least a portion of electrical-energy-based charging of the portable electronic computing device; and when the accessory assembly is in the second electrical state and is electrical-energy-communication-based coupled to the portable electronic computing device, controlling at least a portion of electrical-energy-based charging of the portable electronic computing device.

18. The method of claim 15 further comprising:

determining whether the accessory assembly is electrical-communication-based coupled with a second computing device; and when the accessory assembly is in the second electrical state and is electrical-communication-based coupled to the second computing device, executing electrical-based communication between the accessory assembly and the second computing device with the second computing device as a host device of the accessory assembly.

19. The method of claim 15 further comprising:

determining whether the accessory assembly is electrical-communication-based coupled with a second computing device; and when the accessory assembly is in the second electrical state, is electrical-energy-communication-based coupled to the portable electronic computing device, and is electrical-communication-based coupled to the second computing device, relaying electrical-based communication between the portable electronic computing device and the second computing device with the second computing device as a host device of the portable electronic computing device.

20. The method of claim 15 further comprising:

determining whether the accessory assembly is electrical-communication-based coupled with a payment card reader assembly; and when the accessory assembly is in the first electrical state, is electrical-communication-based coupled to the payment card reader, and is electrical-communication-based coupled to the portable electronic computing device, relaying electrical-based communication between the portable electronic computing device and the payment card reader assembly with the portable electronic computing device as a host device of the payment card reader assembly.

\* \* \* \* \*